(12) United States Patent
Sweeney et al.

(10) Patent No.: US 10,248,669 B2
(45) Date of Patent: Apr. 2, 2019

(54) METHODS AND DEVICES FOR CUSTOMIZING KNOWLEDGE REPRESENTATION SYSTEMS

(71) Applicant: PRIMAL FUSION INC., Kitchener (CA)

(72) Inventors: Peter Sweeney, Kitchener (CA); Ihab Francis Ilyas, Waterloo (CA)

(73) Assignee: PRIMAL FUSION INC., Kitchener (CA)

( * ) Notice: Subject to any disclaimer, the term of this patent is extended or adjusted under 35 U.S.C. 154(b) by 0 days.

(21) Appl. No.: 15/484,679

(22) Filed: Apr. 11, 2017

(65) Prior Publication Data
US 2017/0220607 A1    Aug. 3, 2017

Related U.S. Application Data

(63) Continuation of application No. 15/403,761, filed on Jan. 11, 2017, which is a continuation of application
(Continued)

(51) Int. Cl.
*G06N 5/02* (2006.01)
*G06F 17/30* (2006.01)

(52) U.S. Cl.
CPC .. *G06F 17/30294* (2013.01); *G06F 17/30292* (2013.01); *G06F 17/30554* (2013.01);
(Continued)

(58) Field of Classification Search
CPC combination set(s) only.
See application file for complete search history.

(56) References Cited

U.S. PATENT DOCUMENTS

| 3,943,462 A | 3/1976 | Thompson |
| 4,532,813 A | 8/1985 | Rinehart |

(Continued)

FOREIGN PATENT DOCUMENTS

| CA | 2734756 A1 | 3/2010 |
| CA | 2421611 A1 | 2/2011 |

(Continued)

OTHER PUBLICATIONS

Analysis of Topological Characteristics of Huge Online Social Networking Services, YongYeol Ahn, Seungyeop Han, Haewoon Kwak, Sue Moon, Hawoong Jeong Proceeding WWW '07 Proceedings of the 16th international conference on World Wide Web pp. 835-844 May 8-12, 2007.*

(Continued)

*Primary Examiner* — Michael B Holmes
(74) *Attorney, Agent, or Firm* — Norton Rose Fulbright Canada LLP; Niall Cooney

(57) ABSTRACT

Techniques for analyzing and synthesizing complex knowledge representations (KRs) may utilize an atomic knowledge representation model including both an elemental data structure and knowledge processing rules stored as machine-readable data and/or programming instructions. One or more of the knowledge processing rules may be applied to analyze an input complex KR to deconstruct its complex concepts and/or concept relationships to elemental concepts and/or concept relationships to be included in the elemental data structure. One or more of the knowledge processing rules may be applied to synthesize an output complex KR from the stored elemental data structure in accordance with context information. Methods of populating an elemental data structure and methods of synthesizing complex KRs from the elemental data structure may depend on user models,
(Continued)

context information, preference information, and/or preference models.

21 Claims, 33 Drawing Sheets

Related U.S. Application Data

No. 14/961,819, filed on Dec. 7, 2015, now Pat. No. 9,576,241, which is a continuation of application No. 13/844,009, filed on Mar. 15, 2013, now Pat. No. 9,235,806, and a continuation-in-part of application No. 13/609,218, filed on Sep. 10, 2012, now abandoned, which is a continuation-in-part of application No. 13/345,637, filed on Jan. 6, 2012, now abandoned, and a continuation-in-part of application No. 13/165,423, filed on Jun. 21, 2011, now Pat. No. 9,104,779, said application No. 13/609,218 is a continuation-in-part of application No. 13/340,792, filed on Dec. 30, 2011, now Pat. No. 9,378,203, said application No. 13/844,009 is a continuation-in-part of application No. 13/609,223, filed on Sep. 10, 2012, now Pat. No. 9,177,248, which is a continuation-in-part of application No. 13/345,637, filed on Jan. 6, 2012, now abandoned, and a continuation-in-part of application No. 13/340,792, filed on Dec. 30, 2011, now Pat. No. 9,378,203, said application No. 13/844,009 is a continuation-in-part of application No. 13/609,225, filed on Sep. 10, 2012, now abandoned, which is a continuation-in-part of application No. 13/345,637, filed on Jan. 6, 2012, now abandoned, and a continuation-in-part of application No. 13/340,792, filed on Dec. 30, 2011, now Pat. No. 9,378,203.

(60) Provisional application No. 61/751,571, filed on Jan. 11, 2013, provisional application No. 61/751,594, filed on Jan. 11, 2013, provisional application No. 61/751,623, filed on Jan. 11, 2013, provisional application No. 61/751,659, filed on Jan. 11, 2013, provisional application No. 61/532,330, filed on Sep. 8, 2011, provisional application No. 61/357,266, filed on Jun. 22, 2010, provisional application No. 61/498,899, filed on Jun. 20, 2011, provisional application No. 61/471,964, filed on Apr. 5, 2011, provisional application No. 61/430,810, filed on Jan. 7, 2011, provisional application No. 61/430,836, filed on Jan. 7, 2011.

(52) U.S. Cl.
CPC ............... *G06N 5/02* (2013.01); *G06N 5/022* (2013.01); *Y04S 10/54* (2013.01)

(56) References Cited

U.S. PATENT DOCUMENTS

| | | |
|---|---|---|
| 4,972,328 A | 11/1990 | Wu et al. |
| 5,056,021 A | 10/1991 | Ausborn |
| 5,193,185 A | 3/1993 | Lanter |
| 5,369,763 A | 11/1994 | Biles |
| 5,594,837 A | 1/1997 | Noyes |
| 5,745,910 A | 4/1998 | Piersol et al. |
| 5,793,376 A | 8/1998 | Tanaka et al. |
| 5,835,758 A | 11/1998 | Nochur et al. |
| 5,911,145 A | 6/1999 | Arora et al. |
| 5,924,098 A | 7/1999 | Kluge |
| 5,937,400 A | 8/1999 | Au |
| 5,950,173 A | 9/1999 | Perkowski |
| 5,953,726 A | 9/1999 | Carter et al. |
| 6,006,222 A | 12/1999 | Culliss |
| 6,078,916 A | 6/2000 | Culliss |
| 6,098,033 A | 8/2000 | Richardson et al. |
| 6,138,085 A | 10/2000 | Richardson et al. |
| 6,167,390 A | 12/2000 | Brady et al. |
| 6,173,276 B1 | 1/2001 | Kant et al. |
| 6,233,575 B1 | 5/2001 | Agrawal et al. |
| 6,292,792 B1 | 9/2001 | Baffes et al. |
| 6,295,066 B1 | 9/2001 | Tanizaki et al. |
| 6,334,131 B2 | 12/2001 | Chakrabarti et al. |
| 6,349,275 B1 | 2/2002 | Schumacher et al. |
| 6,356,899 B1 | 3/2002 | Chakrabarti et al. |
| 6,396,864 B1 | 5/2002 | O'Brien et al. |
| 6,401,061 B1 | 6/2002 | Zieman |
| 6,487,547 B1 | 11/2002 | Ellison et al. |
| 6,499,024 B1 | 12/2002 | Stier et al. |
| 6,539,376 B1 | 3/2003 | Sundaresan et al. |
| 6,539,395 B1 | 3/2003 | Gjerdingen et al. |
| 6,556,983 B1 | 4/2003 | Altschuler et al. |
| 6,571,240 B1 | 5/2003 | Ho et al. |
| 6,694,329 B2 | 2/2004 | Murray |
| 6,751,611 B2 | 6/2004 | Krupin et al. |
| 6,751,621 B1 | 6/2004 | Calistri-Yeh et al. |
| 6,768,982 B1 | 7/2004 | Collins et al. |
| 6,772,136 B2 | 8/2004 | Kant et al. |
| 6,785,683 B1 | 8/2004 | Zodik et al. |
| 6,868,525 B1 | 3/2005 | Szabo |
| 6,976,020 B2 | 12/2005 | Anthony et al. |
| 6,980,984 B1 | 12/2005 | Huffman et al. |
| 7,007,074 B2 | 2/2006 | Radwin |
| 7,010,144 B1 | 3/2006 | Davis et al. |
| 7,035,864 B1 | 4/2006 | Ferrari et al. |
| 7,051,023 B2 | 5/2006 | Kapur et al. |
| 7,062,466 B2 | 6/2006 | Wagner et al. |
| 7,062,483 B2 | 6/2006 | Ferrari et al. |
| 7,089,237 B2 | 8/2006 | Turnbull et al. |
| 7,120,646 B2 | 10/2006 | Streepy, Jr. |
| 7,152,065 B2 | 12/2006 | Behrens et al. |
| 7,181,465 B2 | 2/2007 | Maze et al. |
| 7,209,922 B2 | 4/2007 | Maze et al. |
| 7,225,183 B2 | 5/2007 | Gardner |
| 7,249,117 B2 | 7/2007 | Estes |
| 7,280,991 B1 | 10/2007 | Beams et al. |
| 7,283,992 B2 | 10/2007 | Liu et al. |
| 7,302,418 B2 | 11/2007 | Asahara |
| 7,319,951 B2 | 1/2008 | Rising, III et al. |
| 7,392,250 B1 | 6/2008 | Dash et al. |
| 7,406,456 B2 | 7/2008 | Calistri-Yeh et al. |
| 7,418,452 B2 | 8/2008 | Maze |
| 7,440,940 B2 | 10/2008 | Chen et al. |
| 7,478,089 B2 | 1/2009 | Henkin et al. |
| 7,490,073 B1 | 2/2009 | Qureshi et al. |
| 7,493,319 B1 | 2/2009 | Dash et al. |
| 7,496,593 B2 | 2/2009 | Gardner et al. |
| 7,502,810 B2 | 3/2009 | Acevedo-Aviles et al. |
| 7,523,102 B2 | 4/2009 | Bjarnestam et al. |
| 7,580,918 B2 | 8/2009 | Chang et al. |
| 7,584,208 B2 | 9/2009 | Spivack et al. |
| 7,596,374 B2 | 9/2009 | Katou |
| 7,596,574 B2 | 9/2009 | Sweeney |
| 7,606,168 B2 | 10/2009 | Robinson et al. |
| 7,606,781 B2 | 10/2009 | Sweeney et al. |
| 7,627,582 B1 | 12/2009 | Ershov |
| 7,668,737 B2 | 2/2010 | Streepy, Jr. |
| 7,711,672 B2 | 5/2010 | Au |
| 7,716,207 B2 | 5/2010 | Odom et al. |
| 7,716,216 B1 | 5/2010 | Harik et al. |
| 7,720,857 B2 | 5/2010 | Beringer et al. |
| 7,752,159 B2 | 7/2010 | Nelken et al. |
| 7,752,199 B2 | 7/2010 | Farrell |
| 7,752,534 B2 | 7/2010 | Blanchard, III et al. |
| 7,827,125 B1 | 11/2010 | Rennison |
| 7,844,565 B2 | 11/2010 | Sweeney |
| 7,849,090 B2 | 12/2010 | Sweeney |
| 7,860,817 B2 | 12/2010 | Sweeney et al. |
| 7,908,240 B1 | 3/2011 | Mazzagatti et al. |
| 7,913,159 B2 | 3/2011 | Larcheveque et al. |
| 7,917,534 B2 | 3/2011 | Demiroski et al. |

(56) References Cited

U.S. PATENT DOCUMENTS

| | | | |
|---|---|---|---|
| 7,945,555 B2 | 5/2011 | Sankaran et al. | |
| 7,970,764 B1 | 6/2011 | Ershov | |
| 8,010,570 B2 | 8/2011 | Sweeney | |
| 8,281,238 B2 | 10/2012 | Sweeney et al. | |
| 8,385,971 B2 | 2/2013 | Rhoads et al. | |
| 8,676,732 B2 | 3/2014 | Sweeney et al. | |
| 8,849,860 B2 | 9/2014 | Ilyas et al. | |
| 8,930,191 B2 | 1/2015 | Gruber et al. | |
| 8,942,986 B2 | 1/2015 | Cheyer et al. | |
| 9,098,575 B2 * | 8/2015 | Ilyas | G06F 17/30867 |
| 9,104,779 B2 * | 8/2015 | Hunt | G06F 17/30914 |
| 9,177,248 B2 * | 11/2015 | Sweeney | G06N 5/00 |
| 9,235,806 B2 * | 1/2016 | Sweeney | G06N 7/005 |
| 9,292,855 B2 * | 3/2016 | Sweeney | G06Q 30/02 |
| 9,378,203 B2 * | 6/2016 | Sweeney | G06F 17/2785 |
| 9,576,241 B2 * | 2/2017 | Sweeney | G06N 7/005 |
| 9,595,004 B2 * | 3/2017 | Sweeney | G06N 5/022 |
| 9,715,552 B2 * | 7/2017 | Ilyas | G06F 17/30867 |
| 9,792,550 B2 * | 10/2017 | Sweeney | G06F 17/2785 |
| 9,904,729 B2 * | 2/2018 | Sweeney | G06F 17/30705 |
| 9,934,465 B2 * | 4/2018 | Hunt | G06F 17/30914 |
| 10,002,325 B2 * | 6/2018 | Sweeney | G06F 17/30914 |
| 2002/0069197 A1 | 6/2002 | Katayama et al. | |
| 2002/0078044 A1 | 6/2002 | Song et al. | |
| 2002/0133483 A1 | 9/2002 | Klenk et al. | |
| 2002/0194187 A1 | 12/2002 | McNeil et al. | |
| 2003/0177112 A1 | 9/2003 | Gardner | |
| 2003/0196094 A1 | 10/2003 | Hillis et al. | |
| 2003/0217023 A1 | 11/2003 | Cui et al. | |
| 2003/0217335 A1 | 11/2003 | Chung et al. | |
| 2004/0024739 A1 | 2/2004 | Copperman et al. | |
| 2004/0049522 A1 | 3/2004 | Streepy, Jr. | |
| 2004/0054672 A1 | 3/2004 | Tsuchitani et al. | |
| 2004/0243395 A1 | 12/2004 | Gluzberg et al. | |
| 2005/0010428 A1 | 1/2005 | Bergeron et al. | |
| 2005/0065955 A1 | 3/2005 | Babikov et al. | |
| 2005/0086188 A1 | 4/2005 | Hillis et al. | |
| 2005/0131924 A1 | 6/2005 | Jones | |
| 2005/0149518 A1 | 7/2005 | Duan et al. | |
| 2005/0154708 A1 | 7/2005 | Sun | |
| 2005/0159921 A1 | 7/2005 | Louviere et al. | |
| 2005/0209874 A1 | 9/2005 | Rossini | |
| 2005/0216320 A1 | 9/2005 | Hattaway | |
| 2005/0216335 A1 | 9/2005 | Fikes et al. | |
| 2005/0223109 A1 | 10/2005 | Mamou et al. | |
| 2005/0256907 A1 | 11/2005 | Novik et al. | |
| 2005/0278362 A1 | 12/2005 | Maren et al. | |
| 2005/0289524 A1 | 12/2005 | McGinnes | |
| 2006/0010117 A1 | 1/2006 | Bonabeau et al. | |
| 2006/0026147 A1 | 2/2006 | Cone et al. | |
| 2006/0053172 A1 | 3/2006 | Gardner et al. | |
| 2006/0074980 A1 | 4/2006 | Sarkar | |
| 2006/0085489 A1 | 4/2006 | Tomic et al. | |
| 2006/0129906 A1 | 6/2006 | Wall | |
| 2006/0153083 A1 | 7/2006 | Wallenius | |
| 2006/0195407 A1 | 8/2006 | Athelogou et al. | |
| 2006/0242564 A1 | 10/2006 | Egger et al. | |
| 2006/0271520 A1 | 11/2006 | Ragan | |
| 2007/0010994 A1 | 1/2007 | Mueller | |
| 2007/0033531 A1 | 2/2007 | Marsh | |
| 2007/0036440 A1 | 2/2007 | Schaepe et al. | |
| 2007/0038500 A1 | 2/2007 | Hammitt et al. | |
| 2007/0061195 A1 | 3/2007 | Liu et al. | |
| 2007/0078889 A1 | 4/2007 | Hoskinson | |
| 2007/0083492 A1 | 4/2007 | Hohimer et al. | |
| 2007/0094221 A1 | 4/2007 | Au | |
| 2007/0106658 A1 | 5/2007 | Ferrari et al. | |
| 2007/0112819 A1 | 5/2007 | Dettinger et al. | |
| 2007/0118394 A1 | 5/2007 | Cahoon | |
| 2007/0118542 A1 | 5/2007 | Sweeney | |
| 2007/0136221 A1 | 6/2007 | Sweeney et al. | |
| 2007/0143300 A1 | 6/2007 | Gulli et al. | |
| 2007/0174041 A1 | 7/2007 | Yeske | |
| 2007/0174255 A1 | 7/2007 | Sravanapudi et al. | |
| 2007/0192272 A1 | 8/2007 | Elfayoumy et al. | |
| 2007/0192369 A1 | 8/2007 | Gross | |
| 2007/0203865 A1 | 8/2007 | Hirsch | |
| 2007/0208719 A1 | 9/2007 | Tran | |
| 2007/0208764 A1 | 9/2007 | Grisinger | |
| 2007/0239792 A1 | 10/2007 | Chen et al. | |
| 2007/0239892 A1 | 10/2007 | Ott et al. | |
| 2007/0255731 A1 | 11/2007 | Maze | |
| 2007/0282824 A1 | 12/2007 | Ellingsworth | |
| 2007/0288503 A1 | 12/2007 | Taylor | |
| 2007/0294200 A1 | 12/2007 | Au | |
| 2007/0300142 A1 | 12/2007 | King et al. | |
| 2008/0001948 A1 | 1/2008 | Hirsch | |
| 2008/0004844 A1 | 1/2008 | Kefford et al. | |
| 2008/0004864 A1 | 1/2008 | Gabrilovich et al. | |
| 2008/0021925 A1 | 1/2008 | Sweeney | |
| 2008/0028084 A1 | 1/2008 | Bloching et al. | |
| 2008/0036617 A1 | 2/2008 | Arms et al. | |
| 2008/0059125 A1 | 3/2008 | Fraser et al. | |
| 2008/0072145 A1 | 3/2008 | Blanchard et al. | |
| 2008/0086465 A1 | 4/2008 | Fontenot et al. | |
| 2008/0092044 A1 | 4/2008 | Lewis et al. | |
| 2008/0126303 A1 | 5/2008 | Park et al. | |
| 2008/0133591 A1 | 6/2008 | Bookman et al. | |
| 2008/0137668 A1 | 6/2008 | Rodriguez et al. | |
| 2008/0154906 A1 | 6/2008 | McDavid et al. | |
| 2008/0162498 A1 | 7/2008 | Omoigui | |
| 2008/0228568 A1 | 9/2008 | Williams et al. | |
| 2008/0243480 A1 | 10/2008 | Bartz et al. | |
| 2008/0270120 A1 | 10/2008 | Pestian et al. | |
| 2008/0275694 A1 | 11/2008 | Varone | |
| 2008/0281814 A1 | 11/2008 | Calistri-Yeh et al. | |
| 2008/0294584 A1 | 11/2008 | Herz | |
| 2008/0294641 A1 | 11/2008 | Kim | |
| 2009/0012842 A1 | 1/2009 | Srinivasan et al. | |
| 2009/0018988 A1 | 1/2009 | Abrams et al. | |
| 2009/0024385 A1 | 1/2009 | Hirsch | |
| 2009/0024556 A1 | 1/2009 | Hirsch | |
| 2009/0028164 A1 | 1/2009 | Hirsch | |
| 2009/0055342 A1 | 2/2009 | Gong et al. | |
| 2009/0063557 A1 | 3/2009 | MacPherson | |
| 2009/0070219 A1 | 3/2009 | D'Angelo et al. | |
| 2009/0083140 A1 | 3/2009 | Phan | |
| 2009/0106234 A1 | 4/2009 | Siedlecki et al. | |
| 2009/0138454 A1 | 5/2009 | Rayner et al. | |
| 2009/0144059 A1 | 6/2009 | Yu et al. | |
| 2009/0150809 A1 | 6/2009 | Hirsch | |
| 2009/0157442 A1 | 6/2009 | Tesler | |
| 2009/0157616 A1 | 6/2009 | Barber et al. | |
| 2009/0182725 A1 | 7/2009 | Govani et al. | |
| 2009/0192954 A1 | 7/2009 | Katukuri et al. | |
| 2009/0192968 A1 | 7/2009 | Tunstall-Pedoe | |
| 2009/0198561 A1 | 8/2009 | Otto et al. | |
| 2009/0228425 A1 | 9/2009 | Goraya | |
| 2009/0300326 A1 | 12/2009 | Sweeney | |
| 2009/0307581 A1 | 12/2009 | Jaepel et al. | |
| 2009/0319508 A1 | 12/2009 | Yih et al. | |
| 2009/0327205 A1 | 12/2009 | Sweeney | |
| 2009/0327417 A1 | 12/2009 | Chakra et al. | |
| 2010/0030552 A1 | 2/2010 | Chen et al. | |
| 2010/0036783 A1 | 2/2010 | Rodriguez | |
| 2010/0036790 A1 | 2/2010 | Sweeney et al. | |
| 2010/0036829 A1 | 2/2010 | Leyba | |
| 2010/0049702 A1 | 2/2010 | Martinez et al. | |
| 2010/0049766 A1 | 2/2010 | Sweeney et al. | |
| 2010/0057664 A1 | 3/2010 | Sweeney et al. | |
| 2010/0070448 A1 | 3/2010 | Omoigui | |
| 2010/0100546 A1 | 4/2010 | Kohler | |
| 2010/0107094 A1 | 4/2010 | Steelberg et al. | |
| 2010/0122151 A1 | 5/2010 | Mendelson et al. | |
| 2010/0153219 A1 | 6/2010 | Mei et al. | |
| 2010/0161317 A1 | 6/2010 | Au | |
| 2010/0198724 A1 | 8/2010 | Thomas | |
| 2010/0205061 A1 | 8/2010 | Karmarkar | |
| 2010/0217745 A1 | 8/2010 | Song et al. | |
| 2010/0223295 A1 | 9/2010 | Stanley et al. | |
| 2010/0228693 A1 | 9/2010 | Dawson et al. | |
| 2010/0235285 A1 | 9/2010 | Hoffberg | |
| 2010/0235307 A1 | 9/2010 | Sweeney et al. | |
| 2010/0250526 A1 | 9/2010 | Prochazka et al. | |

(56) References Cited

U.S. PATENT DOCUMENTS

| | | |
|---|---|---|
| 2010/0257171 A1 | 10/2010 | Shekhawat |
| 2010/0262456 A1 | 10/2010 | Feng et al. |
| 2010/0268596 A1 | 10/2010 | Wissner et al. |
| 2010/0280860 A1 | 11/2010 | Iskold et al. |
| 2010/0285818 A1 | 11/2010 | Crawford |
| 2010/0287011 A1 | 11/2010 | Muchkaev |
| 2010/0317420 A1 | 12/2010 | Hoffberg |
| 2011/0040749 A1 | 2/2011 | Ceri et al. |
| 2011/0054977 A1 | 3/2011 | Jaffer |
| 2011/0060644 A1 | 3/2011 | Sweeney |
| 2011/0060645 A1 | 3/2011 | Sweeney |
| 2011/0060794 A1 | 3/2011 | Sweeney |
| 2011/0113386 A1 | 5/2011 | Sweeney et al. |
| 2011/0173176 A1 | 7/2011 | Christensen et al. |
| 2011/0202333 A1 | 8/2011 | Abir |
| 2011/0271270 A1 | 11/2011 | Bowen |
| 2011/0282919 A1 | 11/2011 | Sweeney et al. |
| 2011/0314006 A1 | 12/2011 | Sweeney et al. |
| 2011/0314382 A1 | 12/2011 | Sweeney |
| 2011/0320396 A1 | 12/2011 | Hunt et al. |
| 2012/0143880 A1 | 6/2012 | Sweeney et al. |
| 2012/0150874 A1 | 6/2012 | Sweeney et al. |
| 2012/0166371 A1 | 6/2012 | Sweeney et al. |
| 2012/0166372 A1 | 6/2012 | Ilyas et al. |
| 2012/0166373 A1 | 6/2012 | Sweeney et al. |
| 2013/0046723 A1 | 2/2013 | Sweeney et al. |
| 2013/0060785 A1 | 3/2013 | Sweeney et al. |
| 2013/0066823 A1 | 3/2013 | Sweeney et al. |
| 2013/0246328 A1 | 9/2013 | Sweeney et al. |
| 2015/0302299 A1 | 10/2015 | Hunt et al. |

FOREIGN PATENT DOCUMENTS

| | | |
|---|---|---|
| CA | 2823420 A1 | 7/2012 |
| CN | 1395193 A | 2/2003 |
| CN | 1395193 A | 5/2003 |
| CN | 101595476 A | 12/2009 |
| EP | 0 962 873 A1 | 12/1999 |
| JP | 06-168129 A | 6/1994 |
| JP | 09-288673 A | 11/1997 |
| JP | 2000-285122 A | 10/2000 |
| JP | 2001-243223 A | 9/2001 |
| JP | 2003056468 A | 2/2003 |
| JP | 2003-223465 A | 8/2003 |
| JP | 2003223465 A | 8/2003 |
| JP | 2007331017 A | 12/2007 |
| JP | 2008-242626 A | 10/2008 |
| JP | 2009-093655 A | 4/2009 |
| JP | 2009-146261 A | 7/2009 |
| JP | 2009-193584 A | 8/2009 |
| JP | 2010-009307 A | 1/2010 |
| JP | 2010069219 A | 4/2010 |
| JP | 2010243869 A | 10/2010 |
| JP | 2010250274 A | 11/2010 |
| JP | 2011001899 A | 1/2011 |
| JP | 20120528200 A | 3/2011 |
| JP | 2011138906 A | 7/2011 |
| JP | 2011521325 A | 7/2011 |
| JP | 20110506541 A | 7/2011 |
| JP | 2011149198 A | 8/2011 |
| JP | 2012501018 A | 1/2012 |
| JP | 20110524147 A | 1/2012 |
| JP | 2013504137 A | 2/2013 |
| JP | 2013510378 A | 3/2013 |
| JP | 20120538155 A | 3/2013 |
| JP | 2013533421 A | 8/2013 |
| JP | 20130516542 A | 8/2013 |
| JP | 2013211018 A | 10/2013 |
| JP | 20130087014 A | 10/2013 |
| JP | 2014501988 A | 1/2014 |
| JP | 20130547784 A | 1/2014 |
| JP | 2014056591 A | 3/2014 |
| JP | 20130222881 A | 3/2014 |
| JP | 2014085995 A | 7/2014 |
| JP | 2014132507 A | 7/2014 |
| JP | 2014179114 A | 9/2014 |
| JP | 20140092256 A | 9/2014 |
| JP | 2014238858 A | 12/2014 |
| JP | 20140149123 A | 12/2014 |
| JP | 2015133144 A | 7/2015 |
| WO | WO 02/054292 A2 | 7/2002 |
| WO | WO02054292 | 7/2002 |
| WO | WO 2004/075466 A2 | 9/2004 |
| WO | WO 2005/020093 A1 | 3/2005 |
| WO | WO 2005/020094 A1 | 3/2005 |
| WO | WO 2007/047971 A2 | 4/2007 |
| WO | WO 2008/025167 A1 | 3/2008 |
| WO | WO 2008/076438 A1 | 6/2008 |
| WO | WO 2009/014837 A2 | 1/2009 |
| WO | WO 2009/132442 A1 | 11/2009 |
| WO | WO 2010/022505 A1 | 3/2010 |
| WO | WO 2010/149427 A1 | 12/2010 |
| WO | WO 2011/029177 A1 | 3/2011 |
| WO | WO 2011/029177 A4 | 3/2011 |
| WO | WO 2011/057396 A1 | 5/2011 |
| WO | WO 2011/160204 A1 | 12/2011 |
| WO | WO 2011/160205 A1 | 12/2011 |
| WO | WO 2011/160214 A1 | 12/2011 |
| WO | WO 2012/088590 A1 | 7/2012 |
| WO | WO 2012/088591 A1 | 7/2012 |
| WO | WO 2012/088611 A1 | 7/2012 |
| WO | WO 2012/092669 A1 | 7/2012 |

OTHER PUBLICATIONS

Fully Convolutional Networks for Semantic Segmentation, Jonathan Long, Evan Shelhamer, Trevor Darrell; The IEEE Conference on Computer Vision and Pattern Recognition (CVPR), 2015, pp. 431-3440.*

ScienceDirect Elsevier Web Semantics: Science, Services and Agents on the World Wide Web 6 (2008) pp. 4-13 Collective knowledge systems: Where the Social Web meets the Semantic Web, Tom Gruber.*

Multicasting in Delay Tolerant Networks: Semantic Models and Routing Algorithms, Wenrui Zhao, Mostafa Ammar and Ellen Zegura Proceeding WDTN '05 Proceedings of the 2005 ACM SIGCOMM workshop on Delay-tolerant networking pp. 268-275.*

Brewster, C.; Ciravengna, F.; and Wilks, Y.; (2002). User-Centered Ontology Learning for Knowledge Management. 7th International Workshop on Applications of Natural Language to Information Systems, Stockholm, Jun. 27-28, 2002, Lecture Notes in Computer Sciences, Springer Verlag. pp. 203-207. 5 pages.

Rocha, L. M. (2001). Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. pp. 1-35. 35 pages.

Slavic, A; Cordeiro, M.I. (2004). Core Requirements for Automation of Analytico-Synthetic Classifications. Advances in Knowledge Organization. 2004, vol. 9, pp. 187-192. 6 pages. (The year of publication is sufficiently earlier than the effective U.S. filing data and only priority date so that the particular month of publication is not in issue. See MPEP 609.04(a)).

Zhang, G.Q.; Troy, A.D.; and Bourgoin, K. (2006). Bootstrapping Ontology Learning for Information Retrieval Using Formal Concept Analysis and Information Anchors. 14th International Conference on Conceptual Structures. Aalborg, Denmark. Jul. 2006. pp. 1-14. 14 pages.

"Faceted Classification and Adaptive Concept Matching," Gemstone Business Intelligence Ltd., Feb. 2006. pp. 1-7. 7 pages.

International Search Report dated Dec. 28, 2007 of International Application No. PCT/CA2007/001546. 6 pages.

Interview Summary in U.S. Appl. No. 11/469,258. Dec. 16, 2008; 3 pages.

U.S. Office Action in U.S. Appl. No. 11/469,258, dated Aug. 21, 2008; 20 pages.

Anick, P.; and Tipirneni, S. (1999). Interactive document retrieval using faceted terminological feedback. HICSS-32. Proceedings of the 32nd Annual Hawaii International Conference on Systems

(56) References Cited

OTHER PUBLICATIONS

Sciences. vol. 2. Track 2. Digital Object Identifier: 10.1109/HICSS.1999.772692. pp. 2036-2048. 12 pages.
Ma, J.; Zhang, J.; Lu, H.; and Xue, X. (2007). Semantic Information Extraction of Video Based on Ontology and Inference. ICSC 2007. International Conference on Semantic Computing. Digital Object Identifier: 10.1109/ICSC.2007.12. vol. 1. pp. 721-726. 6 pages.
Ozcan, R.; and Aslandogan, Y.A. (2005). Concept-based information access. Proceedings of the International Conference on Information Technology: Coding and Computing. ITCC 2005. vol. 1. Digitai Object Identifier: 10.1109/ITCC.2005.111. pp. 794-799. 6 pages.
Storey, V.C. (2005). Comparing Relationships in Conceptual Modeling: Mapping to Semantic Classifications. IEEE Transactions on Knowledge and Data Engineering. vol. 17. Issue 11. Digital Object Identifier: 10.1109/TKDE.2005.175. pp. 1478-1489. 12 pages.
Notice of Allowance for U.S. Appl. No. 13/165,423 dated Jan. 28, 2015.
Notice of Allowance for U.S. Appl. No. 13/165,423 dated Mar. 30, 2015.
Notice of Allowance for U.S. Appl. No. 13/345,640 dated Apr. 14, 2014.
Notice of Allowance for U.S. Appl. No. 13/345,640 dated Dec. 26, 2013.
Office Action for U.S. Appl. No. 13/165,423 dated Jan. 6, 2014.
Office Action for U.S. Appl. No. 13/345,637 dated Jul. 17, 2015.
Office Action for U.S. Appl. No. 13/345,637 dated Sep. 5, 2014.
Office Action for U.S. Appl. No. 13/609,218 dated Dec. 30, 2013.
Office Action for U.S. Appl. No. 13/609,218 dated Nov. 4, 2014.
Office Action for U.S. Appl. No. 14/788,589 dated Nov. 9, 2015.
Australian Office Action for Australian Application No. 2011269685 dated Nov. 25, 2014.
Chinese Office Action for Chinese Application No. 201180031005.5, dated Nov. 17, 2014.
Chinese Office Action for Chinese Application No. 201180031005.5, dated Sep. 24, 2014.
Ex Parte Quayle Action for U.S. Appl. No. 13/165,423 dated Sep. 9, 2014.
Interview Summary for U.S. Appl. No. 13/345,640 dated Dec. 5, 2013.
Japanese Office Action for Japanese Application No. 2013-515646 dated Mar. 31, 2015.
Japanese Office Action for Japanese Application No. 2013-547784 dated Nov. 4, 2015.
Karanikas et al., MetaOn—Ontology Driven Metadata Construction and Management for Intelligent Search in Text and Image Collections. IEEE. 2006. 5 pages.
Chinese Office Action for Chinese Application No. 200780032062.9, dated May 17, 2011.
International Search Report and Written Opinion for PCT/CA2007/001546 dated Dec. 28, 2007.
International Preliminary Report on Patentability for PCT/CA2007/001546 dated Dec. 19, 2008.
International Search Report and Written Opinion for PCT/CA2009/000567 dated Aug. 24, 2009.
International Preliminary Report on Patentability for PCT/CA2009/000567 dated Nov. 11, 2010.
International Search Report and Written Opinion for PCT/CA2009/001185 dated Dec. 3, 2009.
International Preliminary Report on Patentability for PCT/CA2009/001185 dated Mar. 10, 2011.
International Search Report and Written Opinion for PCT/CA2010/001382 dated Jan. 13, 2011.
International Preliminary Report on Patentability for PCT/CA2010/001382 dated Mar. 22, 2012.
International Search Report and Written Opinion for PCT/CA2010/001772 dated Apr. 28, 2011.
International Preliminary Report on Patentability for PCT/CA2010/001772 dated May 24, 2012.
International Search Report and Written Opinion for PCT/CA2011/000718 dated Oct. 13, 2011.
International Search Report and Written Opinion for PCT/CA2011/000719 dated Sep. 28, 2011.
International Search Report and Written Opinion for PCT/CA2011/000745 dated Sep. 22, 2011.
International Search Report and Written Opinion for PCT/CA2011/001382 dated Apr. 24, 2012.
International Search Report and Written Opinion for PCT/CA2011/001402, dated Apr. 24, 2012.
International Search Report and Written Opinion for PCT/CA2011/001403 dated May 23, 2012.
International Search Report and Written Opinion for PCT/CA2012/000007 dated Apr. 20, 2012.
International Search Report and Written Opinion for PCT/CA2012/000009 dated May 1, 2012.
Office Action for U.S. Appl. No. 11/625,452 dated Mar. 30, 2009.
International Preliminary Report on Patentability for PCT/CA2011/000745, dated Jan. 10, 2013.
International Preliminary Report on Patentability for PCT/CA2012/000009, dated Jul. 18, 2013.
Office Action for U.S. Appl. No. 13/345,637 dated Aug. 2, 2013.
Office Action for U.S. Appl. No. 13/345,644 dated Nov. 6, 2013.
Office Action for U.S. Appl. No. 13/345,644 dated Nov. 26, 2014.
International Preliminary Report on Patentability for International Application No. PCT/CA2011/000745 dated Jan. 10, 2013.
Office Action for U.S. Appl. No. 13/345,640 dated May 10, 2013.
USPTO, Office Action for U.S. Appl. No. 13/609,225 dated Jul. 14, 2016.
USPTO, Office Action for U.S. Appl. No. 14/961,819 dated May 25, 2016.
IP Australia, Patent Examination Report No. 1 for AU Application No. 2011269685 dated Nov. 25, 2014.
IP Australia, Patent Examination Report No. 1 for AU Application No. 2015268637 dated Mar. 2, 2017.
CIPO, Office Action for CA Application No. 2,802,905 dated Mar. 16, 2017.
JPO, Office Action for JP Application No. 20130547784.
JPO, Office Action for JP Application No. 2013515646.
Office Action for U.S. Appl. No. 11/625,452 dated Dec. 7, 2009.
Office Action for U.S. Appl. No. 11/625,452 dated Mar. 26, 2010.
Office Action for U.S. Appl. No. 12/477,994 dated Aug. 31, 2010.
Office Action for U.S. Appl. No. 12/477,977 dated Sep. 28, 2010.
Office Action for U.S. Appl. No. 11/469,258 dated Aug. 21, 2008.
Interview Summary for U.S. Appl. No. 11/469,258 dated Dec. 16, 2008.
Office Action for U.S. Appl. No. 11/550,457 dated Dec. 15, 2008.
Office Action for U.S. Appl. No. 12/556,349 dated Jun. 29, 2010.
Office Action for U.S. Appl. No. 12/441,100 dated Jun. 9, 2011.
Office Action for U.S. Appl. No. 12/441,100 dated Jan. 24, 2012.
Advisory Action for U.S. Appl. No. 12/441,100 dated May 4, 2012.
Office Action for U.S. Appl. No. 12/549,812 dated Oct. 1, 2012.
Office Action for U.S. Appl. No. 12/555,222 dated Jan. 27, 2012.
Office Action for U.S. Appl. No. 12/555,222 dated Oct. 31, 2012.
Office Action for U.S. Appl. No. 12/555,341 dated Feb. 9, 2012.
Office Action for U.S. Appl. No. 12/555,341 dated Aug. 1, 2012.
Office Action for U.S. Appl. No. 12/615,703 dated Feb. 1, 2012.
Office Action for U.S. Appl. No. 13/105,890 dated Jun. 26, 2012.
Office Action for U.S. Appl. No. 13/609,223 dated Dec. 30, 2013.
Office Action for U.S. Appl. No. 13/609,223 dated Oct. 21, 2014.
Office Action for U.S. Appl. No. 13/609,223 dated Apr. 22, 2015.
Office Action for U.S. Appl. No. 13/609,223 dated Jul. 31, 2015.
Office Action for U.S. Appl. No. 13,609,225 dated Nov. 21, 2013.
Office Action for U.S. Appl. No. 13/609,225 dated Oct. 6, 2014.
Office Action for U.S. Appl. No. 13/609,225 dated Aug. 25, 2015.
Office Action for U.S. Appl. No. 13/844,009 dated Mar. 25, 2015.
Office Action for U.S. Appl. No. 13/844,009 dated Sep. 9, 2015.
International Search Report and Written Opinion for International Application No. PCT/CA2010/001382 dated Jan. 13, 2011.
International search report and written opinion for International application No. PCT/CA2010/001772, dated Apr. 28, 2011.
International Preliminary Report on Patentability for International application No. PCT/CA2010/001772, dated May 24, 2012.

(56) References Cited

OTHER PUBLICATIONS

International Search Report and Written Opinion for International Application No. PCT/CA2011/000718 dated Oct. 13, 2011.
International Search Report and Written Opinion of the International Searching Authority for International Application No. PCT/CA2011/000719, dated Sep. 28, 2011.
International Search Report and Written Opinion for International Application No. PCT/CA2011/000745 dated Sep. 22, 2011.
International Search Report and Written Opinion for International Application No. PCT/CA2011/001382 dated Apr. 24, 2012.
International Search Report and Written Opinion of the International Searching Authority for International Application No. PCT/CA2011/001402, dated Apr. 24, 2012.
International Search Report and Written Opinion for International Application No. PCT/CA2011/001403 dated May 23, 2012.
International Search Report and Written Opinion of the International Searching Authority for International Application No. PCT/CA2012/000007, dated Apr. 20, 2012.
International Search Report and Written Opinion of the International Searching Authority for International Application No. PCT/CA2012/000009, dated May 1, 2012.
International Search Report and Written Opinion for International Application No. PCT/CA2013/000278 dated Jul. 30, 2013.
International Preliminary Report on Patentability for International Application No. PCT/CA2013/000278 dated Mar. 19, 2015.
[No Author Listed] "Faceted Classification and Adaptive Concept Matching," Gemstone Business Intelligence Ltd., Feb. 2006. pp. 1-7. 7 pages.
Anick et al., Interactive document retrieval using faceted terminological feedback. HICSS-32. Proceedings of the 32nd Annual Hawaii International Conference on Systems Sciences. 1999;2(2):2036-2048. Digital Object Identifier: 10.1109/HICSS.1999.772692.
Blei et al., Hierarchical Bayesian models for applications in information retrieval. In: Bayesian Statistics 7. Bernardo et al., eds. 2003:25-43.
Bollegala et al., Measuring semantic similarity between words using web searches engines. Proceedings of 16th International Conference on World Wide Web. 2007;757-66.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:12 pages.
Brewster et al., User-Centered Ontology Learning for Knowledge Management. 7th International Workshop on Applications of Natural Language to Information Systems, Stockholm, Jun. 27-28, 2002. Lecture Notes in Computer Sciences, Springer Verlag. 2002:203-207. 5 pages.
Dakka et al., Automatic Extraction of Useful Facet Hierarchies from Text Databases. Data Engineering. IEEE 24th International Conference on Apr. 7-12, 2008. ICDE 2008:466-475. Digital Object Identifier 10.1109/ICDE.2008.4467455.
Fikadu et al., A Framework for Personalized Information Retrieval Model. Conference Proceedings, Second International Conference on Computer and Network Technology (ICCNT), IEEE, Piscataway, NJ, USA Apr. 23, 2010, pp. 500-505.
Gabrilovich et al., Computing semantic relatedness using wikipedia-based explicit semantic analysis. Proceedings of 20th International Joint Conference on Artificial Intelligence. 2007;1606-11.
Hassan-Montero et al., Improving tag-clouds as visual information retrieval interfaces, International Conference on Multidisciplinary Information Sciences and Technologies, InSciT2006. Oct. 25-28, 2006, Merida, Spain. 6 pages.
Hiemstra, A probabilistic justification for using tf-idf term weighting in information retrieval. International Journal on Digital Libraries. 2000;3(2):131-39.
Jiang et al., Semantic similarity based on corpus statistics and lexical taxonomy. Proceedings of International Conference Research on Computational Linguistics. 1997; 15 pages.
Jones, A statistical interpretation of term specificity and its applications in retrieval. Journal of Documentation. 2004;60(5):493-502.
Kaser et al., Tag-Cloud Drawing: Algorithms for Cloud Visualization, arXiv:cs/0703109v2 [cs.DS] May 7, 2007.
Lewis, Naive (Bayes) at forty: The independence assumption in information retrieval. Lecture Notes in Computer Science. 1998;1398:4-15.
Ma et al., Semantic Information Extraction of Video Based on Ontology and Inference. ICSC 2007. International Conference on Semantic Computing. 2007;1:721-726. Digital Object Identifier: 10.1109/ ICSC.2007.12.
Metzler et al., A Markov random field model for term dependencies. Proceedings of SIGIR 2005. 2005:472-79.
Ozcan et al., Concept-based information access. Proceedings of the International Conference on Information Technology: Coding and Computing. ITCC 2005;1:794-799. Digital Object Identifier: 10.1109/ITCC.2005.111.
Payne et al., Calendar Agents on the Semantic Web. IEEE Intelligent Systems. Jun. 2002;17(3):84-86.
Robertson, Understanding inverse document frequency: On theoretical arguments for ids. Journal of Documentation. 2004;60(5):503-20.
Rocha, Adaptive Webs for Heterarchies with Diverse Communities of Users. Paper prepared for the workshop from Intelligent Networks to the Global Brain: Evolutionary Social Organization through Knowledge Technology, Brussels, Jul. 3-5, 2001. LAUR005173. 35 pages.
Seco et al., An intrinsic information content metric for semantic similarity in wordnet. Proceedings of 16th European Conference on Artificial Intelligence. 2004;1089-90.
Slavic et al., Core Requirements for Automation of Analytico-Synthetic Classifications. Advances in Knowledge Organization. 2004;9:187-192.
Song et al., A conceptual graph approach to semantic similarity computation method for e-service discovery. International Journal on Knowledge Engineering and Data Mining. 2010;1(1):50-68.
Storey, Comparing Relationships in Conceptual Modeling: Mapping to Semantic Classifications. IEEE Transactions on Knowledge and Data Engineering. 2005;17(11):1478-1489. Digital Object Identifier: 10.1109/.
Terra et al., Frequency estimates for statistical word similarity measures. Proceedings of 2003 Conference of the North American Chapter of the Association for Computational Linguistics on Human Language Technology. 2003:165-172.
Wang et al., Gene expression correlation and gene ontology-based similarity: An assessment of quantitative relationships. Proceedings of IEEE Symposium on Computational Intelligence in Bioinformatics and Computational Biology. 2004:25-31.
Wu et al., Interpreting tf-idf term weights as making relevance decisions. ACM Transactions on Information Systems. 2008;26(3):Article No. 13.
Zhai, Statistical language models for information retrieval—a critical review. Foundations and Trends in Information Retrieval. 2008;2(3):137-213.
Zhang et al., Bootstrapping Ontology Learning for Information Retrieval Using Formal Concept Analysis and Information Anchors. 14th International Conference on Conceptual Structures. Aalborg, Denmark. Jul. 2006. 14 pages.
Honkela et al., Subjects on objects in contexts: Using GICA method to quantify epistemological subjectivity. Neural Networks (IJCNN), The 2012 International Joint Conference, 2012; pp. 1-9. DOI: 10.1109/IJCNN.2012.6252765 Referenced in: IEEE Conference Publications.
Iaconesi, Wearing Emotions: Physical Representation and Visualization of Human Emotions Using Wearable Technologies. Information Visualization(IV), 2010 14th International Conference, 2010; pp. 200-206. DOI: 10.1109/IV.2010.38 Referenced in: IEEE Conference Publications.
Hsu et al., A Case-Based Retrieval System Using Natural Language Processing and Population-Based Visualization. A.A.T. Healthcare Informatics, Imaging and Systems Biology (HISB), 2011 First IEEE International Conference, 2011; pp. 221-228. DOI: 10.1109/HISB.2011.3 Referenced in: IEEE Conference Publication.

(56) References Cited

OTHER PUBLICATIONS

Yaohua et al., Formal concept analysis based on hierarchical class analysis. Cognitive Informatics, 2004. (ICCI 2005). Fourth IEEE Conference, 2005; pp. 285-292. DOI: 10.1109/COGINF.2005.1532643 Referenced in: IEEE Conference Publications.
Office Action for U.S. Appl. No. 13/345,644 dated Sep. 22, 2015.
Mar. 30, 2009 Office Action in U.S. Appl. No. 11/625,452.
Dec. 7, 2009 Office Action in U.S. Appl. No. 11/625,452.
Mar. 26, 2010 Office Action in U.S. Appl. No. 11/625,452.
Aug. 31, 2010 Office Action in U.S. Appl. No. 12/477,994.
Sep. 28, 2010 Office Action in U.S. Appl. No. 12/477,977.
Aug. 21, 2008 Office Action in U.S. Appl. No. 11/469,258.
Dec. 15, 2008 Office Action U.S. Appl. No. 11/550,457.
Jun. 29, 2010 Office Action in U.S. Appl. No. 12/556,349.
Hiemstra, A probabilisitc justification for using tf-idf term weighting in information retrieval. International Journal on Digital Libraries. 2000;3(2):131-39.
Seco et al., An intrinsic information content metric for semantic similarity in wordnet. Proceedings of 16th European Conference on Artifical Intelligence. 2004;1089-90.
Wang et al., Gene expression correlation and gene ontology-based similarity: An assesment of quantitative relationships. Proceedings of IEEE Symposium on Computational Intelligence in Bioinformatics and Computational Biology. 2004:25-31.
Ma et al., Semantic Information Extraction of Video Based on Ontology and Inference. ISCS 2007. International Conference on Semantic Computing. 2007;1:721-726. Digital Object Identifier: 10.1109/ICSC.2007.12.
Ozcan et al., Concept-based information access. Proceedings of the International Conference on Information Technology: Coding and Computing. ITCC 2005;1:794-799. Digital Object Indentifier: 10.1109/ITCC.2005.111.
Wang et al., Gene expression correlation and gene ontology-based similarity: An assesment of quantitative relationships. Proceedings of IEEE Symposium on Computational Intelligence in Bioinformatics and Computational Biolozy. 2004:25-31.
Wu et al., Interpreting tf-idf term weights as making relevance decisions. ACM Transactions on Infoiniation Systems. 2008;26(3):Article No. 13.
Israel Patent Office, Office Action for IL Application No. 223541 dated Jun. 21, 2016.
USPTO, Office Action for U.S. Appl. No. 13/345,637 dated Jan. 1, 2016.
Israel Patent Office, Office Action for IL Application No. 227202 dated May 1, 2016.
IP Australia, Patent Examination Report No. 1 for AU Application No. 2012205031 dated Jun. 21, 2016.
USPTO, Office Action for U.S. Appl. No. 13/609,225 dated Nov. 21, 2013.
USPTO, Office Action for U.S. Appl. No. 13/609,225 dated Oct. 6, 2014.
USPTO, Office Action for U.S. Appl. No. 13/345,637 dated Sep. 30, 2016.
Japanese Patent Office, Office Action for JP Application No. 2013-515646 dated Mar. 31, 2015.
USPTO, Office Action for U.S. Appl. No. 13/345,644 dated Jun. 24, 2016.
Israel Patent Office, Office Action for IL Application No. 227202 May 1, 2016.
SIPO, Office Action for CN Application No. 201610323839.8 dated Nov. 21, 2018.

* cited by examiner

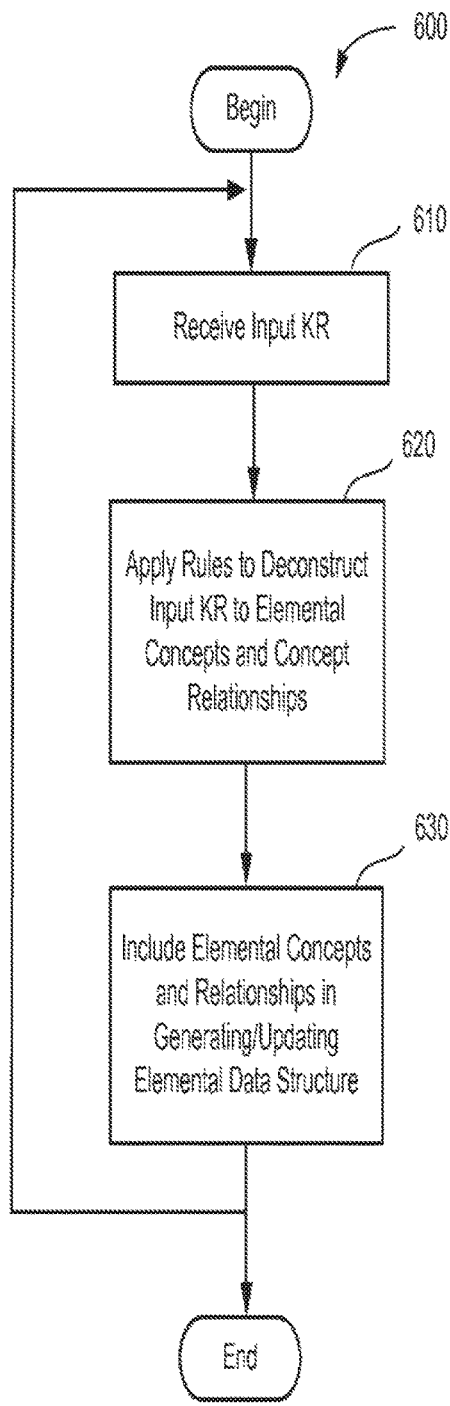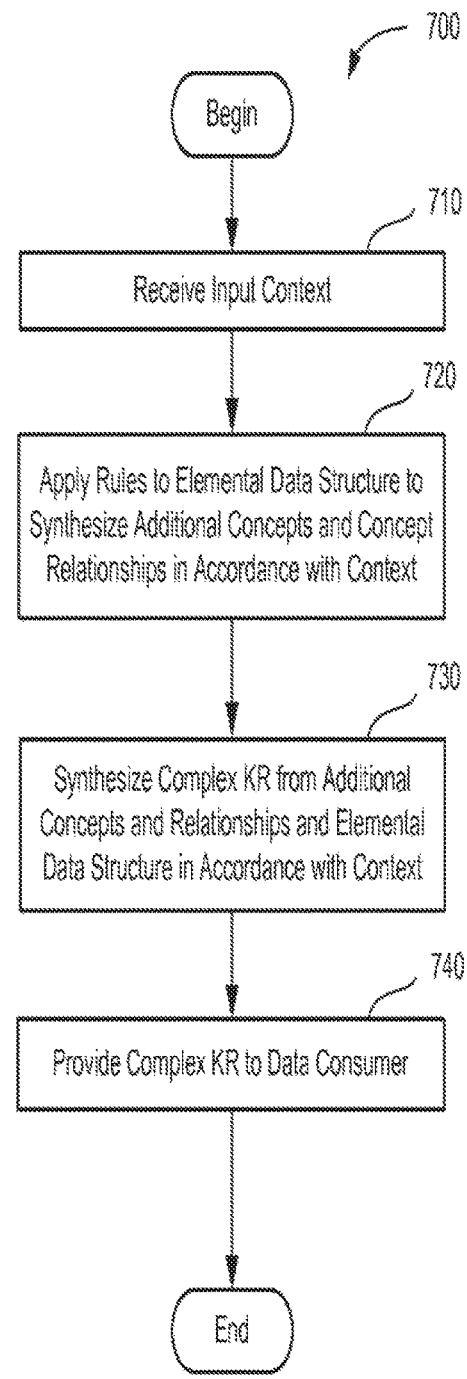
FIG. 6
FIG. 7

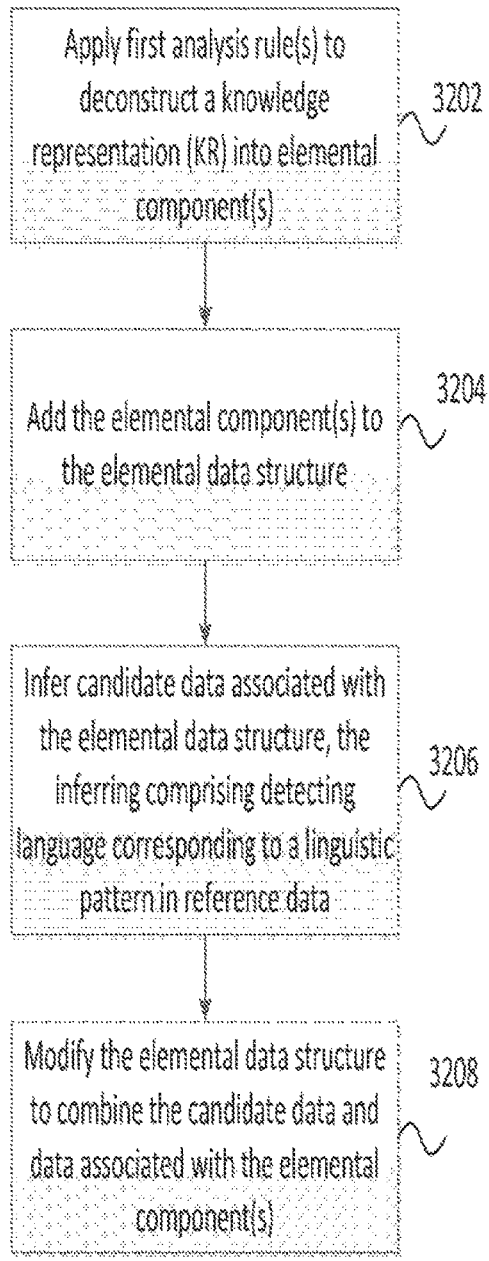
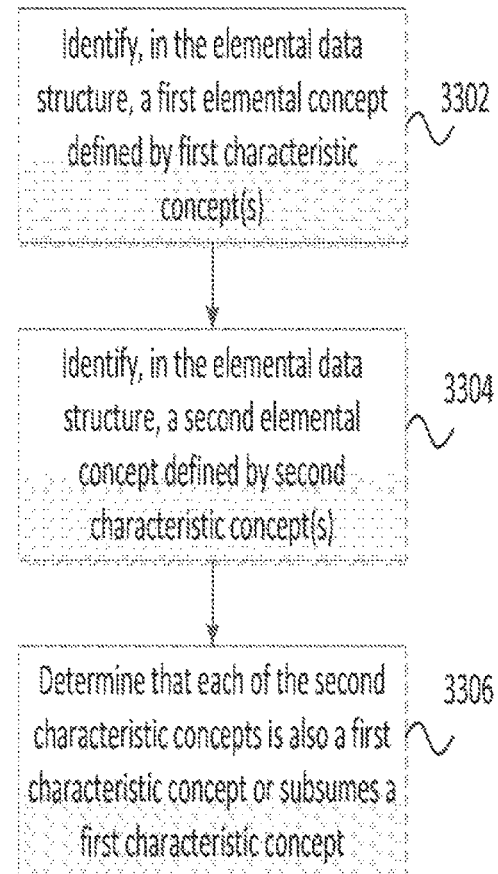
FIG. 25
FIG. 26

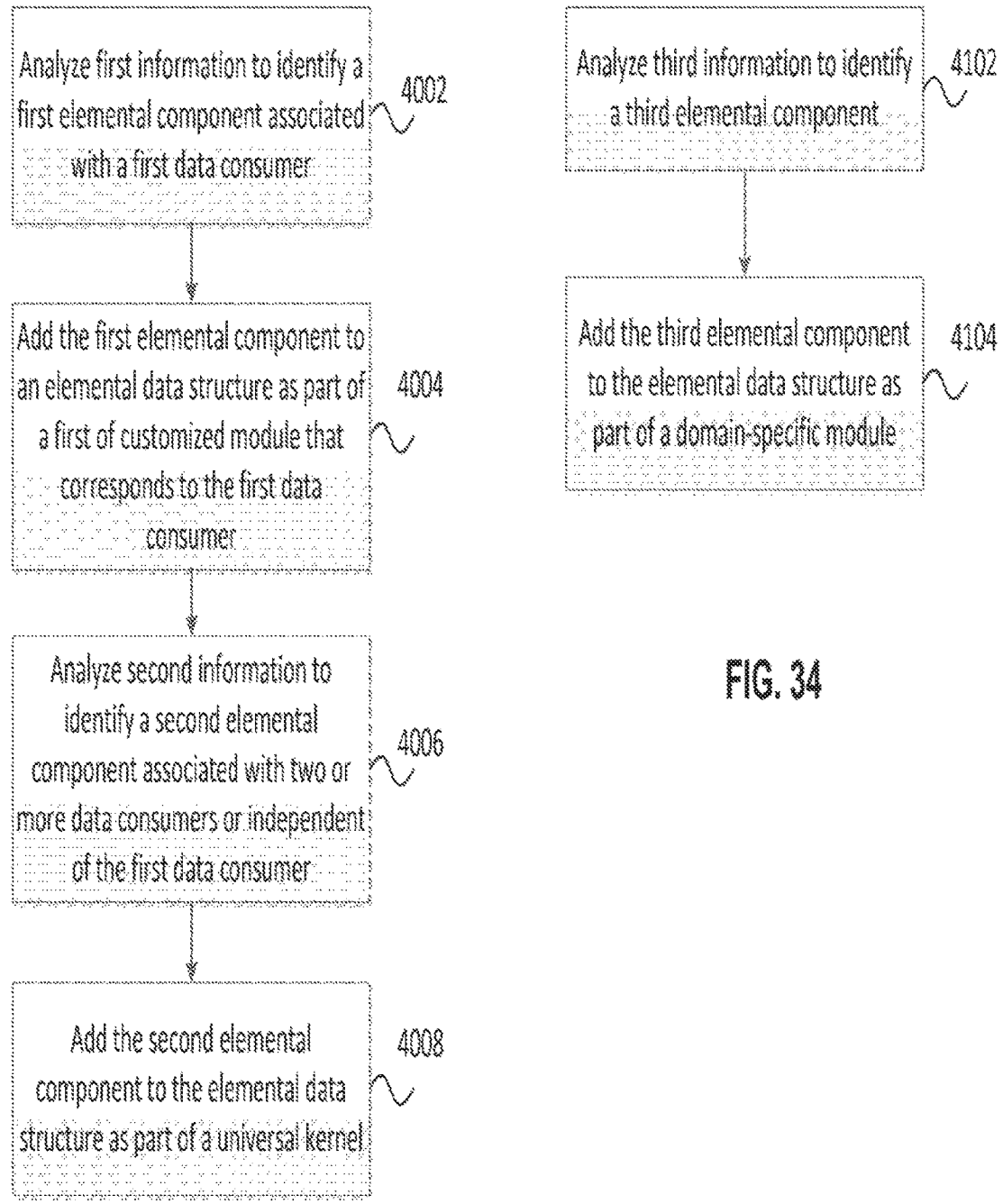

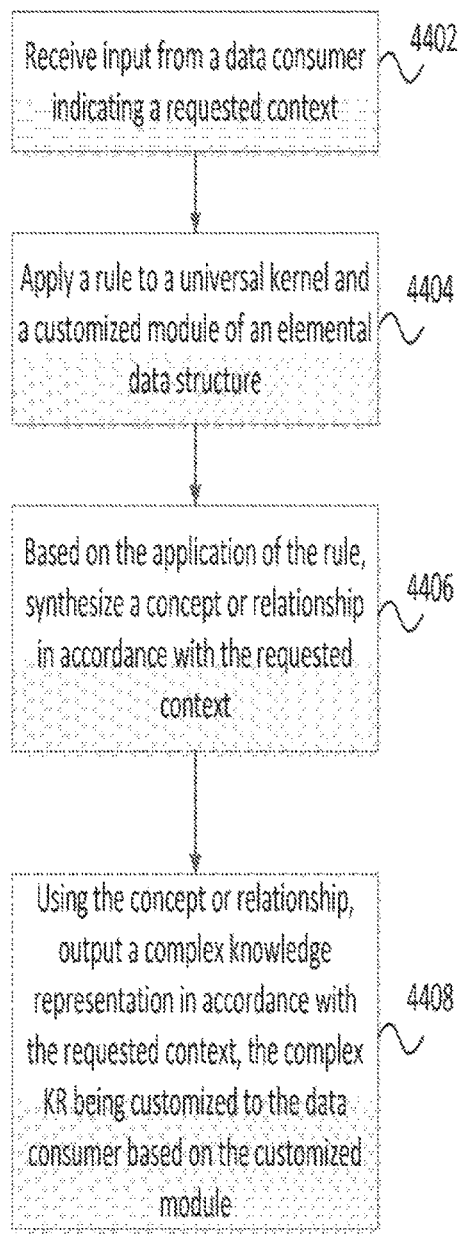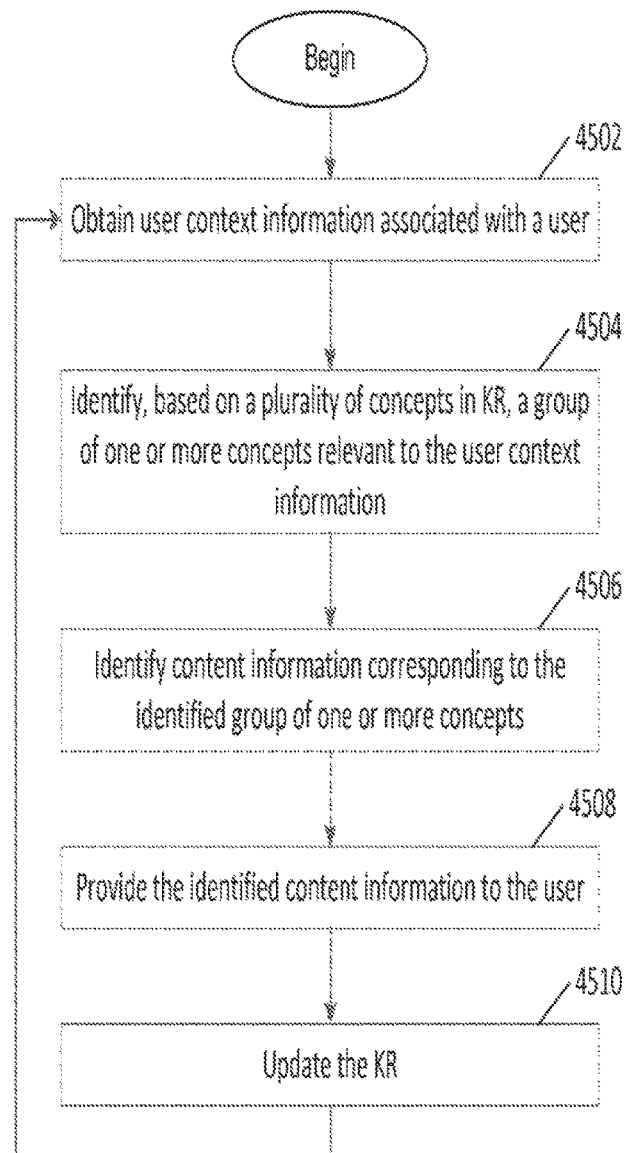
FIG. 37
FIG. 38

METHODS AND DEVICES FOR CUSTOMIZING KNOWLEDGE REPRESENTATION SYSTEMS

CROSS-REFERENCE TO RELATED APPLICATIONS

The present application is a continuation of U.S. patent application Ser. No. 15/403,761, titled "Methods and Devices for Customizing Knowledge Representation Systems", filed Jan. 11, 2017. U.S. patent application Ser. No. 15/403,761 is a continuation of U.S. patent application Ser. No. 14/961,819, titled "Methods and Devices for Customizing Knowledge Representation Systems", filed Dec. 7, 2015, which is incorporated herein by reference in its entirety. U.S. patent application Ser. No. 14/961,819 is a continuation of U.S. patent application Ser. No. 13/844,009, titled "Methods and Devices for Customizing Knowledge Representation Systems," filed Mar. 15, 2013, now issued as U.S. Pat. No. 9,235,806, which is incorporated herein by reference in its entirety. U.S. patent application Ser. No. 13/844,009 is a continuation-in-part of U.S. patent application Ser. No. 13/609,218, titled "Knowledge Representation Systems and Methods Incorporating Customization," filed Sep. 10, 2012, and a continuation-in-part of U.S. patent application Ser. No. 13/609,223, titled "Knowledge Representation Systems and Methods Incorporating Customization," filed Sep. 10, 2012, and a continuation-in-part of U.S. patent application Ser. No. 13/609,225, titled "Knowledge Representation Systems and Methods Incorporating Customization," filed Sep. 10, 2012. U.S. patent application Ser. No. 13/844,009 also claims a priority benefit under 35 U.S.C. § 119(e) of U.S. Provisional Patent Application No. 61/751,571, titled "Methods and Apparatus for Semantic Disambiguation Using a Graph of a Knowledge Representation", filed Jan. 11, 2013, U.S. Provisional Patent Application No. 61/751,594, titled "Methods and Apparatus for Semantic Disambiguation Using Dominance and Semantic Coherence," filed Jan. 11, 2013, U.S. Provisional Patent Application No. 61/751,623, titled "Methods and Apparatus for Calculating a Measure of Semantic Coherence," filed Jan. 11, 2013, and U.S. Provisional Patent Application No. 61/751,659, titled "Methods and Apparatus for Identifying Concepts Corresponding to Input Information," filed Jan. 11, 2013.

Each of U.S. patent application Ser. Nos. 13/609,218, 13/609,223, and 13/609,225 is a continuation-in-part of U.S. patent application Ser. No. 13/345,637, titled "Knowledge Representation Systems and Methods Incorporating Data Consumer Models and Preferences," filed Jan. 6, 2012. Each of U.S. patent application Ser. Nos. 13/609,218, 13/609,223, and 13/609,225 is also a continuation-in-part of U.S. patent application Ser. No. 13/340,792, titled "Methods and Apparatus for Providing Information of Interest to One or More Users," filed Dec. 30, 2011.

U.S. patent application Ser. No. 13/345,637 claims a priority benefit under 35 U.S.C. § 119(e) of U.S. Provisional Patent Application No. 61/430,836, titled "Constructing Knowledge Representations Using Atomic Semantics and Probabilistic Model," filed Jan. 7, 2011, U.S. Provisional Patent Application No. 61/430,810, titled "Probabilistic Approach for Synthesis of a Semantic Network," filed Jan. 7, 2011, and U.S. Provisional Patent Application No. 61/471,964, titled "Methods and Systems for Modifying Knowledge Representations Using Textual Analysis Rules," filed Apr. 5, 2011, U.S. Provisional Patent Application No. 61/498,899, titled "Method and Apparatus for Preference Guided Data Exploration," filed Jun. 20, 2011, and U.S. Provisional Patent Application No. 61/532,330, titled "Systems and Methods for Incorporating User Models and Preferences Into Analysis and Synthesis of Complex Knowledge Representations," filed Sep. 8, 2011.

U.S. patent application Ser. No. 13/345,637 is a continuation-in-part of U.S. patent application Ser. No. 13/165,423, titled "Systems and Methods for Analyzing and Synthesizing Complex Knowledge Representations," filed Jun. 21, 2011, which application claims a priority benefit under 35 U.S.C. § 119(e) to U.S. Provisional Patent Application No. 61/357,266, titled "Systems and Methods for Analyzing and Synthesizing Complex Knowledge Representations," filed Jun. 22, 2010. All of the foregoing applications are hereby incorporated by reference in their entireties.

FIELD OF INVENTION

The teachings disclosed herein relate to the field of information retrieval. In particular, the teachings disclosed herein relate to the deployment of methods, in a digital information system environment, for using information associated with a user or users together with one or more data sets expressed as knowledge representations in order to identify and provide information, from a larger set of digital content, that may be of interest to the user(s).

BACKGROUND

Information technology is often used to provide users with various types of information, such as text, audio, video, and any suitable other type of information. In some cases, information is provided to a user in response to an action that the user has taken. For example, information may be provided to a user in response to a search query input by the user or in response to the user's having subscribed to content such as an e-mail alert(s) or an electronic newsletter(s). In other cases, information is provided or "pushed" to a user without the user having specifically requested such information. For example, a user may occasionally be presented with advertisements or solicitations.

There is a vast array of content that can be provided to users via information technology. Indeed, because of the enormous volume of information available via the Internet, the World Wide Web (WWW), and any other suitable information provisioning sources, and because the available information is distributed across an enormous number of independently owned and operated networks and servers, locating information of interest to users presents challenges. Similar challenges exist when the information of interest is distributed across large private networks.

Search engines have been developed to aid users in locating desired content on the Internet. A search engine is a computer program that receives a search query from a user (e.g., in the form of a set of keywords) indicative of content desired by the user, and returns information and/or hyperlinks to information that the search engine determines to be relevant to the user's search query.

Search engines typically work by retrieving a large number of WWW web pages and/or other content using a computer program called a "web crawler" that explores the WWW in an automated fashion (e.g., following every hyperlink that it comes across in each web page that it browses). The located web pages and/or content are analyzed and information about the web pages or content is stored in an index. When a user or an application issues a search query to the search engine, the search engine uses the index to identify the web pages and/or content that it determines to best match the user's search query and returns a list of results with the best-matching web pages and/or content. Frequently, this list is in the form of one or more web pages that include a set of hyperlinks to the web pages and/or content determined to best match the user's search query.

SUMMARY

The inventive concepts presented herein are illustrated in a number of different embodiments, each showing one or more concepts, though it should be understood that, in general, the concepts are not mutually exclusive and may be used in combination even when not so illustrated.

Some embodiments provide for a method comprising obtaining user context information associated with a user; identifying, based on a plurality of concepts in a first knowledge representation (KR), a group of one or more concepts relevant to the user context information; and providing the identified group of one or more concepts to the user, wherein the first KR includes a combination of modules, the modules including a kernel and a customized module, the kernel being accessible via a second KR, the customized module being customized for the user, and wherein the identifying and the providing are performed at least in part by using at least one processor and a data structure representing the first KR.

Other embodiments provide for at least one non-transitory computer-readable storage medium storing processor executable instructions that, when executed by at least one processor, cause the at least one processor to perform a method comprising obtaining user context information associated with a user; identifying, based on a plurality of concepts in a first knowledge representation (KR), a group of one or more concepts relevant to the user context information; providing the identified group of one or more concepts to the user, wherein the first KR includes a kernel and a customized module, the kernel being accessible via a second KR, the customized module being customized for the user, and wherein the identifying and providing are performed at least in part by using a data structure representing the first KR.

Still other embodiments provide for a system comprising at least one processor configured to perform obtaining user context information associated with a user; identifying, based on a plurality of concepts in a first knowledge representation (KR), a group of one or more concepts relevant to the user context information; identifying content information corresponding to the identified group of one or more concepts; and providing the identified content information to the user, wherein the first KR includes a kernel and a customized module, the kernel accessible via by a second KR, the customized module being customized for the user, and wherein the identifying and providing are performed at least in part by using a data structure representing the first KR.

Still other embodiments provide for a system comprising at least one processor configured to perform obtaining user context information associated with a user; identifying, based on a plurality of concepts in a knowledge representation (KR), a group of one or more concepts relevant to the user context information; identifying content information corresponding to the identified group of one or more concepts; and providing the identified content information to the user, wherein the KR includes a kernel and a customized module, the kernel being shared by a second KR, the customized module being customized for the user, and wherein the identifying and providing are performed at least in part by using at least one processor and a data structure representing the KR.

One embodiment is directed to a method of modifying an elemental computer data structure. The elemental computer data structure includes a universal kernel and a plurality of customized modules. The plurality of customized modules correspond to a respective plurality of data consumers. The method comprises, with at least one processor executing stored program instructions: obtaining an indicator regarding an elemental component based on data associated with one or more of the plurality of customized modules; determining whether the indicator satisfies a criterion for performing a modification operation on the elemental computer data structure; and based on the indicator satisfying the criterion, performing the modification operation on the elemental computer data structure. A result provided by the elemental data structure for a first of the plurality of data consumers depends on the universal kernel and is customized for the first data consumer based on a first of the plurality of customized modules.

Another embodiment is directed to an apparatus for modifying an elemental computer data structure. The elemental computer data structure includes a universal kernel and a plurality of customized modules. The plurality of customized modules correspond to a respective plurality of data consumers. The apparatus includes one or more computer-readable media capable of storing the elemental computer data structure; and an analysis engine configured to obtain an indicator regarding an elemental component based on data associated with one or more of the plurality of customized modules. The analysis engine is also configured to determine whether the indicator satisfies a criterion for performing a modification operation on the elemental computer data structure; and based on the indicator satisfying the criterion, perform the modification operation on the elemental computer data structure. A result provided by the elemental data structure for a first of the plurality of data consumers depends on the universal kernel and is customized for the first data consumer based on a first of the plurality of customized modules.

Another embodiment is directed to a computer-readable medium storing instructions which, when executed by a processor, cause the processor to perform a method of modifying elemental computer data structure. The elemental computer data structure includes a universal kernel and a plurality of customized modules. The plurality of customized modules correspond to a respective plurality of data consumers. The method includes obtaining an indicator regarding an elemental component based on data associated with one or more of the plurality of customized modules; determining whether the indicator satisfies a criterion for performing a modification operation on the elemental computer data structure; and based on the indicator satisfying the criterion, performing the modification operation on the elemental computer data structure. A result provided by the elemental data structure for a first of the plurality of data consumers depends on the universal kernel and is customized for the first data consumer based on a first of the plurality of customized modules.

According to one aspect, there is provided a method comprising: using at least one processor to perform: providing, to a first set of one or more users, access to a first semantic network; providing, to a second set of one or more users, access to a second semantic network, wherein at least a second subset of the second semantic network has a same topology as at least a first subset of the first semantic network; and in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network, wherein each of the one or more first and second elements comprises a concept or a relationship, and wherein the first and second semantic networks are implemented as computer-readable data structures, and wherein modifying the second semantic network is performed by one or more processors executing computer-readable instructions.

According to another aspect, there is provided a knowledge representation system, comprising: one or more processors; and a memory unit configured to store instructions which, when executed by the one or more processors, cause the one or more processors to perform a method comprising: providing, to a first set of one or more users, access to a first semantic network; providing, to a second set of one or more users, access to a second semantic network, wherein at least a second subset of the second semantic network has a same topology as at least a first subset of the first semantic network; and in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network, wherein each of the one or more first and second elements comprises a concept or a relationship, and wherein the first and second semantic networks are implemented as computer-readable data structures, and wherein modifying the second semantic network is performed by one or more processors executing computer-readable instructions.

According to another aspect, there is provided a computer-readable storage medium storing processor-executable instructions which, when executed by one or more processors, cause the processors to perform a method comprising: providing, to a first set of one or more users, access to a first semantic network; providing, to a second set of one or more users, access to a second semantic network, wherein at least a second subset of the second semantic network has a same topology as at least a first subset of the first semantic network; and in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network, wherein each of the one or more first and second elements comprises a concept or a relationship, and wherein the first and second semantic networks are implemented as computer-readable data structures, and wherein modifying the second semantic network is performed by one or more processors executing computer-readable instructions.

The foregoing is a non-limiting summary of the invention, which is defined by the attached claims, it being understood that this summary does not necessarily describe the subject matter of each claim and that each claim is related to only one or some, but not all, embodiments.

BRIEF DESCRIPTION OF DRAWINGS

The accompanying drawings are not intended to be drawn to scale. Like elements are identified by the same or like reference designations when practical. For purposes of clarity, not every component may be labeled in every drawing. In the drawings:

FIG. 6 is a flowchart illustrating an exemplary method for analyzing complex knowledge representations to generate an elemental data structure in accordance with some embodiments of the present invention;

FIG. 7 is a flowchart illustrating an exemplary method for synthesizing complex knowledge representations from an elemental data structure in accordance with some embodiments of the present invention;

FIG. 25 is a flow chart of an exemplary process of modifying an elemental data structure based on inference;

FIG. 26 is a flow chart of an exemplar)' process of inferring candidate data associated with an elemental data structure;

FIG. 33 is a flow chart of an exemplary process of constructing an elemental data structure;

FIG. 34 is a flow chart of additional steps of an exemplary process of constructing an elemental data structure;

FIG. 37 is a flow chart of an exemplary process of generating a complex knowledge representation from an elemental data structure that includes a kernel and a customized module.

FIG. 38 is a flow chart of a process of operating a knowledge representation system, according to some embodiments.

DETAILED DESCRIPTION

Figure 1:
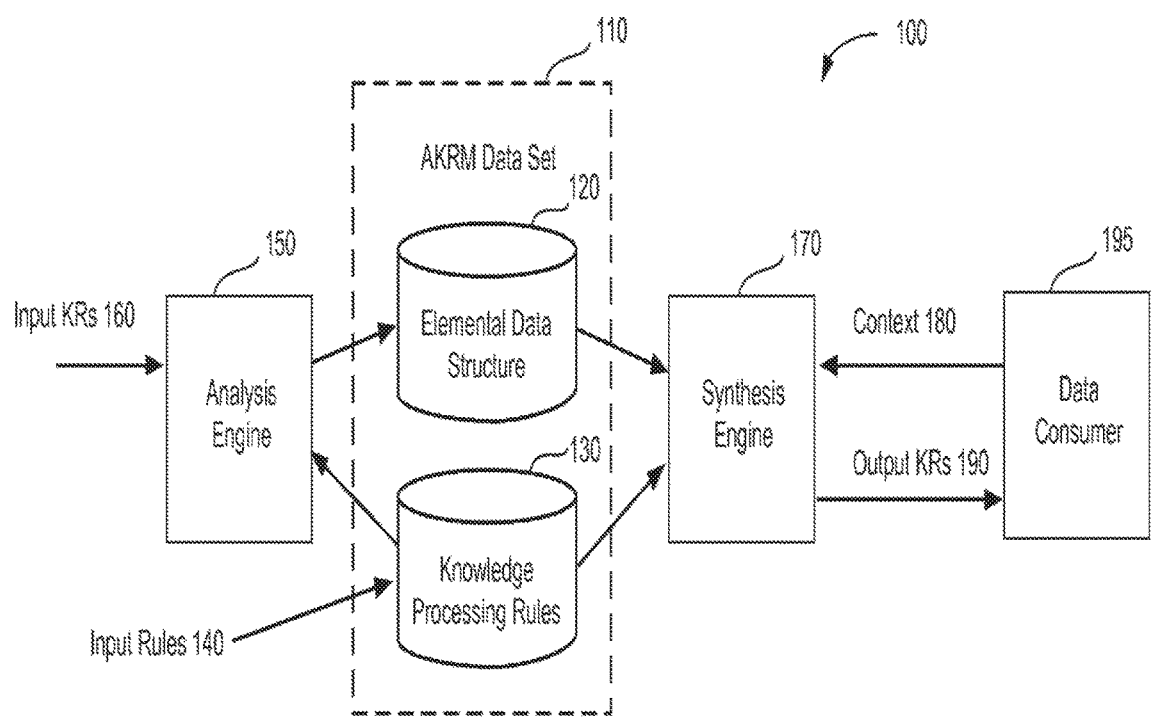
FIG. 1 is a block diagram illustrating an exemplary system for implementing an atomic knowledge representation model in accordance with some embodiments of the present invention.

As will be appreciated from the foregoing, various embodiments are disclosed. One embodiment is directed to a method for generating a complex knowledge representation, the method comprising receiving input indicating a request context; applying, with a processor, one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a system for generating a complex knowledge representation, the system comprising at least one non-transitory computer-readable storage medium storing processor-executable instructions that, when executed by at least one processor, perform receiving input indicating a request context, applying one or more rules to an elemental data structure representing at least one elemental concept, at least one elemental concept relationship, or at least one elemental concept and at least one elemental concept relationship, based on the application of the one or more rules, synthesizing, in accordance with the request context, one or more additional concepts, one or more additional concept relationships, or one or more additional concepts and one or more additional concept relationships, and using at least one of the additional concepts, at least one of the additional concept relationships, or at least one of the additional concepts and at least one of the additional concept relationships, generating a complex knowledge representation in accordance with the request context.

Another embodiment is directed to at least one non-transitory computer-readable storage medium encoded with a plurality of computer-executable instructions for generating a complex knowledge representation, wherein the instructions, when executed, perform receiving input indicating a request context; applying one or more rules to an elemental data structure representing at least one elemental concept, at least one elemental concept relationship, or at least one elemental concept and at least one elemental concept relationship; based on the application of the one or more rules, synthesizing, in accordance with the request context, one or more additional concepts, one or more additional concept relationships, or one or more additional concepts and one or more additional concept relationships; and using at least one of the additional concepts, at least one of the additional concept relationships, or at least one of the additional concepts and at least one of the additional concept relationships, generating a complex knowledge representation in accordance with the request context.

Another embodiment is directed to a method for deconstructing an original knowledge representation, the method comprising receiving input corresponding to the original knowledge representation; applying, with a processor, one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a system for deconstructing an original knowledge representation, the system comprising at least one non-transitory computer-readable storage medium storing processor-executable instructions that, when executed by at least one processor, perform receiving input corresponding to an original knowledge representation, applying one or more rules to deconstruct the original knowledge representation into one or more elemental concepts, one or more elemental concept relationships, or one or more elemental concepts and one or more elemental concept relationships, and including representation of at least one of the elemental concepts, at least one of the elemental concept relationships, or at least one of the elemental concepts and at least one of the elemental concept relationships in an elemental data structure.

Another embodiment is directed to at least one non-transitory computer-readable storage medium encoded with a plurality of computer-executable instructions for deconstructing an original knowledge representation, wherein the instructions, when executed, perform receiving input corresponding to the original knowledge representation; applying one or more rules to deconstruct the original knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships in an elemental data structure.

Another embodiment is directed to a method for supporting semantic interoperability between knowledge representations, the method comprising, for each input knowledge representation of a plurality of input knowledge representations, applying, with a processor, one or more rules to deconstruct the input knowledge representation into one or more elemental concepts, one or more elemental concept relationships, or one or more elemental concepts and one or more elemental concept relationships; and with a processor, including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to a system for supporting semantic interoperability between knowledge representations, the system comprising at least one non-transitory computer-readable storage medium storing processor-executable instructions that, when executed by at least one processor, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

Another embodiment is directed to at least one non-transitory computer-readable storage medium encoded with a plurality of computer-executable instructions for supporting semantic interoperability between knowledge representations, wherein the instructions, when executed, perform, for each input knowledge representation of a plurality of input knowledge representations, applying one or more rules to deconstruct the input knowledge representation into one or more elemental concepts, one or more elemental concept relationships, or one or more elemental concepts and one or more elemental concept relationships; and including representation of at least one of the elemental concepts, at least one of the elemental concept relationships, or at least one of the elemental concepts and at least one of the elemental concept relationships for each of the plurality of input knowledge representations in a shared elemental data structure.

One aspect of this disclosure relates to a method of processing a knowledge representation based at least in part on context information. In some embodiments, the context information may comprise preference information, and the method may comprise synthesizing a complex knowledge representation based at least in part on the preference information. In some embodiments, the preference information may comprise a preference model or may be used to create a preference model. In some embodiments, the preference model may contain weights assigned to concepts based on the preference information.

In some embodiments of this aspect of the disclosure, the method may comprise synthesizing, during formation of the complex knowledge representation, more concepts that are related to a more heavily-weighted concept in the preference model, and synthesizing fewer concepts that are related to a less heavily-weighted concept in the preference model. In some embodiments, the method may comprise synthesizing, during formation of the complex knowledge representation, concepts that are related to a more heavily-weighted concept in the preference model before synthesizing concepts that are related to a less heavily-weighted concept in the preference model.

In some embodiments of this aspect of the disclosure, the method may comprise assigning rankings to the synthesized concepts in accordance with the preference information. In some embodiments, the method may comprise delivering the synthesized concepts to a user interface or a data consumer model in rank order.

Another aspect of this disclosure relates to a computer readable storage medium encoded with instructions that, when executed on a computer, cause the computer to implement some embodiment(s) of the aforementioned method.

Another aspect of this disclosure relates to a system for processing a knowledge representation based at least in part on user information. In some embodiments, the system may comprise a synthesis engine (e.g., programmed processor(s)) configured to synthesize a complex knowledge representation based at least in part on preference information. In some embodiments, the system may comprise a preference engine (e.g., programmed processor(s)) configured to provide a preference model based at least in part on the preference information. In some embodiments, the preference model may contain weights assigned to concepts based on the preference information.

In some embodiments of this aspect of the disclosure, the synthesis engine may be configured to synthesize, during formation of the complex knowledge representation, more concepts that are related to a more heavily-weighted concept in the preference model, and configured to synthesize fewer concepts that are related to a less heavily-weighted concept in the preference model. In some embodiments, the synthesis engine may, during formation of the complex knowledge representation, be configured to synthesize concepts in the complex knowledge representation that are related to a more heavily-weighted concept in the preference model before synthesizing concepts in the complex knowledge representation that are related to a less heavily-weighted concept in the preference model.

In some embodiments of this aspect of the disclosure, the preference engine may be configured to assign rankings to the synthesized concepts in accordance with the preference information. In some embodiments, the preference engine may be configured to deliver the synthesized concepts to a user interface or a data consumer model in rank order.

The sheer volume of content accessible via digital information systems presents a number of information retrieval problems. One challenging problem is how to determine what information, in a large set of content, may be of interest to users so that such information may be presented to the users without overwhelming them with irrelevant information. Accordingly, the inventors have recognized the need for techniques for identifying information of interest to users in a large set of content and presenting such content to the users.

I. Atomic Knowledge Representation Model (AKRM)

Knowledge representation relates to making abstract knowledge explicit, as data structures, to support machine-based storage, management (e.g., information location and extraction), and reasoning systems. Conventional methods and systems exist for utilizing knowledge representations (KRs) constructed in accordance with various types of knowledge representation models, including structured controlled vocabularies such as taxonomies, thesauri and faceted classifications; formal specifications such as semantic networks and ontologies; and unstructured forms such as documents based in natural language.

A taxonomy is a KR structure that organizes categories into a hierarchical tree and associates categories with relevant objects such as physical items, documents or other digital content. Categories or concepts in taxonomies are typically organized in terms of inheritance relationships, also known as supertype-subtype relationships, generalization-specialization relationships, or parent-child relationships. In such relationships, the child category or concept has the same properties, behaviors and constraints as its parent plus one or more additional properties, behaviors or constraints. For example, the statement of knowledge, "a dog is a mammal," can be encoded in a taxonomy by concepts/categories labeled "mammal" and "dog" linked by a parent-child hierarchical relationship. Such a representation encodes the knowledge that a dog (child concept) is a type of mammal (parent concept), but not every mammal is necessarily a dog.

A thesaurus is a KR representing terms such as search keys used for information retrieval, often encoded as single-word noun concepts. Links between terms/concepts in thesauri are typically divided into the following three types of relationships: hierarchical relationships, equivalency relationships and associative relationships. Hierarchical relationships are used to link terms that are narrower and broader in scope than each other, similar to the relationships between concepts in a taxonomy. To continue the previous example, "dog" and "mammal" are terms linked by a hierarchical relationship. I equivalency relationships link terms that can be substituted for each other as search terms, such as synonyms or near-synonyms. For example, the terms "dog" and "canine" could be linked through an equivalency relationship in some contexts. Associative relationships link related terms whose relationship is neither hierarchical nor equivalent. For example, a user searching for the term "dog" may also want to see items returned from a search for "breeder", and an associative relationship could be encoded in the thesaurus data structure for that pair of terms.

Faceted classification is based on the principle that information has a multi-dimensional quality, and can be classified in many different ways. Subjects of an informational domain are subdivided into facets (or more simply, categories) to represent this dimensionality. The attributes of the domain are related in facet hierarchies. The objects within the domain are then described and classified based on these attributes. For example, a collection of clothing being offered for sale in a physical or web-based clothing store could be classified using a color facet, a material facet, a style facet, etc., with each facet having a number of hierarchical attributes representing different types of colors, materials, styles, etc. Faceted classification is often used in faceted search systems, for example to allow a user to search the collection of clothing by any desired ordering of facets, such as by color-then-style, by style-then-color, by material-then-color-then-style, or by any other desired prioritization of facets. Such faceted classification contrasts with classification through a taxonomy, in which the hierarchy of categories is fixed.

A semantic network is a KR that represents various types of semantic relationships between concepts using a network structure (or a data structure that encodes or instantiates a network structure). A semantic network is typically represented as a directed or undirected graph consisting of vertices representing concepts, and edges representing relationships linking pairs of concepts. An example of a semantic network is WordNet, a lexical database of the English language. Some common types of semantic relationships defined in WordNet are meronymy (A is part of B), hyponymy (A is a kind of B), synonymy (A denotes the same as B) and antonymy (A denotes the opposite of B). References to a sematic network or other KRs as being represented by a graph should be understood as indicating that a semantic network or other KR may be encoded into a data structure in a computer-readable memory or file or similar organization, wherein the structure of the data storage or the tagging of data therein serves to identify for each datum its significance to other data—e.g., whether it is intended as the value of a node or an end point of an edge or the weighting of an edge, etc.

An ontology is a KR structure encoding concepts and relationships between those concepts that is restricted to a particular domain of the real or virtual world that it is used to model. The concepts included in an ontology typically represent the particular meanings of terms as they apply to the domain being modeled or classified, and the included concept relationships typically represent the ways in which those concepts are related within the domain. For example, concepts corresponding to the word "card" could have different meanings in an ontology about the domain of poker and an ontology about the domain of computer hardware.

In general, all of the above-discussed types of KRs, as well as other conventional examples, are tools for modeling human knowledge in terms of abstract concepts and the relationships between those concepts, and for making that knowledge accessible to machines such as computers for performing various knowledge-requiring tasks. As such, human users and software developers conventionally construct KR data structures using their human knowledge, and manually encode the completed KR data structures into machine-readable form as data structures to be stored in machine memory and accessed by various machine-executed functions.

As discussed above, a knowledge representation (KR) data structure created through conventional methods encodes and represents a particular set of human knowledge being modeled for a particular domain or context. As KRs are typically constructed by human developers and programmed in completed form into machine memory, a conventional KR contains only that subset of human knowledge with which it is originally programmed by a human user.

For example, a KR might encode the knowledge statement, "a dog is a mammal," and it may also express statements or assertions about animals that are mammals, such as, "mammals produce milk to feed their young." Such a combination of facts, when combined with appropriate logical and semantic rules, can support a broad range of human reasoning, making explicit various inferences that were not initially seeded as fact within the KR, such as, "dogs produce milk to feed their young." Expansions of KR data structures through such inferences may be used to support a variety of knowledge-based activities and tasks, such as inference/reasoning (as illustrated above), information retrieval, data mining, and other forms of analysis.

However, as discussed above, methods for constructing and encoding KRs have conventionally been limited to manual input of complete KR structures for access and use by machines such as computers. Continuing the example above, although a human person acting as the KR designer may implicitly understand why the fact "dogs produce milk to feed their young" is true, the properties that must hold to make it true (in this case, properties such as transitivity and inheritance) are not conventionally an explicit part of the KR. In other words, any underlying set of rules that may guide the creation of new knowledge is not conventionally encoded as part of the KR, but rather is applied from outside the system in the construction of the KR by a human designer.

A previously unrecognized consequence of conventional approaches is that knowledge can be expressed in a KR for use by machines, but the KR itself cannot be created by machines. Humans are forced to model domains of knowledge for machine consumption. Unfortunately, because human knowledge is so tremendously broad and in many cases subjective, it is not technically feasible to model all knowledge domains.

Furthermore, since so much of the knowledge must be explicitly encoded as data, the resulting data structures quickly become overwhelmingly large as the domain of knowledge grows. Since conventional KRs are not encoded with their underlying theories or practices for knowledge creation as part of the data making up the knowledge representation model, their resulting data structures can become very complex and unwieldy. In other words, since the knowledge representation cannot be created by the machine, it conventionally must either be provided as explicit data or otherwise deduced or induced by logical or statistical means.

Thus, conventional approaches to constructing knowledge representations may lead to a number of problems including difficulty scaling as data size increases, difficulty dealing with complex and large data structures, dependence on domain experts, high costs associated with large-scale data storage and processing, challenges related to integration and interoperability, and high labor costs.

Large and complex data structures: The data structures that conventionally encode knowledge representations are complex to build and maintain. Even a relatively simple domain of machine-readable knowledge (such as simple statements about dogs and mammals) can generate a volume of data that is orders of magnitude greater than its natural language counterpart.

Dependency on domain experts: The underlying theories that direct the practice of KR must be expressed by human beings in the conventional creation of a KR data structure. This is a time-consuming activity that excludes most people and all machines in the production of these vital data assets. As a result, most of human knowledge heretofore has remained implicit and outside the realm of computing.

Data created before use; Knowledge is conventionally modeled as data before such time as it is called for a particular use, which is expensive and potentially wasteful if that knowledge is not needed. Accordingly, if the knowledge could be created by machines as needed, it could greatly decrease data production and storage requirements.

Large-scale data and processing costs; Conventional KR systems must reason over very large data structures in the service of creating new facts or answering queries. This burden of scale represents a significant challenge in conventional KR systems, a burden that could be reduced by using more of a just-in-time method for creating the underlying data structures, rather than the conventional data-before-use methods.

Integration and interoperability challenges; Semantic interoperability (the ability for two different KRs to share knowledge) is a massively difficult challenge when various KRs are created under different models and expressed in different ways, often dealing with subjective and ambiguous subjects. Precision and the ability to reason accurately are often lost across multiple different KRs. In this respect, if the underlying theories for how the knowledge was created were included as part of the KR, then reconciliation of knowledge across different KRs may become a tractable problem.

High labor costs; Manual construction of a KR data structure may be a labor-intensive process. Accordingly, manual construction techniques may be insufficient to handle a corpus of information that is already enormous and continually increasing in size.

Accordingly, some embodiments in accordance with the present disclosure provide a system that encodes knowledge creation rules to automate the process of creating knowledge representations. Some embodiments employ probabilistic methods to assist in the creation of knowledge representations and/or to check their semantic coherence. Some embodiments combine new synthetic approaches to knowledge representation with computing systems for creating and managing the resulting data structures derived from such approaches. In some embodiments, an estimate of a semantic coherence of first and second concepts having first and second labels, respectively, may be obtained by calculating a frequency of co-occurrence of the first and second labels in a corpus of reference documents.

Rather than modeling all the knowledge in the domain as explicit data, some embodiments combine a less voluminous data set of 'atomic' or 'elemental' data with a set of generative rules that encode the underlying knowledge creation. Such rules may be applied by the system in some embodiments when needed or desired to create new knowledge and express it explicitly as data. It should be appreciated from the above discussion that a benefit of such techniques may be, in at least some situations, to reduce the amount of data in the system substantially, as well as to provide new capabilities and applications for machine-based creation (synthesis) of new knowledge. However, it should be appreciated that not every embodiment in accordance with the present invention may address every identified problem of conventional approaches, and some embodiments may not address any of these problems. Some embodiments may also address problems other than those recited here. Moreover, not every embodiment may provide all or any of the benefits discussed herein, and some embodiments may provide other benefits not recited.

Some embodiments also provide techniques for complex knowledge representations such as taxonomies, ontologies, and faceted classifications to interoperate, not just at the data level, but also at the semantic level (interoperability of meaning).

Other benefits that may be afforded in some embodiments and may be applied across many new and existing application areas include: lower costs in both production and application of knowledge representations afforded by simpler and more economical data structures; possibilities for new knowledge creation; more scalable systems afforded by just-in-time, as-needed knowledge; and support of "context" from users and data consumers as input variables. The dynamic nature of some embodiments in accordance with the present disclosure, which apply synthesis and analysis knowledge processing rules on a just-in-time basis to create knowledge representation data structures, may provide more economical benefits than conventional methods that analyze and model an entire domain of knowledge up front.

By incorporating an underlying set of rules of knowledge creation within the KR, the amount of data in the system may be reduced, providing a more economical system of data management, and providing entirely new applications for knowledge management. Thus, in some embodiments, the cost of production and maintenance of KR systems may be lowered by reducing data scalability burdens, with data not created unless it is needed. Once created, the data structures that model the complex knowledge in some embodiments are comparatively smaller than in conventional systems, in that they contain the data relevant to the task at hand. This in turn may reduce the costs of downstream applications such as inference engines or data mining tools that work over these knowledge models.

The synthetic, calculated approach of some embodiments in accordance with the present disclosure also supports entirely new capabilities in knowledge representation and data management. Some embodiments may provide improved support for "possibility", i.e., creating representations of entirely new knowledge out of existing data. For example, such capability of possibility may be useful for creative activities such as education, journalism, and the arts.

Customization of a knowledge representation for multiple users presents additional challenges. A knowledge representation, whether manually constructed or automatically constructed, may encode universal knowledge associated with a population of users, without encoding the knowledge that is specific to individual users. For example, a knowledge representation may indicate that two concepts share a label "cricket," where one of these concepts is relevant to the concept "insect" and another to the concept "sport." This knowledge representation may not indicate that a first user (e.g., an entomologist) strongly associates in his or her mind the concept "cricket" with the concept "insect," while a second user (e.g., an avid fan of cricket matches) strongly associates in his or her mind the concept "cricket" with the concept "sport."

An insufficiently customized knowledge representation may lead to poor user experiences with the knowledge representation system. To continue the previous example, the entomologist may become dissatisfied with the KR system if the KR system consistently responds to queries about "cricket" with information about international cricket players rather than information about insects. Also, customization of a KR may be beneficial to e-commerce entities (e.g., advertisers or businesses) that seek to target individual users with customized advertisements, offers, web sites, prices, etc.

Accordingly, the inventors have recognized and appreciated that methods and systems for customizing knowledge representations to a user may improve the user's experience with a KR system.

Figure 8:
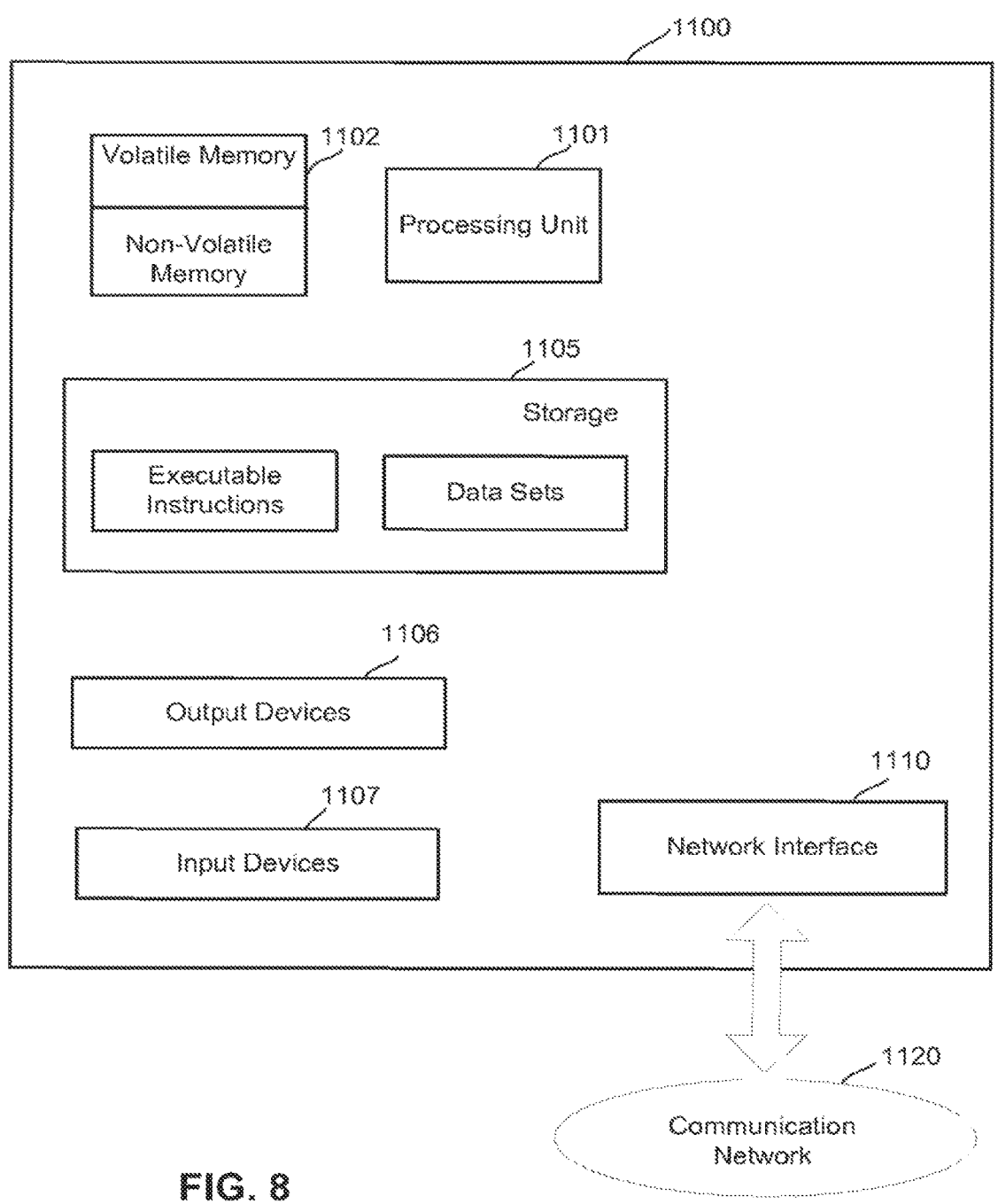
FIG. 8 is a block diagram illustrating an exemplary computing system for use in practicing some embodiments of the present invention.

Various inventive aspects described herein may be implemented by one or more computers and/or devices each having one or more processors that may be programmed to take any of the actions described herein for using an atomic knowledge representation model in analysis and synthesis of complex knowledge representations. For example, FIG. 8 shows, schematically, an illustrative computer 1100 on which various inventive aspects of the present disclosure may be implemented. The computer 1100 includes a processor or processing unit 1101 and a memory 1102 that may include volatile and/or non-volatile memory. The memory 1102 may store computer-readable instructions which, when executed on processor 1101, cause the computer to perform the inventive techniques described herein. Techniques for implementing the inventive aspects described herein, e.g. programming a computer to implement the methods and data structures described herein, are believed to be within the skill in the art.

FIG. 1 illustrates an exemplary system 100 that may be employed in some embodiments for implementing an atomic knowledge representation model (AKRM) involved in analysis and synthesis of complex knowledge representations (KRs), in accordance with some embodiments of the present invention. In an exemplary system 100, an AKRM may be encoded as computer-readable data and stored on one or more tangible, non-transitory computer-readable storage media. For example, an AKRM may be stored in a data set 110 in non-volatile computer memory, examples of which are given below, with a data schema designed to support both elemental and complex knowledge representation data structures.

In some embodiments, an AKRM may include one or more elemental data structures 120 and one or more knowledge processing rules 130. In some embodiments, rules 130 may be used by system 100 to deconstruct (analyze) one or more complex KRs to generate an elemental data structure 120. For example, system 100 may include one or more computer processors and one or more computer memory hardware components, and the memory may be encoded with computer-executable instructions that, when executed by the one or more processors, cause the one or more processors of system 100 to use the rules 130 in the analysis of one or more complex KRs to generate elemental data structure 120 of the AKRM. The memory may also be encoded with instructions that program the one or more processors to use the rules 130 to synthesize new complex KRs from elemental data structure 120. In some embodiments, the computer memory may be implemented as one or more tangible, non-transitory computer-readable storage media encoded with computer-executable instructions that, when executed, cause one or more processors to perform any of the functions described herein.

Unlike previous knowledge representation systems, a system in accordance with some embodiments of the present invention, such as system 100, may combine data structures and knowledge processing rules to create knowledge representation models encoded as data. In some embodiments, rules may not be encoded as knowledge (e.g., as rules or axioms that describe the boundaries or constraints of knowledge within a particular domain), but rather as constructive and deconstructive rules for creating the data structures that represent new knowledge. In addition to "inference rules" for generating implicit facts that are logical consequences of the explicit concepts given by an original KR, in some embodiments a knowledge representation model may be encoded with "knowledge processing rules" that can be applied to create new knowledge that may not be implicit from the original KR data structure.

For example, starting with two explicit knowledge statements, "Mary is a person," and, "All people are humans," inference rules may be applied to determine the implicit knowledge statement, "Mary is a human," which is a logical consequence of the previous two statements. In a different example in accordance with some embodiments of the present invention, starting with two explicit knowledge statements, "Mary is a friend of Bob," and, "Bob is a friend of Charlie," exemplary knowledge processing rules modeling the meaning of friendship relationships may be applied to determine the new knowledge statement. "Mary is a friend of Charlie." Notably, application of such knowledge processing rules may result in new knowledge that is not necessarily a logical consequence of the explicit knowledge given in an original input KR. As described above, a knowledge representation model in accordance with some embodiments of the present invention, including knowledge processing rules (as opposed to or in addition to logical inference rules) stored in association with data structures encoding concepts and concept relationships, may model frameworks of how new and potentially non-implicit knowledge can be created and/or decomposed.

Such focus on the synthesis of knowledge may move a system such as system 100 into new application areas. Whereas existing systems focus on deductive reasoning (i.e., in which insights are gleaned through precise deductions of existing facts and arguments), a system in accordance with some embodiments of the present invention may support inductive reasoning as well as other types of theory-building (i.e. in which existing facts may be used to support probabilistic predictions of new knowledge).

In some embodiments in accordance with the present invention, a system such as system 100 may be based loosely on frameworks of conceptual semantics, encoding semantic primitives (e.g., "atomic" or "elemental" concepts) and rules (principles) that guide how such atomic structures can be combined to create more complex knowledge. It should be appreciated, however, that a system in accordance with embodiments of the present invention may function within many such frameworks, as aspects of the present invention are not limited to any particular theory, model or practice of knowledge representation. In some embodiments, a system such as system 100 may be designed to interface with a broad range of methods and technologies (e.g., implemented as software applications or components) that model these frameworks. For example, interfacing analysis components such as analysis engine 150 may deconstruct input complex KRs 160 to elemental data structures 120. Synthesis components such as synthesis engine 170 may construct new output complex KRs 190 using elemental data structures 120.

The synthesis engine 170 may provide an output KR 190 using techniques known in the art or any other suitable techniques. For example, output KR 190 may be provided as a tabular or graphical data structure stored in a computer-readable medium. Alternatively or additionally, output KR 190 may be displayed on a monitor or any other suitable interlace.

In some embodiments, analysis engine 150 may, for example through execution of appropriate computer-readable instructions by one or more processors of system 100, analyze an input complex KR 160 by applying one or more of the knowledge processing rules 130 to deconstruct the data structure of the input KR 160 to more elemental constructs. In some embodiments, the most elemental constructs included within the elemental data structure 120 of AKRM 110 may represent a minimum set of fundamental building blocks of information and information relationships which in the aggregate provide the information-carrying capacity with which to classify the input data structure. Input KR 160 may be obtained from any suitable source, including direct input from a user or software application interacting with system 100. In some embodiments, input KRs 160 may be obtained through interfacing with various database technologies, such as a relational or graph-based database system. It should be appreciated that input KRs 160 may be obtained in any suitable way in any suitable form, as aspects of the present invention are not limited in this respect.

Figure 2A:
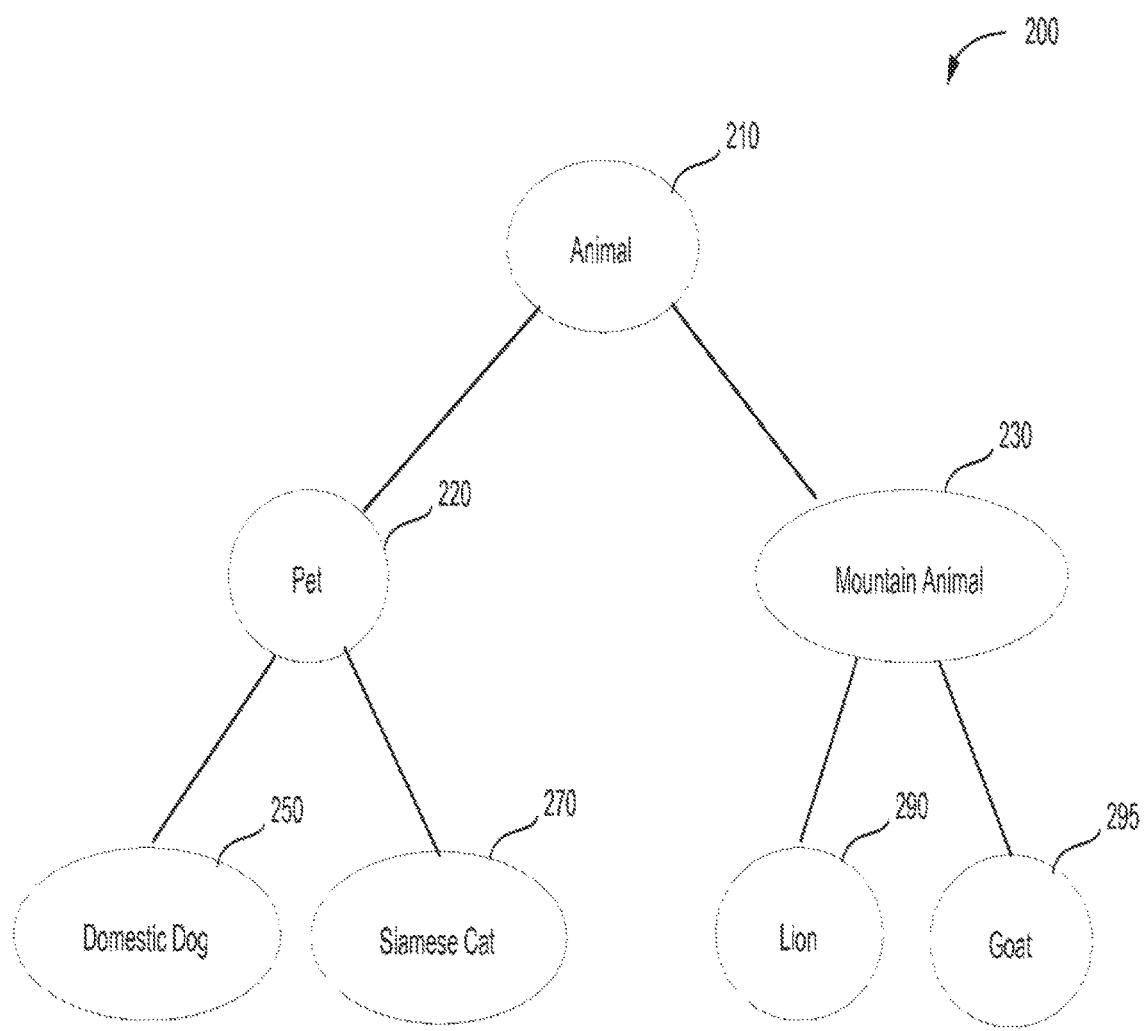
FIG. 2A illustrates an exemplary complex knowledge representation in accordance with some embodiments of the present invention.

For example, FIG. 2A illustrates a small complex KR 200 (in this example, a taxonomy) that may be input to analysis engine 150, e.g., by a user or a software application using system 100. Complex KR 200 includes a set of concepts linked by various hierarchical relationships. For example, concept 210 labeled "Animal" is linked in parent-child relationships to concept 220 labeled "Pet" and concept 230 labeled "Mountain Animal". At each level of the hierarchy, a concept entity represents a unit of meaning that can be combined to create more complex semantics or possibly deconstructed to more elemental semantics. For example, the complex meaning of "Mountain Animal" may comprise the concepts "Mountain" and "Animal".

Figure 2B:
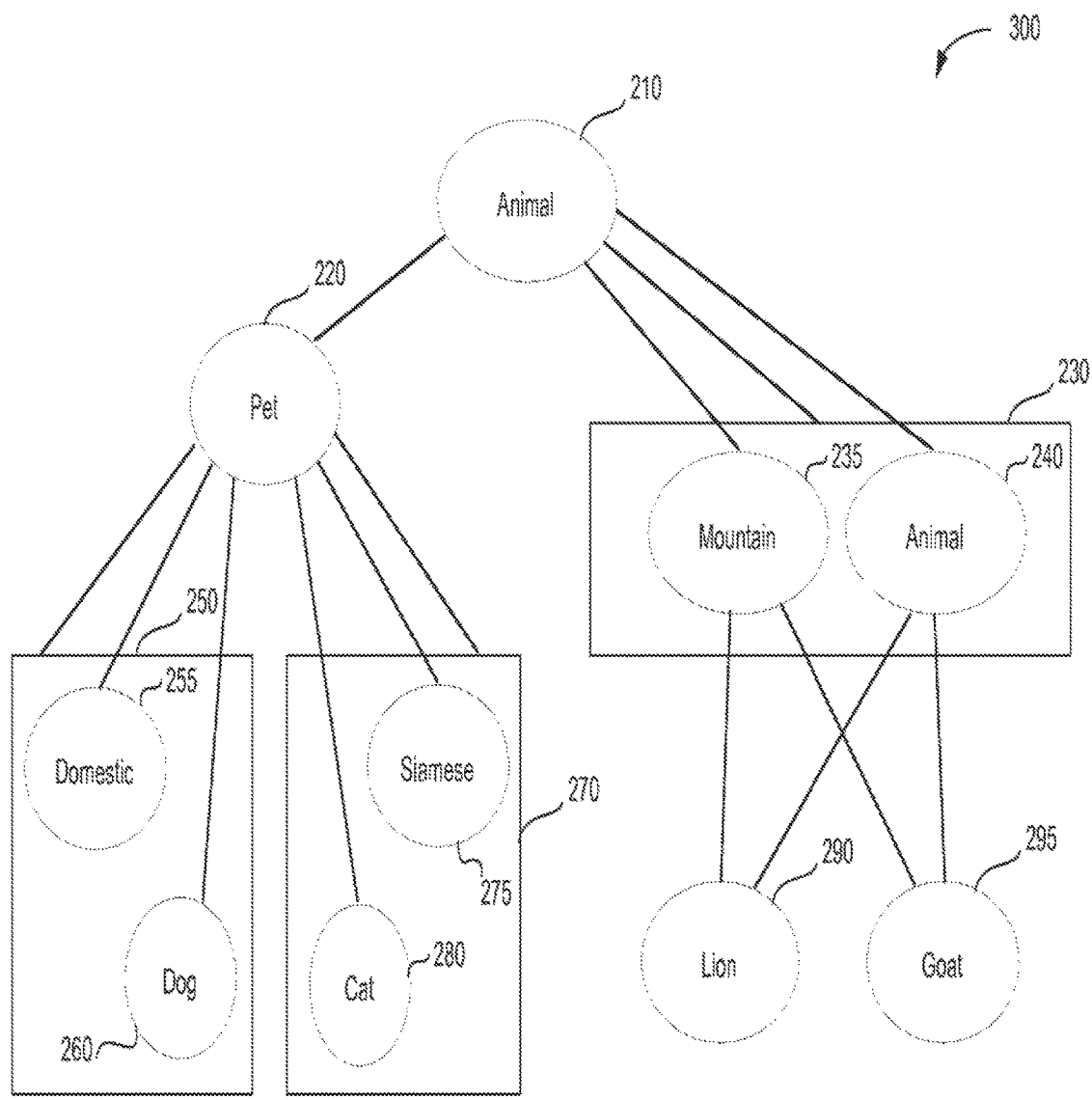
FIG. 2B illustrates an exemplary elemental data structure of an atomic knowledge representation model in accordance with some embodiments of the present invention.

In some embodiments, system 100 may, e.g., through analysis engine 150, deconstruct a complex KR such as complex KR 200 to discover at least some of the elemental concepts that comprise complex concepts of the complex KR. For example, FIG. 2B illustrates an elemental data structure 300 that may result from analysis and deconstruction of complex KR 200. In elemental data structure 300, complex concept 230 labeled "Mountain Animal" has been found to include more elemental concepts 235 labeled "Mountain" and 240 labeled "Animal". In this example, "Mountain" and "Animal" represent more elemental (i.e., "lower level" or less complex) concepts than the more complex concept labeled "Mountain Animal", since the concepts of "Mountain" and "Animal" can be combined to create the concept labeled "Mountain Animal". Similarly, complex concept 250 labeled "Domestic Dog" has been found to include more elemental concepts 255 labeled "Domestic" and 260 labeled "Dog", and complex concept 270 labeled "Siamese Cat" has been found to include more elemental concepts 275 labeled "Siamese" and 280 labeled "Cat". In addition, each newly discovered elemental concept has inherited concept relationships from the complex concept that comprises it. Thus, "Domestic", "Dog", "Siamese" and "Cat" are children of "Pet"; "Mountain" and "Animal" (concept 240) are children of "Animal" (concept 210); and "Mountain" and "Animal" (concept 240) are both parents of both concept 290 labeled "Lion" and concept 295 labeled "Goat".

Note that, although the label "Animal" is ascribed to both concept 210 and concept 240 in elemental data structure 300, the two concepts may still represent different abstract meanings that function differently within the knowledge representation hierarchy. In some embodiments, "labels" or "symbols" may be joined to abstract concepts to provide human- and/or machine-readable terms or labels for concepts and relationships, as well as to provide the basis for various symbol-based processing methods (such as text analytics). Labels may provide knowledge representation entities that are discernible to humans and/or machines, and may be derived from the unique vocabulary of the source domain. Thus, since the labels assigned to each concept element may be drawn from the language and terms presented in the domain, the labels themselves may not fully describe the abstract concepts and concept relationships they are used to name, as those abstract entities are comprehended in human knowledge.

Similarly, in some embodiments a difference should be appreciated between abstract concepts in a knowledge representation model and the objects those concepts may be used to describe or classify. An object may be any item in the real physical or virtual world that can be described by concepts (for instance, examples of objects are documents, web pages, people, etc.). For example, a person in the real world could be represented in the abstract by a concept labeled "Bob". The information in a domain to be described, classified or analyzed may relate to virtual or physical objects, processes, and relationships between such information. In some exemplary embodiments, complex KRs as described herein may be used in the classification of content residing within Web pages. Other types of domains in some embodiments may include document repositories, recommendation systems for music, software code repositories, models of workflow and business processes, etc.

In some embodiments, the objects of the domain to be classified may be referred to as content nodes. Content nodes may be comprised of any objects that are amenable to classification, description, analysis, etc. using a knowledge representation model. For example, a content node may be a file, a document, a chunk of a document (like an annotation), an image, or a stored string of characters. Content nodes may reference physical objects or virtual objects. In some embodiments, content nodes may be contained in content containers that provide addressable (or locatable) information through which content nodes can be retrieved. For example, the content container of a Web page, addressable through a URL, may contain many content nodes in the form of text and images. Concepts may be associated with content nodes to abstract some meaning (such as the description, purpose, usage, or intent of the content node). For example, aspects of a content node in the real world may be described by concepts in an abstract representation of knowledge.

Concepts may be defined in terms of compound levels of abstraction through their relationships to other entities and structurally in terms of other, more fundamental knowledge representation entities (e.g., keywords and morphemes). Such a structure is known herein as a concept definition. In some embodiments, concepts may be related through concept relationships of two fundamental types; intrinsic, referring to joins between elemental concepts to create more complex concepts (e.g., the relationship between "Mountain", "Animal" and "Mountain Animal" in elemental data structure 300); and extrinsic, referring to joins between complex relationships. Extrinsic relationships may describe features between concept pairs, such as equivalence, hierarchy (e.g., the relationship between "Animal" and "Pet"), and associations. Further, in some embodiments the extrinsic and intrinsic concept relationships themselves may also be described as types of concepts, and they may be typed into more complex relationships. For example, an associative relationship "married-to" may comprise the relationship concepts "married" and "to".

In some embodiments, the overall organization of the AKRM data model stored as elemental data structure 120 in system 100 may be encoded as a faceted data structure, wherein conceptual entities are related explicitly in hierarchies (extrinsic relationships), as well as joined in sets to create complex concepts (intrinsic relationships). Further, these extrinsic and intrinsic relationships themselves may be typed using concepts, as discussed above. However, it should be appreciated that any suitable type of knowledge representation model or theoretical construct including any suitable types of concept relationships may be utilized in representing an AKRM, as aspects of the present invention are not limited in this respect.

Figure 3:
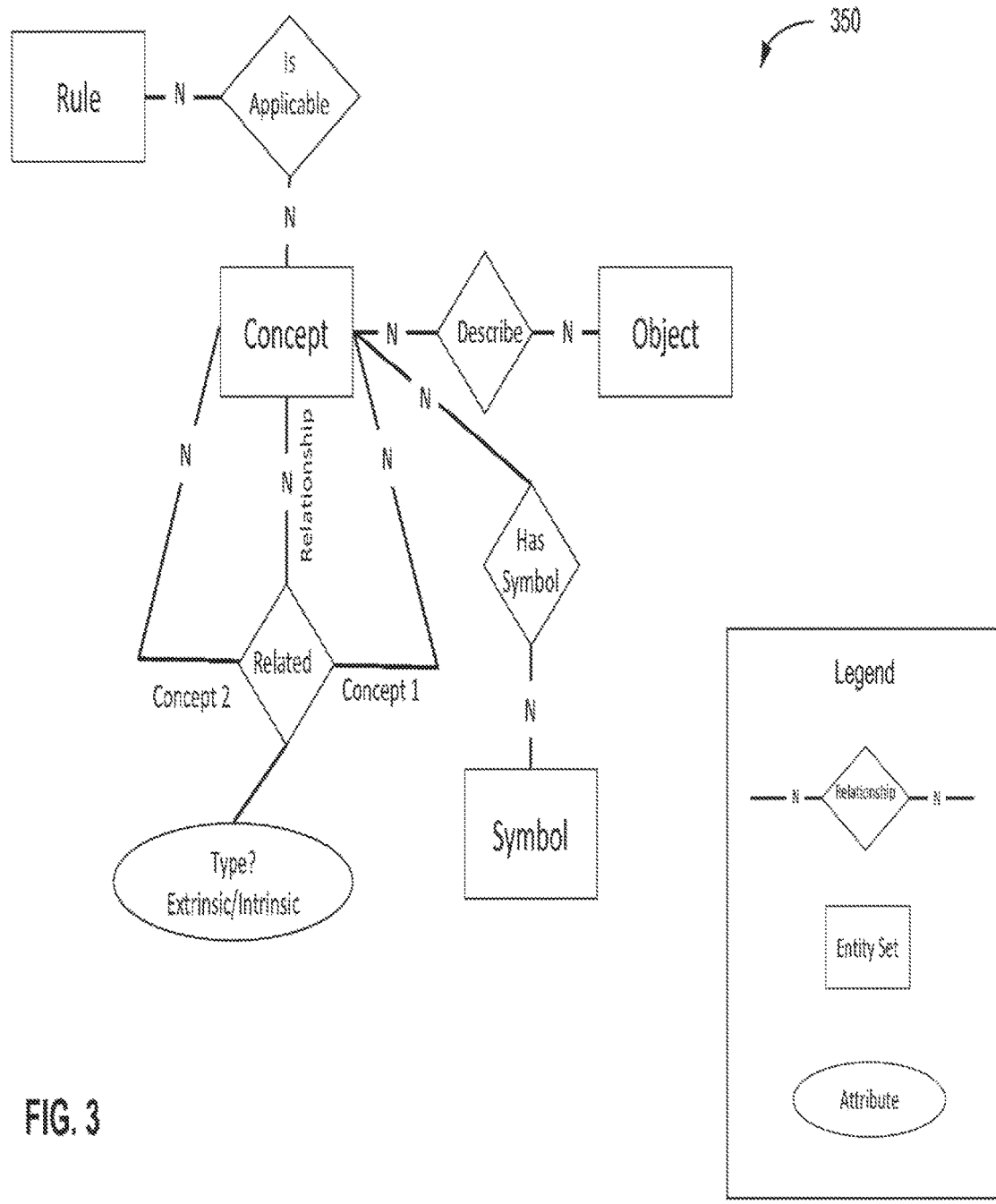
FIG. 3 illustrates an exemplary data schema in accordance with some embodiments of the present invention.

For illustration, FIG. 3 provides an exemplary data schema 350 that may be employed in the data set 110 of system 100 in accordance with some embodiments of the present invention. Such a data schema may be designed to be capable of encoding both complex knowledge representation data structures (complex KRs) such as ontologies and taxonomies, as well as the atomic knowledge representation data structures into which complex KRs are decomposed (e.g., elemental data structure 120). In schema 350, concepts may be joined to compose more complex types (has-type) using many-to-many relationships. In this way, the core concept entities in the model may represent a wide diversity of simplicity or complexity, depending on the nature of the complex knowledge representation that is being modeled by the data. By joining symbols, rules, and objects to these concepts using many-to-many relationships, such a schema may manage the data to model a broad range of knowledge representations.

In schema 350 as illustrated in FIG. 3, rectangular boxes represent entity sets, e.g., real-world objects that may be encoded as main objects in a database, as well as abstract concepts, human- and/or machine-readable symbols that reference concepts, and rules that apply to concepts in the knowledge representation. Each solid line connector represents a relationship between two entity sets, with a relationship type as represented by a diamond. "N" denotes the participation cardinality of the relationship; here, the relationships are many-to-many, indicating that many entities of each entity set can participate in a relationship with an entity of the other entity set participating in the relationship, and vice versa. By contrast, a relationship labeled "1" on both sides of the diamond would represent a one-to-one relationship; a relationship labeled "1" on one side and "N" on the other side would represent a one-to-many relationship, in which one entity of the first type could participate in the relationship with many entities of the second type, while each entity of the second type could participate in that relationship with only one entity of the first type; etc.

In some embodiments, the data structure of a knowledge representation may be encoded in accordance with schema 350 in one or more database tables, using any suitable database and/or other data encoding technique. For example, in some embodiments a data set for a KR data structure may be constructed as a computer-readable representation of a table, in which each row represents a relationship between a pair of concepts. For instance, one example of a data table could have four attribute columns, including a "concept 1" attribute, a "concept 2" attribute, a "relationship" attribute and a "type" attribute, modeling a three-way relationship for each row of the table as, "concept 1 is related to concept 2 through a relationship concept of a type (e.g., extrinsic or intrinsic)". For example, a row of such a table with the attributes (column entries) {concept 1: "Hammer"; concept 2: "Nail"; relationship: "Tool"; type: "Extrinsic" } could represent the relationship: "Hammer" is related to "Nail" as a "Tool", and the relationship is "Extrinsic'." In many exemplary data structures, each concept may appear in one or more rows of a database table, for example appealing in multiple rows to represent relationships with multiple other concepts. In addition, a particular pair of concepts may appear in more than one row, for example if that pair of concepts is related through more than one type of relationship. It should be appreciated, however, that the foregoing description is by way of example only, and data structures may be implemented and/or encoded and stored in any suitable way, as aspects of the present invention are not limited in this respect.

In some embodiments, various metadata may be associated with each of the entities (e.g., concepts and concept relationships) within the AKRM to support rules-based programming. For example, since many rules would require a sorted set of concepts, a priority of concepts within concept relationships (intrinsic or extrinsic) could be added to this schema. These details are omitted here only to simplify the presentation of the data model.

Although the exemplary data schema of FIG. 3 may be relatively simple, when it is married to machine-implemented (e.g., computer-implemented) processing rules for constructing and deconstructing knowledge representations, it may become capable of managing a very broad range of complex knowledge (as described in various examples below). Benefits may include real-time knowledge engineering to improve data economy and reduce the need for building complexity into large knowledge representation data structures. Further, as the scope of the knowledge representation data structures is reduced, it may also have beneficial effects on integrated knowledge engineering processes, such as reasoning, analytics, data mining, and search.

Returning to FIG. 1, in some embodiments knowledge processing rules 130 may be encoded and stored in system 100, for example in data set 110, and may be joined to concepts within input KRs 160 and/or elemental data structure 120. Rules may be joined to concepts such that given a specific concept, the rules may be applied through execution of programming code by one or more processors of system 100 to generate new semantic entities (concepts and relationships) from elemental data structure 120 and/or to deconstruct input KRs 160 into elemental entities to be included in elemental data structure 120. Examples of such rules are described in more detail below.

Rules 130 may be introduced to data set 110 as input rules 140, for example by a developer of system 100, and/or by end users of system 100 in accordance with their individual knowledge processing needs or preferences. It should be appreciated that input rules 140 may be obtained from any suitable source at any suitable time, rules 130 stored as part of the AKRM may be updated and/or changed at any suitable time by any suitable user before or during operation of system 100; and different stored rules 130 may be maintained for different users or applications that interact with system 100, as aspects of the present invention are not limited in these respects. In addition, in some embodiments different subsets of stored rules 130 may be applied to analysis of input KRs 160 than to synthesis of output KRs 190, while in other embodiments the same rules 130 may be applied in both analysis and synthesis operations, and different subsets of stored rules 130 may be applied to different types of knowledge representation.

Rules 130, when applied to concepts in analysis and synthesis of KRs, may provide the constructive and deconstructive logic for a system such as system 100. Methods of how knowledge is created (synthesized) or deconstructed (analyzed) may be encoded in sets of rules 130. Rules 130 may be designed to work symmetrically (single rules operating in both analysis and synthesis) or asymmetrically (where single rules are designed to work only in synthesis or analysis). In some embodiments, rules 130 may not be encoded as entities within a concept data structure of a knowledge representation model, but rather as rules within the knowledge representation model that operate in a generative capacity upon the concept data structure. In some embodiments, rules 130 may be encoded as data and stored along with the knowledge representation data structures, such as elemental data structure 120, in a machine-readable encoding of an AKRM including rules. Rules 130 may be applied using a rules engine software component, e.g., implemented by programming instructions encoded in one or more tangible, non-transitory computer-readable storage media included in or accessible by system 100, executed by one or more processors of system 100 to provide the rules engine.

Analysis engine 150 and synthesis engine 170 may use any of various methods of semantic analysis and synthesis to support the construction and deconstruction of knowledge representation data structures, as aspects of the present invention are not limited in this respect. Examples of analytical methods that may be used by analysis engine 150, along with application of rules 130, in deconstructing input complex KRs 160 include text analyses, entity and information extraction, information retrieval, data mining, classification, statistical clustering, linguistic analyses, facet analysis, natural language processing and semantic knowledge-bases (e.g. lexicons, ontologies, etc.). Examples of synthetic methods that may be used by synthesis engine 170, along with application of rules 130, in constructing complex KRs 190 include formal concept analysis, faceted classification synthesis, semantic synthesis and dynamic taxonomies, and various graphical operations as described in U.S. patent application Ser. No. 13/340,792, tilled "Methods and Apparatuses for Providing Information of Interest to One or More Users," filed Dec. 30, 2011, and/or U.S. patent application Ser. No. 13/340,820, titled "Methods and Apparatuses for Providing Information of Interest to One or More Users," filed Dec. 30, 2011, all of which are hereby incorporated by reference in their entities.

It should be appreciated that exemplary methods of analysis and synthesis of complex KRs may be performed by analysis engine 150 and synthesis engine 170 operating individually and/or in conjunction with any suitable external software application that may interface with the engines and/or system 100. Such external software applications may be implemented within the same physical device or set of devices as other components of system 100, or parts or all of such software applications may be implemented in a distributed fashion in communication with other separate devices, as aspects of the present invention are not limited in this respect.

Figure 4:
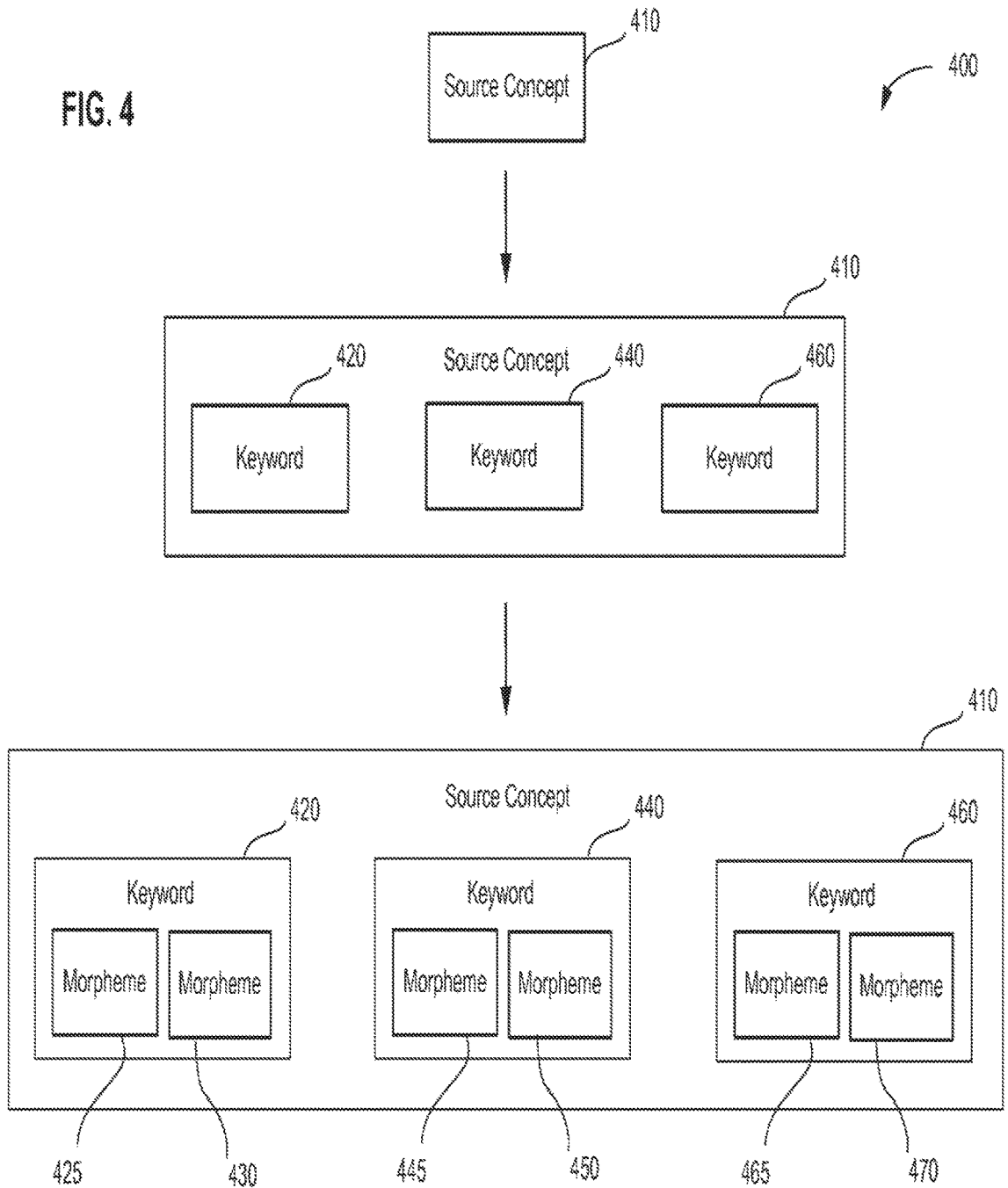
FIG. 4 illustrates an exemplary method for analysis of a complex knowledge representation in accordance with some embodiments of the present invention.

FIG. 4 illustrates one exemplary method 400 of semantic analysis that may be used by analysis engine 150 in deconstructing an input complex KR 160. It should be appreciated that the method illustrated in FIG. 4 is merely one example, and many other methods of analysis are possible, as discussed above, as aspects of the present invention are not limited in this respect. Exemplary method 400 begins with extraction of a source concept 410 with a textual concept label explicitly presented in the source data structure. Multiple source concepts 410 may be extracted from a source data structure, along with source concept relationships between the source concepts 410 that may explicitly present in the source data structure.

A series of keyword delineators may be identified in the concept label for source concept 410. Preliminary keyword ranges may be parsed from the concept label based on common structural textual delineators of keywords (such as parentheses, quotes, and commas). Whole words may then be parsed from the preliminary keyword ranges, again using common word delineators (such as spaces and grammatical symbols). Checks for single word independence may then be performed to ensure that the parsed candidate keywords are valid. In some embodiments, a check for word independence may be based on word stem (or word root) matching, hereafter referred to as "stemming". Once validated, if a word is present in one concept label with other words, and is present in a related concept label absent those other words, then the word may delineate a keyword.

Once a preliminary set of keyword labels is thus generated, all preliminary keyword labels may be examined in the aggregate to identify compound keywords, which present more than one valid keyword label within a single concept label. For example, "basketball" may be a compound keyword containing keyword labels "basket" and "ball" in a single concept label. In some embodiments, recursion may be used to exhaustively split the set of compound keywords into the most elemental set of keywords that is supported by the source data. The process of candidate keyword extraction, validation and splitting may be repeated until no additional atomic keywords can be found and/or until the most elemental set of keywords supported by the source data has been identified.

In some embodiments, a final method round of consolidation may be used to disambiguate keyword labels across the entire domain. Such disambiguation may be used to resolve ambiguities that emerge when entities share the same labels. In some embodiments, disambiguation may be provided by consolidating keywords into single structural entities that share the same label. The result may be a set of keyword concepts, each included in a source concept from which it was derived. For example, source concept 410 may be deconstructed into keywords 420, 440 and 460, parsed from its concept label, and keywords 420, 440 and 460 may make up a concept definition for source concept 410. For instance, in the example elemental data structure 300 of FIG. 2B, the more elemental concept 255 labeled "Domestic" may be deconstructed from the more complex concept 250 labeled "Domestic Dog" as a keyword parsed from the concept label.

In some embodiments, concept definitions including keyword concepts may be extended through further deconstruction to include morpheme concept entities in their structure, as a deeper and more fundamental level of abstraction. In some embodiments, morphemes may represent elemental, irreducible attributes of more complex concepts and their relationships. At the morpheme level of abstraction, many of the attributes would not be recognizable to human classificationists as concepts. However, when combined into relational data structures across entire domains, morphemes may in some embodiments be able to carry the semantic meaning of the more complex concepts using less information.

In some embodiments, methods of morpheme extraction may have elements in common with the methods of keyword extraction discussed above. Patterns may be defined to use as criteria for identifying morpheme candidates. These patterns may establish the parameters for stemming, and may include patterns for whole word as well as partial word matching. As with keyword extraction, the sets of source concept relationships may provide the context for morpheme pattern matching. The patterns may be applied against the pool of keywords within the sets of source concept relationships in which the keywords occur. A set of shared roots based on stemming patterns may be identified. The set of shared roots may comprise the set of candidate morpheme roots for each keyword.

In some embodiments, the candidate morpheme roots for each keyword may be compared to ensure that they are mutually consistent. Roots residing within the context of the same keyword and the source concept relationship sets in which the keyword occurs may be assumed to have overlapping roots, further, it may be assumed that the elemental roots derived from the intersection of those overlapping roots will remain within the parameters used to identify valid morphemes. Such validation may constrain excessive morpheme splitting and provide a contextually meaningful yet fundamental level of abstraction. In some embodiments, any inconsistent candidate morpheme roots may be removed from the keyword sets. The process of pattern matching to identify morpheme candidates may be repeated until all inconsistent candidates are removed.

In some embodiments, by examining the group of potential roots, one or more morpheme delineators may be identified for each keyword. Morphemes may be extracted based on the location of the delineators within each keyword label. Keyword concept definitions may then be constructed by relating (or mapping) the extracted morphemes to the keywords from which they were derived. For example, morpheme concepts 425 and 430 may be included in the concept definition for keyword concept 420, morpheme concepts 445 and 450 may be included in the concept definition for keyword concept 440, and morpheme concepts 465 and 470 may be included in the concept definition for keyword concept 460. Thus, an original source concept 410 may be deconstructed through semantic analysis to the level of keyword concepts, and further to the most elemental level of morpheme concepts for inclusion in an elemental data structure of an AKRM.

It should be appreciated, however, that any suitable level of abstraction may be employed in generating an elemental data structure, and any suitable method of analysis may be used, including methods not centered on keywords or morphemes, as aspects of the present invention are not limited in this respect. In some embodiments, an elemental data structure included in an AKRM for use in analysis and/or synthesis of more complex KRs may include and encode concepts and relationships that are more elemental than concepts and relationships included in the complex KRs deconstructed to populate the elemental data structure and/or synthesized from the elemental data structure. For example, abstract meanings of complex concepts encoded in a complex KR may be formed by combinations of abstract meanings of elemental concepts encoded in the elemental data structure of the AKRM.

In some embodiments, concepts stored in an elemental data structure as part of a centralized AKRM may have been deconstructed from more complex concepts to the level of single whole words, such as keywords. The example of FIG. 2B illustrates such an elemental data structure encoding single whole words. In some embodiments, concepts in the elemental data structure may have been deconstructed to more elemental levels representing portions of words. In some embodiments, concepts in the elemental data structure may have been deconstructed to a more elemental semantic level represented by morphemes, the smallest linguistic unit that can still carry semantic meaning. For example, the whole word concept "Siamese" may be deconstructed to create two morpheme concepts, "Siam" and "-ese", with "Siam" representing a free morpheme and "-ese" representing an affix. In some embodiments, an elemental data structure of an AKRM may include only concepts at a specified level of elementality; for example, an elemental data structure may in some embodiments be formed completely of morphemes or completely of single word concepts. In other embodiments, an elemental data structure may include concepts at various different levels of elementality (e.g., including morpheme concepts, keyword concepts and/or other concepts at other levels of elementality), with at least some of the concepts in the elemental data structure being more elemental than the complex concepts in input KRs they are deconstructed from and/or the complex concepts in output KRs that they create in combination with other elemental concepts. It should be appreciated that any suitable basis for deconstructing complex KRs into more elemental data structures may be utilized, including bases tied to paradigms other than linguistics and semantics, as aspects of the present invention are not limited in this respect.

Returning to FIG. 1, data consumer 195 may represent one or more human users of system 100 and/or one or more machine-implemented software applications interacting with system 100. In some embodiments, data consumer 195 may make requests and/or receive output from system 100 through various forms of data. For example, a data consumer 195 may input a complex KR 160 to system 100 to be deconstructed to elemental concepts and concept relationships to generate and/or update elemental data structure 120. A data consumer 195 (the same or a different data consumer) may also receive an output complex KR 190 from system 100, synthesized by application of one or more of the knowledge processing rules 130 to part or all of elemental data structure 120.

In some embodiments of exemplary system 100, a context 180 (or "context information" 180) associated with one or more data consumers 195 is provided to the synthesis engine 170. Context information may comprise any information that may be used to identify what information the data consumers) may be seeking and/or may be interested in. Context information may also comprise information that may be used to develop a model of the data consumers) that may be subsequently used to provide those data consumers) with information. As such, context information may include, but is not limited to, any suitable information related to the data consumer(s) that may be collected from any available sources and/or any suitable information directly provided by the data consumers).

In some embodiments, information related to a data consumer may be any suitable information about the data consumer. For example, information related to a data consumer may comprise demographic information (e.g., gender, age group, education level, etc.), biographical information, employment information, familial information, relationship information, preference information, interest information, financial information, geo-location information, etc. associated with the data consumer. As another example, information related to a data consumer may comprise details of the data consumer's Internet browsing history. Such information may comprise a list of one or more websites that the data consumer may have browsed, the time of any such browsing, and/or the place (i.e., geographic location) from where any such browsing occurred. The data consumer's browsing history may further comprise information that the data consumer searched for and any associated browsing information including, but 3(127347.3 not limited to, the search results the data consumer obtained in response to any such searches. In some embodiments, information related to a data consumer may comprise records of hyperlinks selected by a user.

As another example, information related to a data consumer may comprise any information that the data consumer has provided via any user interface on the data consumer's computing device or on one or more websites that the data consumer may have browsed. For instance, information related to a data consumer may comprise any information associated with the data consumer on any website such as a social networking website, job posting website, a blog, a discussion thread, etc. Such information may include, but is not limited to, the data consumer's profile on the website, any information associated with multimedia (e.g., images, videos, etc.) corresponding to the data consumer's profile, and any other information entered by the data consumer on the website, in some embodiments, exemplary system 1800 may acquire profile information by scraping a website or a social networking platform. As yet another example, information related to a data consumer may comprise consumer interaction information as described in U.S. patent application Ser. No. 12/555,293, filed Sep. 8, 2009, and entitled "Synthesizing Messaging Using Content Provided by Consumers," which is hereby incorporated by reference in its entirety.

In some embodiments, information related to a data consumer may comprise geo-spatial information. For instance, the geo-spatial information may comprise the current location of the data consumer and/or a computing device of the data consumer (e.g., data consumer's home, library in data consumer's hometown, data consumer's work place, a place to which the data consumer has traveled, and/or the geographical location of the data consumer's device as determined by the data consumer's Internet IP address, etc.). Geo-spatial information may include an association between information about the location of the data consumer's computing device and any content that the data consumer was searching or viewing when the data consumer's computing device was at or near that location. In some embodiments, information related to a data consumer may comprise temporal information. For example, the temporal information may comprise the time during which a data consumer was querying or viewing specific content on a computing device. The time may be specified at any suitable scale such as on the scale of years, seasons, months, weeks, days, hours, minutes, seconds, etc.

Additionally or alternatively, context information associated with one or more data consumers may comprise information provided by the data consumer(s). Such information may be any suitable information indicative of what information the data consumers) may be interested in. For example, context information may comprise one or more search queries input by a data consumer into a search engine (e.g., an Internet search engine, a search engine adapted for searching a particular domain such as a corporate intranet, etc.). As another example, context information may comprise one or more indicators, specified by the data consumer, of the type of information the data consumer may be interested in. A data consumer may provide the indicators) in any of numerous ways. The data consumer may type in or speak an indication of preferences, select one or more options provided by a website or an application (e.g., select an item from a dropdown menu, check a box, etc.), highlight or otherwise select a portion of the content of interest to the data consumer on a website or in an application, and/or in any other suitable manner. For example, the data consumer may select one or more options on a website to indicate a desire to receive news updates related to a certain topic or topics, advertisements relating to one or more types of product(s), information about updates on any of numerous types of websites, newsletters, e-mail digests, etc.

Context information may be obtained in any of a variety of possible ways. For example, in some embodiments, the context information may be provided from a data consumer's client computer to one or more server computers. That is, for example, a data consumer may operate a client computer that executes an application program. The application program may send context information (e.g., a search query entered by the data consumer into the application program) to a server computer. Thus, the server may receive context information from the application program executing on the client.

The application program may be any of a variety of types of application programs that are capable of, directly or indirectly, sending and receiving information. For example, in some embodiments, the application program may be an Internet or WWW browser, an instant messaging client, or any other suitable application.

The context information need not be sent directly from a client to a server. For example, in some embodiments, the data consumer's search query may be sent to a server via a network. The network may be any suitable type of network such as a LAN, WAN, the Internet, or a combination of networks.

It should also be recognized that receiving context information from a data consumer's client computer is not a limiting aspect of the present invention as context information may be obtained in any other suitable way. For example, context information may be obtained, actively by requesting and/or passively by receiving, from any source with, or with access to, context information associated with one or more data consumers.

In some embodiments, data consumer 195 may provide a context 180 for directing synthesis and/or analysis operations. For example, by inputting a particular context 180 along with a request for an output KR, data consumer 195 may direct system 100 to generate an output KR 190 with appropriate characteristics for the information required or the current task being performed by the data consumer. For example, a particular context 180 may be input by data consumer 195 as a search term mappable to a particular concept about which data consumer 195 requires or would like to receive related information. In some embodiments, synthesis engine 170 may, for example, apply rules 130 to only those portions of elemental data structure 120 that are conceptually related (i.e., connected in the data structure) to the concept corresponding to the context 180. In another example, an input context 180 may indicate a particular type of knowledge representation model with which data consumer 195 would like output KR 190 to conform, such as a taxonomy. Accordingly, embodiments of synthesis engine 170 may apply only those rules of the set of rules 130 that are appropriate for synthesizing a taxonomy from elemental data structure 120.

It should be appreciated that input context 180 may include any number of requests and/or limitations applying to the synthesis of output KR 190, and components of input context 180 may be of any suitable type encoded in any suitable form of data or programming language, as aspects of the present invention are not limited in this respect. Examples of suitable input contexts include, but are not limited to, free text queries and submissions, e.g., mediated by a natural language processing (NLP) technology, and structural inputs such as sets of terms or tags, consistent with various Web 2.0 systems. In some embodiments, generating output KR 190 in accordance with a particular context 180 may enable a more fluid and dynamic interchange of knowledge with data consumers. However, it should be appreciated that an input context 180 is not required, and system 100 may produce output KRs 190 without need of input contexts in some embodiments, as aspects of the present invention are not limited in this respect.

Data consumers 195 may also provide input KRs 160 of any suitable type to system 100 in any suitable form using any suitable data encoding and/or programming language, as aspects of the present invention are not limited in this respect. Examples of suitable forms of input KRs include, but are not limited to, semi-structured or unstructured documents, again used with various forms of NLP and text analytics, and structured knowledge representations such as taxonomies, controlled vocabularies, faceted classifications and ontologies.

Figure 5:
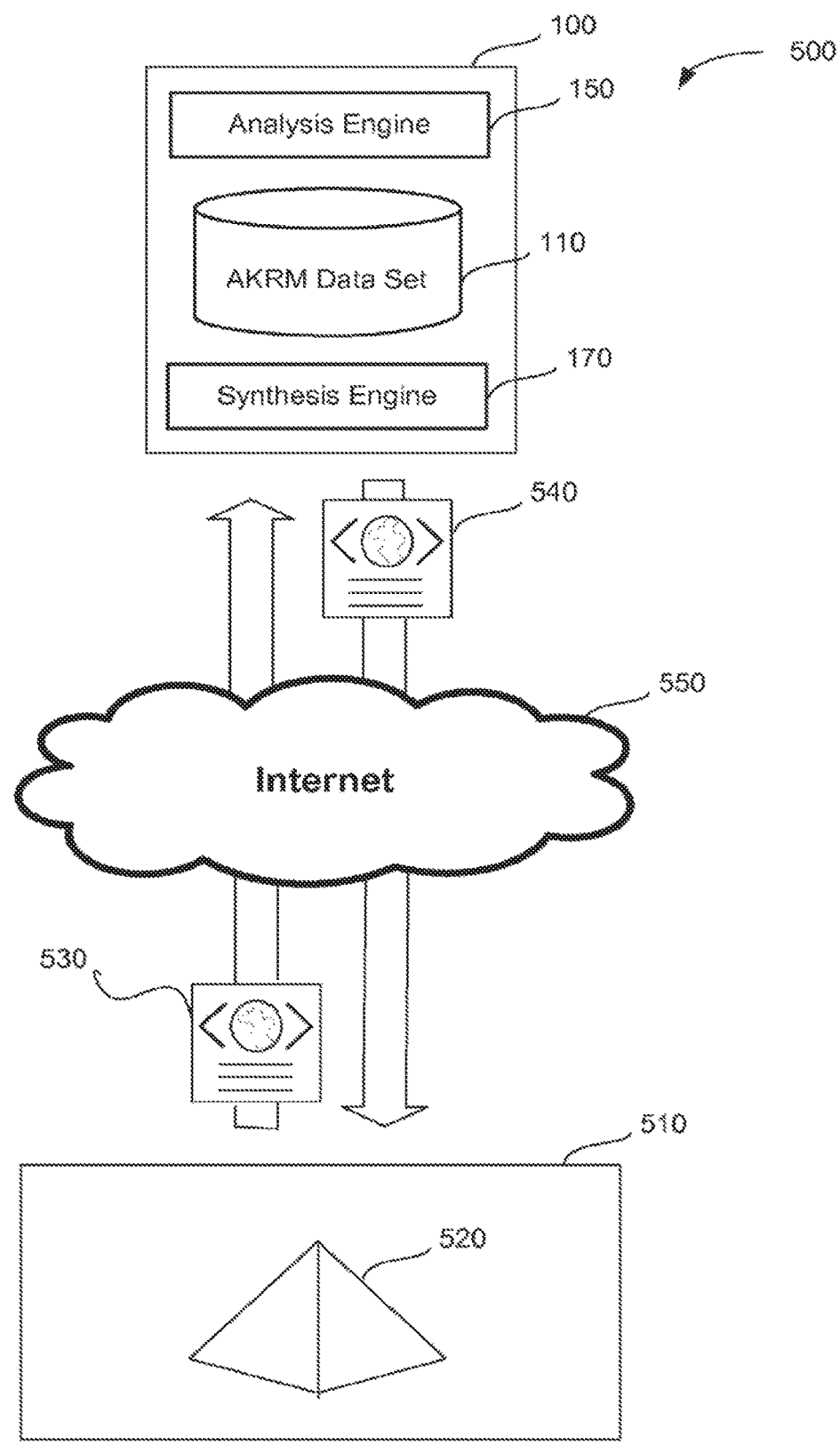
FIG. 5 is a block diagram illustrating an exemplary distributed system for implementing analysis and synthesis of complex knowledge representations in accordance with some embodiments of the present invention.

In some embodiments in accordance with the present disclosure, a system for analysis and synthesis of complex KRs using an AKRM, such as system 100, may be implemented on a server side of a distributed computing system with network communication with one or more client devices, machines and/or computers. FIG. 5 illustrates such a distributed computing environment 500, in which system 100 may operate as a server-side transformation engine for KR data structures. The transformation engine (e.g., one or more programmed processors) may take as input one or more source complex KR data structures 520 provided from one or more domains by a client 510, e.g., through actions of a human user or software application of client 510. In some embodiments, the input complex KR 520 may be encoded into one or more XML files 530 that may be distributed via web services (or API or other distribution channels) over a network such as (or including) the Internet 550 to the computing system(s) on which system 100 is implemented. Similarly, system 100 may return requested output KRs to various clients 510 through the network as XML files 540. However, it should be appreciated that data may be communicated between server system 100 and client systems 510 in any suitable way and in any suitable form, as aspects of the present invention are not limited in this respect.

Through this and/or other modes of distribution and decentralization, in some embodiments a wide range of developers and/or publishers may use the analysis engine 150 and synthesis engine 170 to deconstruct and create complex KR data structures. Exemplary applications include, but are not limited to, web sites, knowledge bases, e-commerce stores, search services, client software, management information systems, analytics, etc.

In some embodiments, an advantage of such a distributed system may be clear separation of private domain data and shared data used by the system to process domains. Data separation may facilitate hosted processing models, such as a software-as-a-service (SaaS) model, whereby a third party may offer transformation engine services to domain owners. A domain owner's domain-specific data may be hosted by the SaaS platform securely, as it is separable from the shared data (e.g., AKRM data set 110) and the private data of other domain owners. Alternately, the domain-specific data may be hosted by the domain owners, physically removed from the shared data. In some embodiments, domain owners may build on the shared knowledge (e.g., the AKRM) of an entire community of users, without having to compromise their unique knowledge.

As should be appreciated from the foregoing discussion, some embodiments in accordance with the present disclosure are directed to techniques of analyzing an original complex knowledge representation to deconstruct the complex KR and generate or update an elemental data structure of an atomic knowledge representation model. FIG. 6 illustrates one such technique as exemplary process 600. Process 6(X) begins at act 610, at which an input complex KR may be received, for example from a data consumer by an analysis/synthesis system such as system 1(X).

At act 620, one or more knowledge processing rules encoded in system 100 as part of an AKRM may be applied to deconstruct the input complex KR to one or more elemental concepts and/or one or more elemental concept relationships. Examples of knowledge processing rules applicable to various types of input KRs are provided below. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

At act 630, one or more of the elemental concepts and/or elemental concept relationships discovered and/or derived in act 620 may be included in an elemental data structure encoded and stored as part of the AKRM of the system. In some embodiments, some or all of the elemental concepts and relationships derived from a single input complex KR may be used to populate a new elemental data structure of an AKRM. In some embodiments, when a stored elemental data structure has already been populated, new elemental concepts and/or relationships discovered from subsequent input KRs may be included in the stored elemental data structure to update and/or extend the centralized AKRM. In some embodiments, process 600 may continue to loop back to the beginning to further update a stored elemental data structure and/or generate new elemental data structures as new input KRs become available. In other embodiments, process 600 may end after one pass or another predetermined number of passes through the process, after a stored elemental data structure has reached a predetermined size or complexity, or after any other suitable stopping criteria are met.

As should be appreciated from the foregoing discussion, some further embodiments in accordance with the present disclosure are directed to techniques for generating (synthesizing) complex knowledge representations using an atomic knowledge representation model. FIG. 7 illustrates such a technique as exemplary process 700. Process 700 begins at act 710, at which an input context may be received, for example from a data consumer such as a human user or a software application. As discussed above, such a context may include a textual query or request, one or more search terms, identification of one or more active concepts, etc. In addition, the context may indicate a request for a particular form of complex KR. In some embodiments, however, a request for a complex KR may be received without further context to limit the concepts and/or concept relationships to be included in the complex KR, as aspects of the present invention are not limited in this respect. Furthermore, in some embodiments, receipt of a context may be interpreted as a request for a complex KR, without need for an explicit request to accompany the context.

At act 720, in response to the input request and/or context, one or more appropriate knowledge processing rules encoded in the AKRM may be applied to the elemental data structure of the AKRM to synthesize one or more additional concepts and/or concept relationships not explicitly encoded in the elemental data structure. Examples of knowledge processing rules applicable to synthesizing various types of output KRs are provided below. As discussed above, in some embodiments rules may be applied bi-directionally to accomplish both analysis and synthesis of complex KRs using the same knowledge processing rules, while in other embodiments one set of rules may be applied to analysis and a different set of rules may be applied to synthesis. However, it should be appreciated that aspects of the present invention are not limited to any particular examples of knowledge processing rules, and any suitable rules encoded in association with an atomic knowledge representation model may be utilized. As discussed above, such rules may be provided at any suitable time by a developer of the analysis system and/or by one or more end users of the analysis system.

In some embodiments, appropriate rules may be applied to appropriate portions of the elemental data structure in accordance with the received input request and/or context. For example, if the input request specifies a particular type of complex KR to be output, in some embodiments only those rules encoded in the AKRM that apply to synthesizing that type of complex KR may be applied to the elemental data structure. In some embodiments, if no particular type of complex KR is specified, a default type of complex KR, such as a taxonomy, may be synthesized, or a random type of complex KR may be selected, etc. In some embodiments, if the input context specifies one or more particular active concepts of interest, for example, only those portions of the elemental data structure related (i.e., connected through concept relationships) to those active concepts may be selected and the rules applied to them to synthesize the new complex KR. In some embodiments, some predetermined limit on the size and/or complexity of the output complex KR may be set, e.g., by a developer of the synthesis system or by an end user, for example conditioned on a number of concepts included, hierarchical distance between the active concepts and selected related concepts in the elemental data structure, encoded data size of the resulting output complex KR, processing requirements, etc.

At act 730, a new complex KR may be synthesized from the additional concepts and relationships synthesized in act 720 and the selected appropriate portions of the elemental data structure, and encoded in accordance with any specified type of KR indicated in the received input. At act 740, the resulting synthesized complex KR may be provided to the data consumer from which the request was received. As discussed above, this may be a software application or a human user who may view and/or utilize the provided complex KR through a software user interface, for example. Process 700 may then end with the provision of the newly synthesized complex KR encoding new knowledge.

In some embodiments, an "active concept" may be used during synthesis of a complex KR. In one aspect, an active concept may be an elemental concept corresponding to at least a portion of the context information associated with a data consumer. In some embodiments, an active concept may be provided as part of context information. In some embodiments, an active concept may be extracted from context information.

Extracting an active concept from context information may comprise identifying a portion of the context information that pertains to a synthesis operation. For example, when a data consumer searches for information, a pertinent portion of the context information may comprise a user's search query, and/or additional information that may be helpful in searching for the information that the data consumer seeks (e.g., the data consumer's current location, the data consumer's browsing history, etc.). As another example, when presenting a data consumer with one or more advertisements, a pertinent portion of the context information may comprise information indicative of one or more products that the data consumer may have interest in. As another example, when providing a data consumer with news articles (or any other suitable type of content), a pertinent portion of the context information may comprise information indicative of the data consumer's interests. The pertinent portion of the context information may be identified in any suitable way as the manner in which the pertinent portion of the context information is identified is not a limitation of aspects of the present invention. It should be also recognized that, in some instances, the pertinent portion of the context information may comprise a subset of the context information, but, in other embodiments, the pertinent portion may comprise all the context information, as aspects of the present invention are not limited in this respect.

The pertinent portion of the context information may be represented in any of numerous ways. For example, in some embodiments, the pertinent portion of context information may be represented via one or more alphanumeric strings. An alphanumeric string may comprise any suitable number of characters (including spaces), words, numbers, and/or any of numerous other symbols. An alphanumeric string may, for example, represent a user search query and/or any suitable information indicative of what information the data consumer may be interested in. Though, it should be recognized that any of numerous other data structures may be used to represent context information and/or any portion thereof.

In some embodiments, an active concept corresponding to the pertinent portion of context information may be identified in an elemental data structure. Identification of the active concept in the elemental data structure may be made in any suitable way. In some embodiments, the pertinent portion of the context information may be compared with a concept identifier. For example, when the pertinent portion of the context information is represented by an alphanumeric string, the alphanumeric string may be compared with a string identifying the concept (sometimes referred to as a "concept label") to determine whether or not the strings match. A match may be an exact match between the strings, or a substantially exact match in which all words, with the exception of a particular set of words (e.g., words such as "and," "the," "of," etc.), match. Moreover, in some embodiments, an order of words in the strings may be ignored. For instance, it may be determined that the siring "The Board of Directors," matches the concept label "Board Directors" as well as the concept label "Directors Board."

In some embodiments, if an active concept corresponding to the pertinent portion of context information is not identified in the elemental data structure, an active concept may be generated. In some embodiments, a generated active concept may be added to the elemental data structure.

Figure 11:
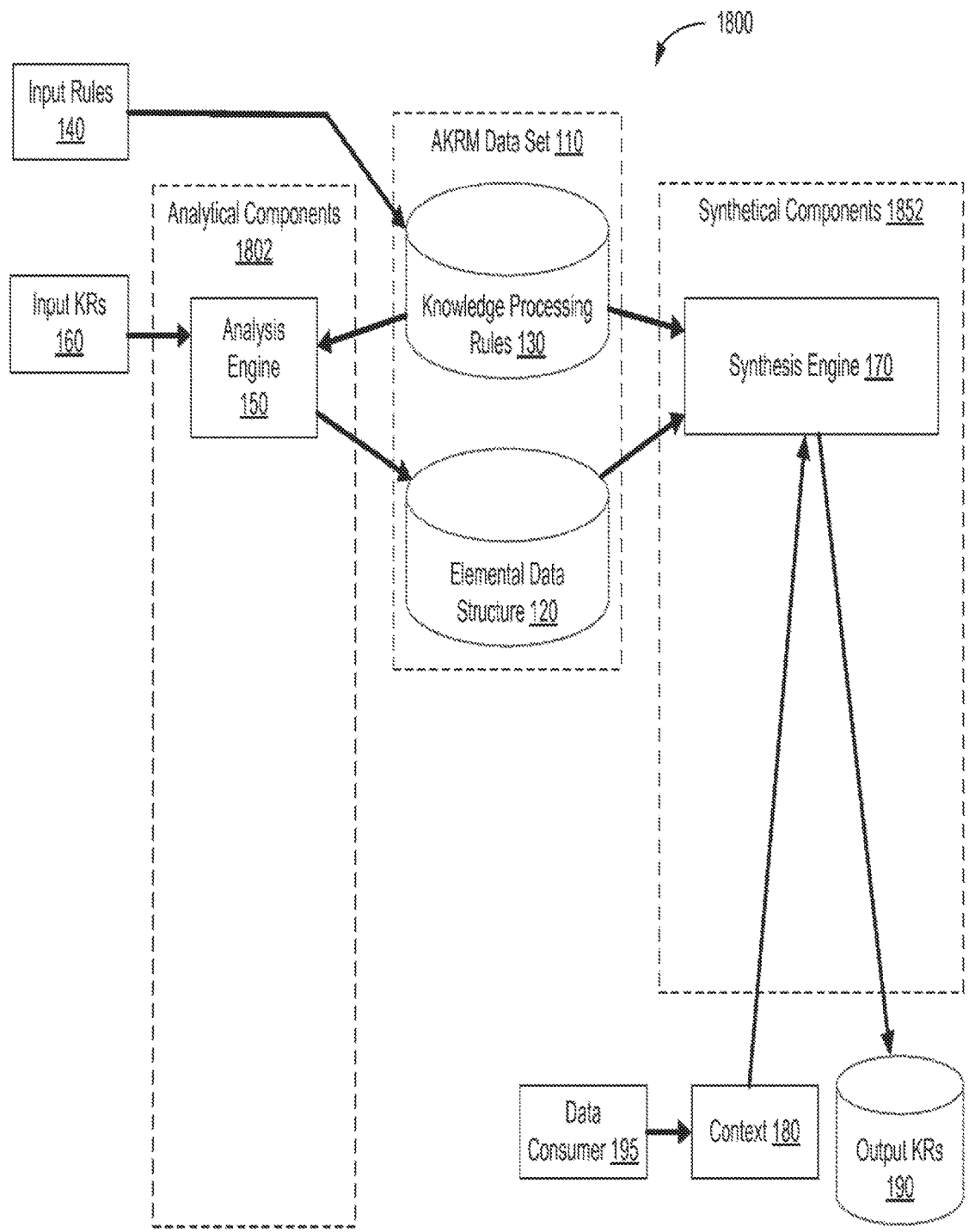
FIG. 11 is a block diagram illustrating another exemplary system for implementing an atomic knowledge representation model in accordance with some embodiments of the present invention.

FIG. 11 illustrates an exemplary system 18(X) that may be employed in some embodiments for implementing an atomic knowledge representation model (AKRM) involved in analysis and synthesis of complex knowledge representations (KRs), in accordance with some embodiments of the present invention. In an exemplary system 1800, analytical components (i.e. components configured to deconstruct or otherwise analyze input data, and to store analytical results in an AKRM data set 110), such as analysis engine 150, may be implemented as software executed on one or more processors, as hardware, or as a combination of software and hardware. Likewise, synthetical components (i.e. components configured to synthesize complex knowledge representations from an AKRM data set 110), such as synthesis engine 170, may be implemented as software executed on one or more processors, as hardware, or as a combination of software and hardware.

In some embodiments, analytical components may be co-located with one another (e.g., stored on the same computer-readable medium, or executed on the same processor). In some embodiments, analytical components may be remotely located from each other (e.g., provided as remote services or executed on remotely located computers connected by a network). Likewise, synthetical components may be co-located with each other or remotely located from each other. Analytical and synthetical components may also be referred to as "units" or "engines."

As described above, in some embodiments an elemental data structure may comprise elemental concepts and elemental concept relationships. In some embodiments, an elemental concept relationship may be unidirectional and may describe a relationship between two elemental concepts. That is, an elemental concept relationship may denote that elemental concept A has a particular relationship to elemental concept B, without denoting that elemental concept B has the same relationship to elemental concept A. In some embodiments, an elemental concept relationship may be assigned a type, such as a subsumptive type or a definitional type.

A subsumptive relationship may exist between two concepts when one of the concepts is a type, field, or class of the other concept. For example, a subsumptive relationship may exist between the concepts "biology" and "science" because biology is a field of science. The notation A→B may denote a subsumptive relationship between concepts A and B. More precisely, the notation A→B may denote that concept B subsumes concept A, or (equivalently), that concept A is a type of concept B. A subsumptive relationship may also be referred to as a 'subsumption' relationship, an 'is-a' relationship, or a 'hyponymy.'

A definitional relationship may exist between two concepts when one of the concepts may define the other concept, at least in part. For example, a definitional relationship may exist between the concepts "apple" and "skin" because an apple may have a skin. As another example, a definitional relationship may exist between the concepts "apple" and "round" because an apple may be round. The notation A-•B may denote a definitional relationship between concepts A and B. More precisely, the notation A-•B may denote that concept B defines concept A, or (equivalently), that concept A is defined by concept B. A definitional relationship may also be referred to as a "defined-by" relationship.

In some embodiments, a definitional relationship may exist only between a concept and constituents of that concept. For example, in some embodiments, a definitional relationship may exist between the concept "apple pie" and the concept "apple" or the concept "pie," because the concepts "apple" and "pie" are constituents of the concept "apple pie." In some embodiments, concept X may be a constituent of concept Y only if a label associated with concept Y comprises a label associated with concept X.

In some embodiments, AKRM data set 110 may encode a probabilistic model of elemental data structure 110. For example, in some embodiments, the probabilistic model may associate probabilities with the relationships (e.g., edges) of elemental data structure 110. A probability associated with a relationship between two concepts may represent a probable relevance of the two concepts to each other (e.g., a probability that the two concepts are related by the type of relationship with which the probability is associated. Techniques for probabilistically modeling a knowledge representation are known to one of ordinary skill in the art, as shown, for example, in U.S. Patent Application Publication No. 2012/0166371 A1, titled "Knowledge Representation Systems and Methods Incorporating Data Consumer Models and Preferences," published on Jun. 28, 2012, which is hereby incorporated by reference in its entirety.

Software embodiments of the above-described methods are known to one of ordinary skill in the art, as shown, for example, in the pseudocode examples contained in U.S. Patent Application Publication No. 2012/0166371 A1.

II. Probabilistic Analytical Processing

A user of a knowledge representation (KR), such as an elemental data structure, may wish to ascertain information about concepts and/or relationships in the KR, such as a relevance of one concept in the KR to another concept in the KR, or a relevance of a concept in the KR to a concept in which the user has expressed interest. For example, an individual may be interested in information regarding leading goal scorers in the history of international soccer. The individual may submit a query, such as "all-time leading goal scorers," to a KR system containing information about soccer. Based on the query, a KR system may identify or generate an active concept in the KR that is relevant to the query. The KR system may then identify additional concepts in the KR that are relevant to the active concept. Because the number of concepts relevant to the active concept may be very high, the KR system may seek to distinguish more relevant concepts from less relevant concepts, and return to the user information related to a certain number of the more relevant concepts.

In some embodiments, a KR system, such as exemplary KR system 1800 of FIG. 11, may model a KR as a graph (or network) and use various parameters associated with the graph to estimate a relevance of one concept to another concept. In some embodiments, the nodes of the graph may correspond to the concepts of the KR, and the edges of the graph may correspond to the relationships among the concepts. In some embodiments, the graph may be directed. Though, in some embodiments, some or all of the edges may be undirected. In some embodiments, system 1800 may estimate a relevance of a first concept to a second concept as a shortest path length, an average path length, or a number of paths from the first concept to the second concept. In some embodiments, system 1800 may estimate a relevance of a first concept to a second concept as a function of the shortest path length, average path length, and/or number of paths. Though, embodiments of system 1800 are not limited in this regard. System 1800 may estimate a relevance of a first concept to a second concept using any flow algorithm, routing algorithm, or other appropriate graph algorithm as is known in the art or otherwise suitable for assessing a relationship between two nodes in a graph.

However, in some cases, the above-mentioned techniques may not accurately discriminate among concepts that are more relevant to an active concept and concepts that are less relevant to the active concept, because the above-mentioned techniques for estimating relevance may fail to account for uncertainties associated with the concepts and relationships in the KR. In some cases, a conventional KR system may fail to account for such uncertainties because conventional techniques for constructing a KR, such as manual KR construction techniques, may fail to identify or quantify such uncertainties. For example, conventional techniques may simply determine that a first concept is or is not relevant to a second concept, rather than estimating a strength of the first concept's relevance to the second concept. As another example, conventional techniques may simply determine that two concepts are related, rather than estimating a probability that the relationship exists.

Figure 12A:
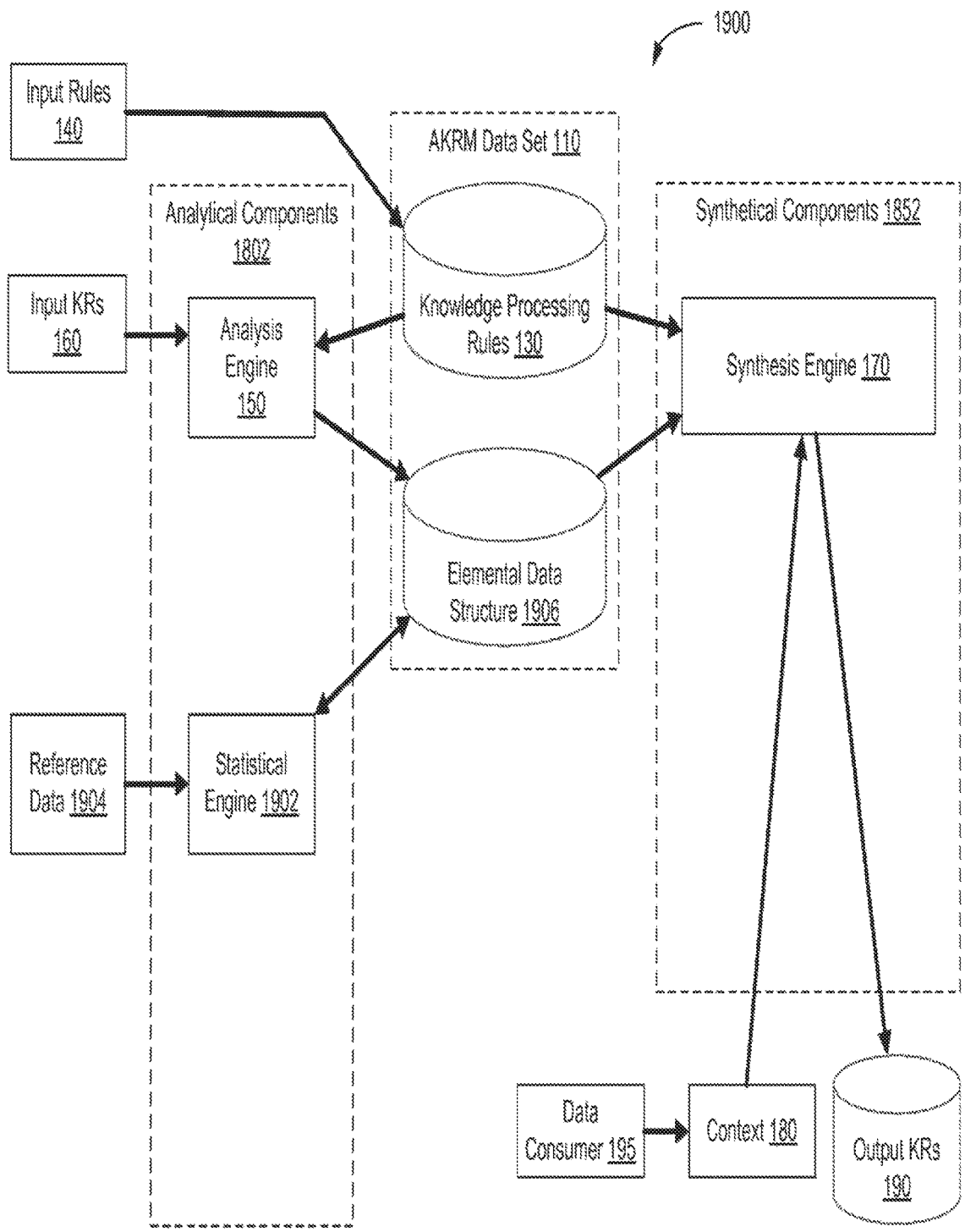
FIG. 12A is a block diagram illustrating yet another exemplary system for implementing an atomic knowledge representation model in accordance with some embodiments of the present invention.

FIG. 12A illustrates an exemplary system 1900 that may be employed in some embodiments for implementing an atomic knowledge representation model (AKRM) involved in analysis and synthesis of complex knowledge representations (KRs), in accordance with some embodiments of the present invention. In some embodiments, statistical engine 1902 may estimate probabilities associated with elemental concepts and/or elemental concept relationships in an elemental data structure 1906. In some embodiments, statistical engine 1902 may model elemental data structure 1906 as a statistical graph, with the nodes and edges of the statistical graphical model corresponding to the elemental concepts and elemental concept relationships, respectively, of the elemental data structure 1906. In some embodiments, a probability associated with an elemental component of elemental data structure 1906 may be assigned to the corresponding graphical component (i.e. node or edge) of the statistical graphical model. In some embodiments, statistical engine 1902 may apply statistical inference techniques to the graphical model to estimate the relevance of a first elemental concept of the elemental data structure 1906 to a second elemental concept of the elemental data structure 1906, and/or to estimate a relevance of an elemental concept of the elemental data structure 1906 to a data consumer 195, context information 180, or an active concept. In some embodiments, exemplary system 1900 may use these estimates to distinguish concepts that are more relevant to a data consumer 195, context information 180, or an active concept, from concepts that less relevant thereto.

In some embodiments, a probability associated with an elemental component may represent an estimate of a relevance of the elemental component. In some embodiments, a probability associated with an elemental concept relationship between first and second elemental concepts may represent an estimate of a relevance of the first elemental concept to the second elemental concept, and/or a relevance of the second elemental concept to the first elemental concept. In some embodiments, a probability associated with an elemental concept may represent an estimate of a relevance of the elemental concept to a data consumer 195, context information 180 associated with the data consumer 195, and/or an active concept extracted from context information 180. In some embodiments, a probability associated with a concept may represent a frequency with which the concept's label appears in reference data 1904. In some embodiments, the probability associated with a concept may represent an importance of the concept, which may be assigned by a data consumer 195 or determined by statistical engine 1902 based on reference data 1904.

In some embodiments, statistical engine 1902 may estimate a relevance of an elemental concept relationship between a first elemental concept and a second elemental concept by calculating a frequency of occurrence in reference data 1904 of a label associated with the first concept and/or a label associated with the second concept. In some embodiments, the calculated frequency may be a term frequency, a term-document frequency, or an inverse document frequency. For example, statistical engine 1902 may estimate a probability associated with a relationship between first and second concepts by calculating a percentage of documents in reference data 1904 that contain first and second labels associated with the first and second concepts, respectively. Methods of calculating term frequency, term-document frequency, and inverse document frequency are described in the Appendix, below. In some embodiments, a search engine may be used to determine a frequency of occurrence of a symbol or label associated with a concept in external data 1904. In some embodiments, the term-document frequency of a concept may correspond to a number of search engine hits associated with the concept's label. Additionally or alternatively, embodiments of statistical engine 1902 may estimate a relevance of an elemental concept relationship using techniques known in the art or any other suitable techniques.

In some embodiments, statistical engine 1902 may estimate a relevance of a concept to a data consumer 195 or to context information 180 by calculating a frequency of occurrence in reference data 1904 of a label associated with the concept and/or a label associated with an active concept. In some embodiments, an active concept may be provided by data consumer 195 as part of context information 180. In some embodiments, an active concept may be extracted from context information 180 using techniques known in the art or any other suitable techniques. For example, an active concept may be extracted using techniques disclosed in U.S. patent application Ser. No. 13/162,069, titled "Methods and Apparatus for Providing Information of Interest to One or More Users," filed Dec. 30, 2011, and incorporated herein by reference in its entirety. In some embodiments, an active concept may be extracted from a data consumer model associated with data consumer 195.

In some embodiments, a statistical engine 1902 may estimate that a concept is either relevant (e.g., the estimate relevance is 1) or irrelevant (e.g., the estimated relevance is 0) to a data consumer 195. In some embodiments, treating concepts as relevant or irrelevant to a data consumer 195 may facilitate construction of user-specific elemental data structures, by allowing exemplary system 1900 to identify concepts in which the data consumer has little or no interest and prune such concepts from the user-specific elemental data structure.

In some embodiments of exemplary system 1900, statistical engine 1902 may apply statistical inference techniques to compute a joint probability distribution of two or more nodes in a statistical graphical model associated with elemental data structure 1906. In some embodiments, the statistical inference techniques may account for a priori assumptions about relationships among concepts. For instance, it may be known that certain concepts are not related, or it may be known that some concepts are strongly related. In some embodiments, exemplary system 1900 may use the joint probability distribution of two or more nodes in the statistical graphical model to answer queries about relationships among concepts in elemental data structure 1906, or to synthesize an output KR 190 associated with context information 180. In some embodiments, statistical engine 1902 may estimate an extent to which two concepts are related, semantically coherent, or relevant to one another by computing appropriate marginal posterior probabilities associated with the statistical graphical model. The statistical inference techniques applied by statistical engine 1902 may be techniques known in the art or any other suitable techniques.

In some embodiments of exemplary system 1902, reference data 1904 may include knowledge representations such as documents and unstructured text, as well as non-text data sources such as images and sounds. In some embodiments, a document in reference data 1904 may comprise a phrase, a sentence, a plurality of sentences, a paragraph, and/or a plurality of paragraphs. Reference data 1904 may include a corpus or corpora of such knowledge representations. In some embodiments, reference data 1904 differs from input KRs 160 deconstructed by analysis unit 150.

FIG. 12A illustrates an exemplary system 1900 in which a computer-readable data structure storing data associated with elemental data structure 1906 may also store data associated with a statistical graphical model associated with elemental data structure 1906. For example, elemental data structure 1906 may be represented as a graph, with elemental concepts and elemental concept relationships encoded as node data structures and edge data structures, respectively. In some embodiments, the node and edge data structures associated with elemental data structure 1906 may also be associated with the statistical graphical model. In some embodiments, a relevance associated with an elemental component of elemental data structure 1906 may also be stored in a node or edge data structure. In other words, in some embodiments, the encoding of the statistical graphical model may simply be the encoding of elemental data structure 1906, or a portion thereof.

Figure 12B:
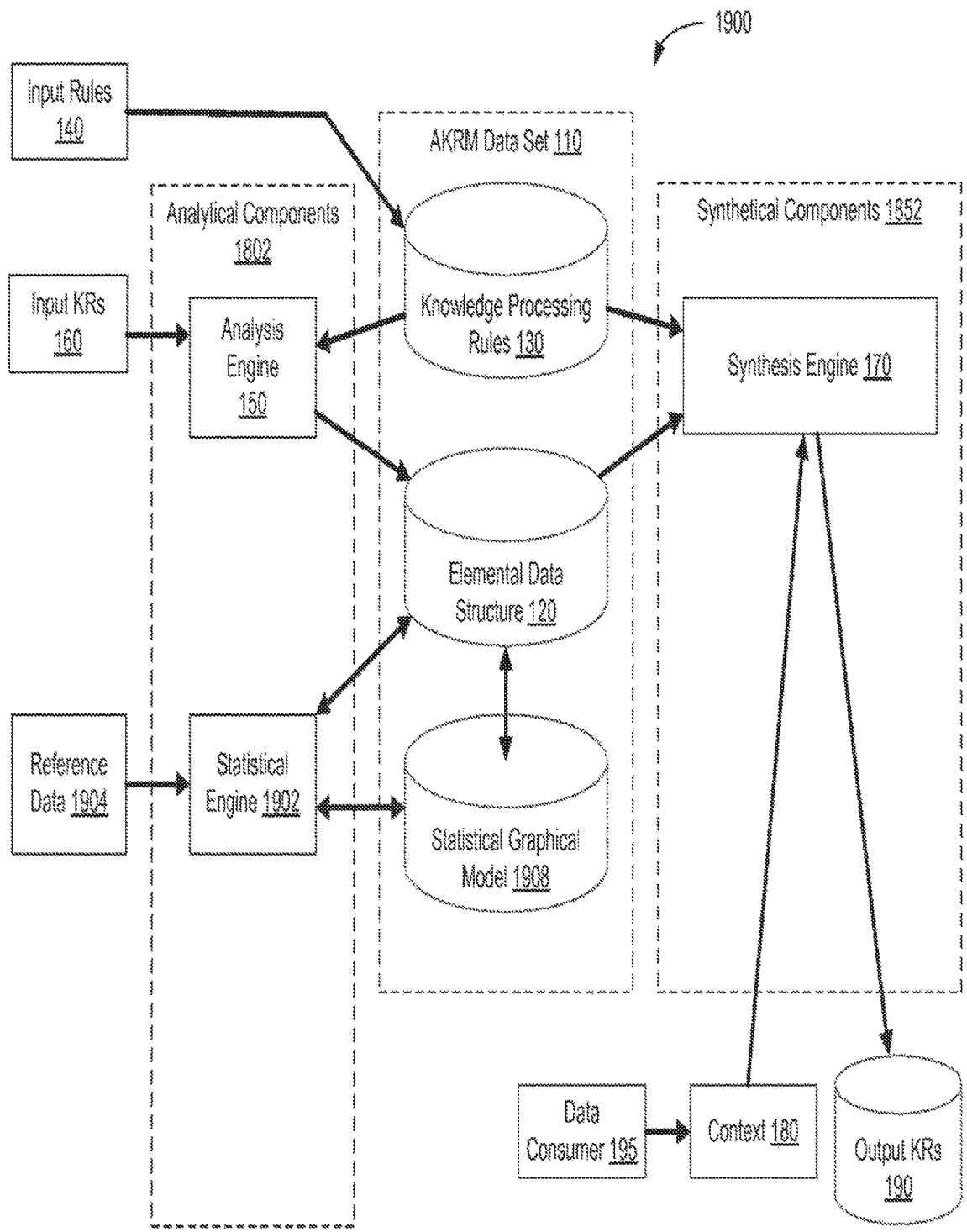
FIG. 12B is a block diagram illustrating yet another exemplary system for implementing an atomic knowledge representation model in accordance with some embodiments of the present invention.

By contrast, FIG. 12B illustrates an exemplary system 1900 in which at least a portion of statistical graphical model 1908 is encoded separately from an encoding of elemental data structure 120. In some embodiments, elemental data structure 120 may be represented as a graph, with concepts and relationships encoded as node and edge data structures, respectively. Though, in some embodiments, elemental data structure 120 may be represented as a table, with concepts and relationships encoded as entries in the table. Embodiments of exemplary system 1900 are not limited in this regard. In some embodiments, a relevance associated with an elemental component of elemental data structure 120 may be encoded as a probability in a distinct data structure associated with statistical graphical model 1908.

In some embodiments, statistical graphical model 1908 comprise nodes and edges corresponding to concepts and relationships of elemental data structure 120. In some embodiments, statistical graphical model 1908 may further comprise nodes and/or edges that do not correspond to concepts and relationships of elemental data structure 120. Accordingly, in some embodiments, statistical graphical model 1908 may be encoded as a graph data structure. The graph data structure may comprise data associated with nodes and edges of the statistical graphical model 1908. In some embodiments, the encoded data may include data corresponding to concepts and relationships of elemental data structure 120. In some embodiments, the encoded data may further comprise data corresponding to other concepts and/or relationships. In some embodiments, the encoded data may include probabilities corresponding to relevance values associated with the nodes and edges of the statistical graphical model 1908.

In some embodiments, statistical engine 1902 may modify elemental data structure 120 based on probabilities associated with statistical graphical model 1908. For example, if statistical graphical model 1908 contains an edge between two nodes corresponding to two concepts in elemental data structure 120, and a probability assigned to the edge exceeds a first relationship threshold, statistical engine 1902 may add a relationship corresponding to the edge to elemental data structure 120, and assign a relevance to the relationship that corresponds to the edge's probability. Likewise, if statistical graphical model 1908 contains an edge, and a probability assigned to the edge is less than a second relationship threshold, statistical engine 1902 may remove a relationship corresponding to the edge from elemental data structure 120.

In some embodiments, if the probability associated with a node of the statistical graphical model 1908 exceeds a first concept threshold, statistical engine 1902 may add a concept corresponding to the node to elemental data structure 120, and assign the concept a relevance that corresponds to the node's probability. Likewise, if statistical graphical model contains a node, and a probability assigned to the node is less than a second concept threshold, statistic engine 1902 may remove a concept corresponding to the node from elemental data structure 120.

Figure 9:
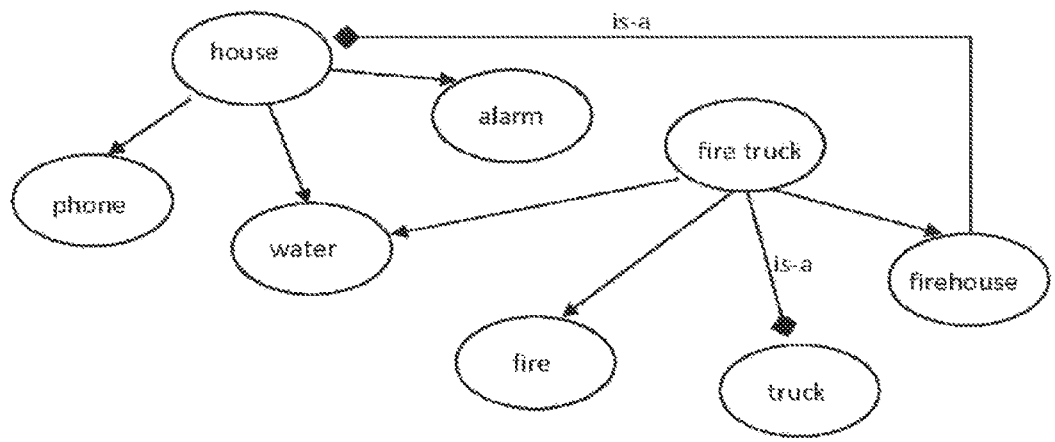
FIG. 9 is an illustration of a KR that fails to account for uncertainties associated with the concepts and relationships in the KR.

FIG. 9 illustrates limitations of a conventional KR through an example of a KR constructed in accordance with conventional KR construction techniques and represented as a graph. The graph of FIG. 9 comprises a set of vertices representing concepts such as "house," "fire truck," and "alarm," and a set of edges representing relationships between concepts, such as the subsumptive relationship between the concepts "fire truck" and "truck." Because the graph of FIG. 9 fails to account for uncertainties associated with the concepts and relationships in the KR, a user of the graph may have difficulty determining, for example, whether the concept "phone" or the concept "alarm" is more relevant to the concept "house."

Figure 10:
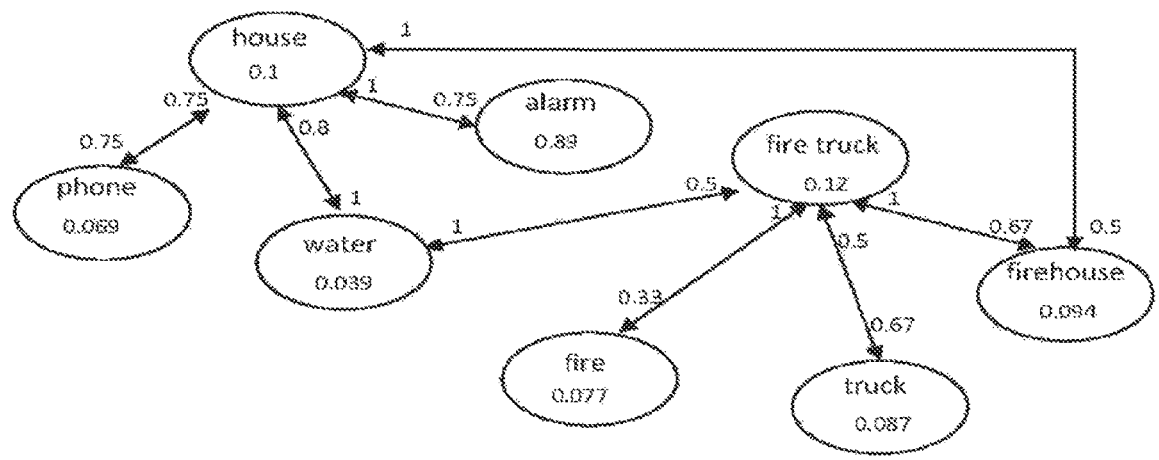
FIG. 10 is an illustration of a statistical graphical model associated with an elemental data structure.

FIG. 10 depicts an illustrative statistical graphical model associated with a KR. The nodes of the model correspond to the concepts shown in the graph of FIG. 9. The illustrated model comprises a directed graph, wherein bidirectional edges are shown using a line with arrows on each end. A probability is associated with each node and with each edge. In order to determine a relevance of the concept "fire-truck" to the concept "alarm," statistical engine 1902 may apply statistical inference techniques to the graphical model of FIG. 10. Suitable statistical inference techniques are described in the Appendix.

In some embodiments, the statistical graphical model of exemplary system 1900 may comprise a semantic network associated with an elemental data structure, with the nodes and edges of the semantic network corresponding to the concepts and relationships of the elemental data structure. In some embodiments, statistical engine 1902 may use the semantic network to check a semantic coherence associated with the elemental data structure. In some embodiments, checking a semantic coherence of an elemental data structure may comprise calculating a semantic coherence of two or more concepts in the elemental data structure. In some embodiments, calculating a semantic coherence of two or more concepts in the elemental data structure may comprise using the probabilities associated with the nodes of the statistical graphical model to compute joint probabilities associated with the nodes corresponding to the two or more concepts.

Figure 29:
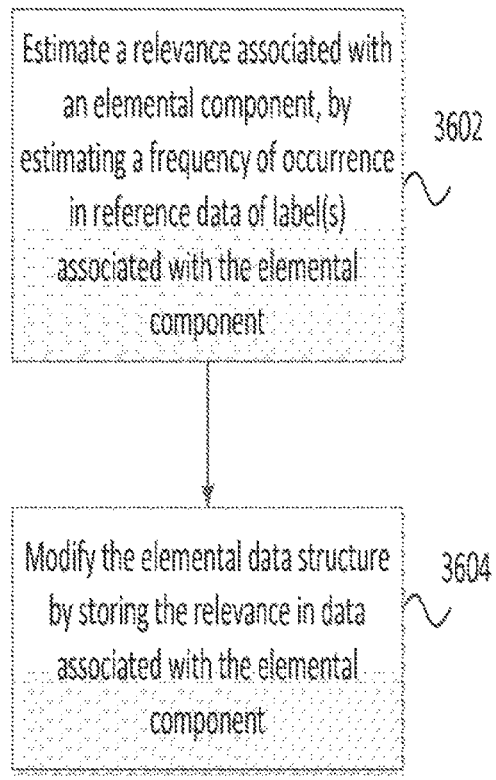
FIG. 29 is a flow chart of an exemplary process of modifying an elemental data structure based on relevance.

FIG. 29 depicts an exemplary method of modifying an elemental data structure to account for uncertainty associated with components of the elemental data structure. At act 3602 of the exemplary method, a relevance associated with an elemental component may be estimated. In act 3602, estimating the relevance associated with the elemental component comprises estimating a frequency of occurrence in reference data of one or more labels associated with the elemental component.

In some embodiments, the relevance estimated at act 3602 may be a relevance of a first elemental concept to a second elemental concept. In some embodiments, if the first and second elemental concepts are included in the elemental data structure, the relevance may be associated with a relationship between the two concepts. In some embodiments, if the first elemental concept is included in the elemental data structure and the second elemental concept is not, the relevance may be associated with the first elemental concept. In some embodiments, the relevance may be a relevance of a first elemental concept of the elemental data structure to a data consumer, context information, a data consumer model, or an active concept.

In some embodiments, the a frequency of occurrence in reference data of one or more labels associated with the elemental component may be a term frequency, a term-document frequency, and/or an inverse document frequency. In some embodiments, estimating a frequency of occurrence of label(s) associated with the elemental component may comprise using a search engine to identify documents containing the label(s).

At act 3604 of the exemplary method, the elemental data structure may be modified to store the computed relevance in data associated with the elemental component. Though, in some embodiments, a probability corresponding to the relevance may be stored in data associated with a node of a statistical graphical model corresponding to the elemental data structure.

Figure 30:
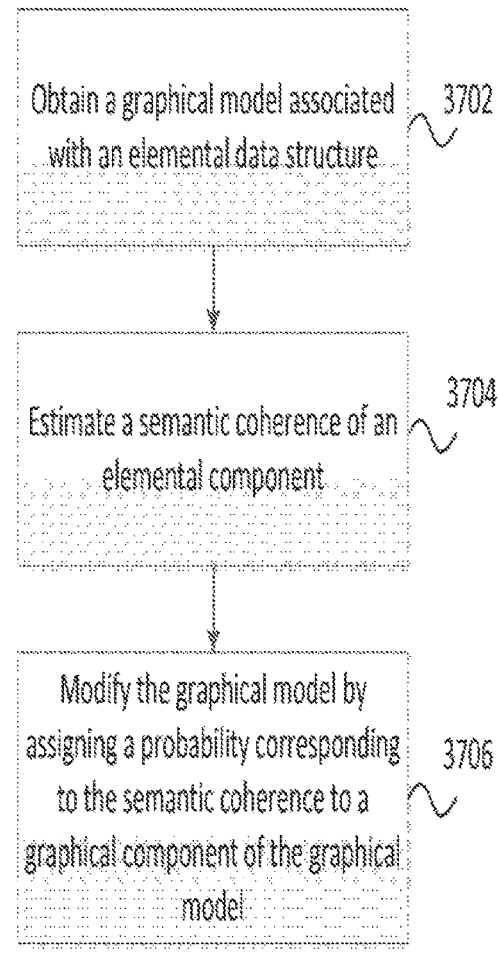
FIG. 30 is a flow chart of an exemplary process of a graphical model associated with an elemental data structure based on semantic coherence.

FIG. 30 depicts an exemplary method of modifying a graphical model associated with an elemental data structure to store probabilities associated with components of the elemental data structure. At act 3702 of the exemplary method, a graphical model associated with the elemental data structure may be obtained. In some embodiments, the graphical model may be created with nodes and edges corresponding to the concepts and relationships of the elemental data structure, respectively. In some embodiments, the data associated with a node may include a probability corresponding to semantic coherence of the corresponding concept. In some embodiments, the data associated with an edge may include a probability corresponding to a semantic coherence of the corresponding relationship.

At act 3704 of the exemplary method, a semantic coherence of an elemental component may be estimated. In some embodiments, the elemental component may be contained in the elemental data structure. Though, in some embodiments, the elemental component may not be part of the elemental data structure. In some embodiments, the semantic coherence of an elemental component may be estimated by calculating a frequency of occurrence in reference data of one or labels associated with the elemental component. In some embodiments, the calculated frequency may be a term frequency, term-document frequency, and/or inverse document frequency. In some embodiments the semantic coherence of two or more elemental components may be estimated by calculating a joint probability of the graphical components (nodes and/or edges) corresponding to the two or more elemental components.

At act 3706 of the exemplary method, the graphical model may be modified by assigning a probability corresponding to the semantic coherence of the elemental component to a graphical component of the graphical model. In some embodiments, the graphical component may not correspond to any elemental component in the elemental data structure. In some embodiments, such a graphical component may be used to determine a semantic coherence of a candidate concept or relationship. If the semantic coherence of a candidate concept exceeds a first threshold semantic coherence, the candidate concept may be added to the elemental data structure. If the semantic coherence of a candidate relationship exceeds a second threshold semantic coherence, the candidate relationship may be added to the elemental data structure. Likewise, if the semantic coherence associated with a component of an elemental data structure is less than a threshold semantic coherence, the component may be removed from the elemental data structure.

The above-described techniques may be implemented in any of a variety of ways. In some embodiments, the techniques described above may be implemented in software. For example, a computer or other device having at least one processor and at least one tangible memory may store and execute software instructions to perform the above-described techniques. In this respect, computer-executable instructions that, when executed by the at least one processor, perform the above described techniques may be stored on at least one non-transitory tangible computer-readable medium.

III. Analytical Processing of User Models

Figure 13:
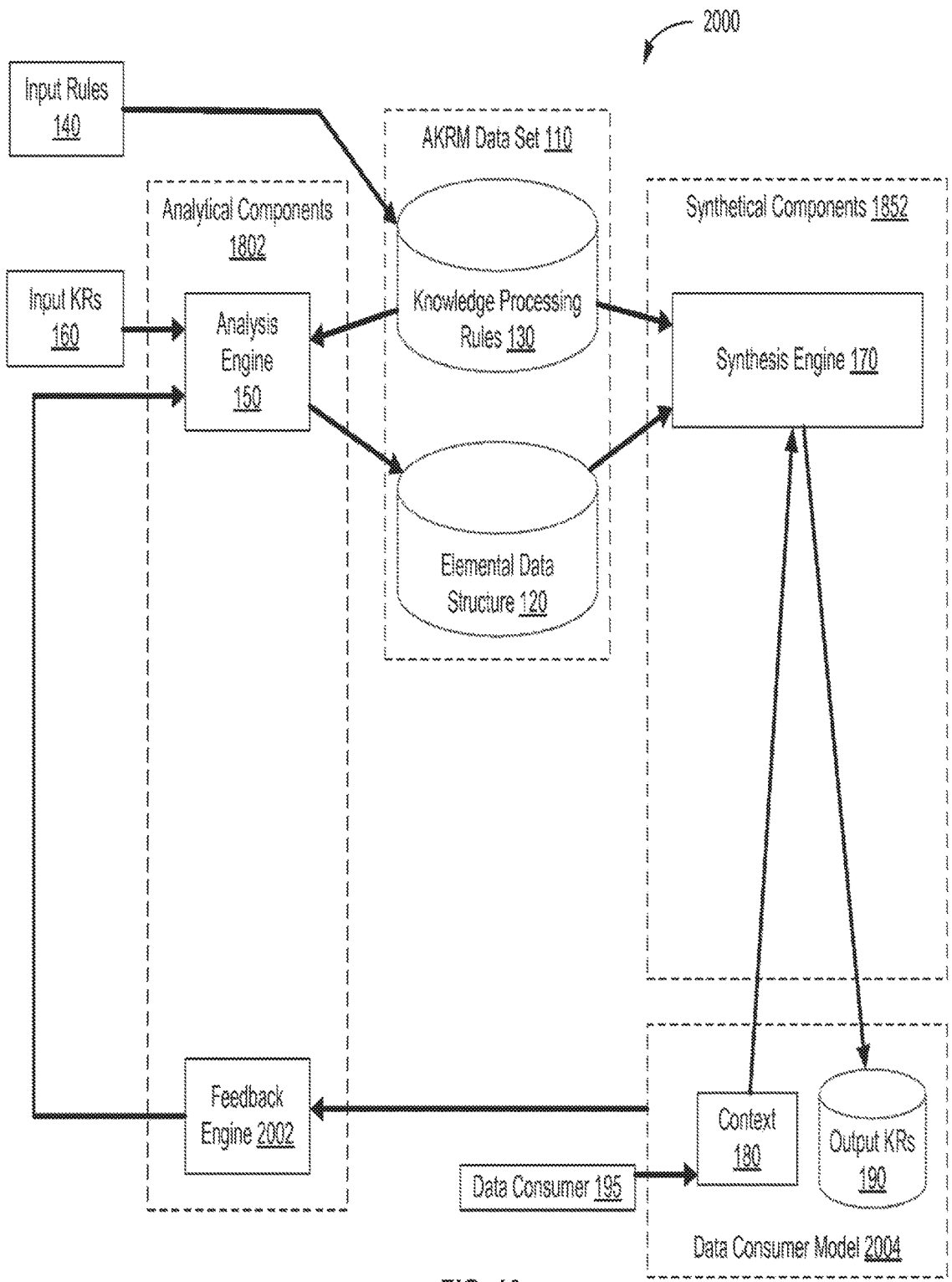
FIG. 13 is a block diagram illustrating yet another exemplary system for implementing an atomic knowledge representation model in accordance with some embodiments of the present invention.

FIG. 13 illustrates an exemplary system 2000 that may be employed in some embodiments for implementing an atomic knowledge representation model (AKRM) involved in analysis and synthesis of complex knowledge representations (KRs), in accordance with some embodiments of the present invention. In some embodiments, exemplary system 2000 may implement a complex-adaptive feedback loop through a feedback engine 2002. In some embodiments, the feedback loop may facilitate maintenance and quality improvements of one or more elemental data structures 120 in AKRM data set 110. In some embodiments, the feedback loop may facilitate disambiguation (i.e. detection and resolution of ambiguities in an AKRM), crowd sourcing (i.e. analyzing data associated with a population and modifying an AKRM to include new concepts and/or relationships associated with a threshold portion of the population), and/or tailoring (i.e. analyzing user-specific data and maintaining different elemental data structures for different users).

In an exemplary system 2000, analytical components 1802 may include a feedback engine 2002. Feedback engine 2002 may receive, as input, data consumer models 2004. Feedback engine 2002 may provide, as output, selected data consumer models 2004, or portions thereof. Analysis engine 150 may receive, as input, the selected data consumer models 2004, or portions thereof, provided by feedback engine 2002.

In some embodiments, data associated with a data consumer model 2004 may be encoded using the exemplary data schema 350 of FIG. 3, or any other suitable data structure. The data structure corresponding to a data consumer model 2004 may be stored on a computer-readable medium.

In some embodiments, a data consumer model 2004 (or "user model" 2004) may comprise data acquired from one or more information sources. For example, a user model 2004 may comprise one or more output KRs 190 provided by synthesis engine 170. In some embodiments, a user model 2004 may comprise data derived from an interaction of a data consumer 195 with an output KR 190. Exemplary interactions of a data consumer 195 with an output KR 190 may include selection, highlighting, or specification by a data consumer 195 of one or more output KRs 190 from a plurality of output KRs presented by synthesis engine 170, or selection, highlighting, or specification by the data consumer 195 of a particular aspect or portion of an output KR 190. Though, a user model 2004 may comprise data derived from any interaction of a data consumer 195 with an output KR 190. Embodiments of exemplary system 2000 are not limited in this respect. As discussed below, analysis of data derived from an interaction of a data consumer 195 with an output KR 190 may allow embodiments of analytical components 1802 to resolve ambiguities in an AKRM.

In some embodiments, a user model 2004 may comprise context information 180 or data associated with context information 180. As discussed above, context information 180 may include a textual query or request, one or more search terms, identification of one or more active concepts, etc. As discussed below, analysis of data associated with context information 180 may allow embodiments of analytical components 1802 to tailor elemental data structures to users or groups of users.

In some embodiments, a data consumer model 2004 may correspond to a data consumer 195. In some embodiments, a data consumer model 2004 corresponding to a data consumer 195 may persist for the duration of the data consumer's session with exemplary system 2000. Some embodiments of a data consumer model 2004 may persist across multiple sessions. A session may begin when a data consumer logs in or connects to exemplary system 2000, and may end when a data consumer logs out or disconnects from exemplary system 2000. Though, the scope of a session may be determined using conventional techniques or any suitable techniques. Embodiments are not limited in this respect.

In some embodiments, by feeding back user models 2004 to analytical components 1802, exemplary system 2000 may cause analytical components 1802 to modify an elemental data structure 120 based on data contained in a user model 2004. Such modifications may include adding an elemental concept to the elemental data structure, removing an elemental concept, resolving two or more elemental concepts into a single elemental concept, splitting an elemental concept into two or more elemental concepts, adding an elemental concept relationship between two elemental concepts, and/or removing an elemental concept relationship. Further, a level to which the analytical components 1802 deconstruct an elemental data structure may depend on concepts and/or relationships contained in a user model 2004. In some embodiments, a level to which the analytical components 1802 deconstruct an elemental data structure 120 may comprise an intra-word level or an inter-word level, such as with phrases and larger language fragments.

In one aspect, analytical components 1802 may resolve ambiguities in an elemental data structure 120 based on data contained in a user model 2004. In some embodiments, analytical components 1802 may resolve ambiguities in an elemental data structure 120 based on data contained in context information 180. For example, a user model 2004 may contain context information 180 including query data or active concepts that a data consumer 195 supplied to synthetical components 1852. The user model 2004 may further contain data indicating that, in response to the query data or active concepts, the synthetical components 1852 provided multiple output KRs 190 to the data consumer. The user model 2004 may further contain data indicating that the data consumer 195 selected one of output KRs. Based on this data, analytical components 1802 may ascertain one or more relationships between concepts associated with context information 180 and concepts associated with the selected output KR 190, and may add these one or more relationships to an elemental data structure 120. The addition of these one or more relationships may resolve ambiguities in the elemental data structure 120, thereby increasing the relevance of output KRs synthesized by synthetical components 1852 in response to user-supplied context information 180.

In a second aspect, exemplary system 2000 may use a feedback loop to tailor an elemental data structure to a particular data consumer or group of data consumers 195. In some embodiments, analytical components 1802 may perform tailoring by modifying a user-specific elemental data structure based on data contained in a corresponding user model 2004. In some embodiments, synthetical components 1852 may rely on user-specific elemental data structures to synthesize output KRs that are particularly relevant to the data consumer 195 associated with context information 180.

For example, a first user model 2004 corresponding to a first data consumer 195 may include data associated with baseball. Based on first user model 2004, analytical components 1802 may modify a first user-specific elemental data structure 120 corresponding to first data consumer 195 to include concepts and relationships associated with baseball. When first data consumer 195 provides a concept "bat" as part of context information 180, synthetical components 1852 may provide an output KR that is relevant to baseball bats, rather than an output KR that is relevant to (for example) winged bats.

Continuing the example, a second user model 2004 corresponding to a second data consumer 195 may include data associated with nature. Based on second user model 2004, analytical components 1802 may modify a second user-specific elemental data structure 120 corresponding to a second data consumer 195 to include concepts and relationships associated with nature. When second data consumer 195 provides a concept "bat" as part of context information 180, synthetical components 1852 may provide an output KR that is relevant to winged bats, rather than an output KR that is relevant to (for example) baseball bats.

In some embodiments, a user-specific elemental data structure may be an elemental data structure 120 constructed using at least one user model 2004 that corresponds to a particular data consumer or group of data consumers 195. In some embodiments, a user-specific elemental data structure may be encoded independent of any other elemental data structure 120, or may be encoded as one or more modifications to another elemental data structure 120.

In a third aspect, analytical components 1802 may crowd-source an elemental data structure 120. Crowd-sourcing may refer to a process of ascertaining information by relying on data associated with a population (the crowd) to verify, discredit, or discover information. In some embodiments, analytical components 1802 may perform processing, such as mathematical or statistical processing, on user models 2004 to estimate a prevalence of a concept or a relationship in a population. In some embodiments, the population may comprise all data consumers. In some embodiments, the population may comprise a group of data consumers, such as a group of data consumers having a common interest or attribute. In some embodiments, a subset of the user models 2004 may be fed back from the synthetical components 1852, the subset representing a statistical sample of the population. Upon identifying a concept or relationship associated with a threshold portion of a population, embodiments of analytical components 1802 may modify an elemental data structure 120 to include the concept or relationship. In some embodiments, a crowd-sourced elemental data structure may contain an aggregation of concepts and relationships that is associated with the crowd collectively, even if the aggregation of concepts and relationships is not associated with an individual member of the crowd.

In some embodiments, the processing performed by the analytical components 1802 may comprise calculating a portion (e.g., a number or a percentage) of user models 2004 that contain a concept or relationship. In some embodiments, the processing performed by the feedback engine 2002 may comprise estimating a portion (e.g., a number or a percentage) of population members associated with the concept or relationship. In some embodiments, if the calculated or estimated portion exceeds a threshold, the feedback engine 2002 may provide a knowledge representation containing the concept or relationship to the analysis engine 150. The threshold may be fixed or configurable.

For example, if a threshold portion of user models contain evidence of a first relationship between a concept "bat" and a concept "baseball," the feedback engine 2002 may provide a knowledge representation containing a relationship between the concept "bat" and the concept "baseball" to analysis engine 150, and the analysis engine may apply knowledge processing rules 130 to modify an elemental data structure 120 to include the first relationship.

Figure 19:
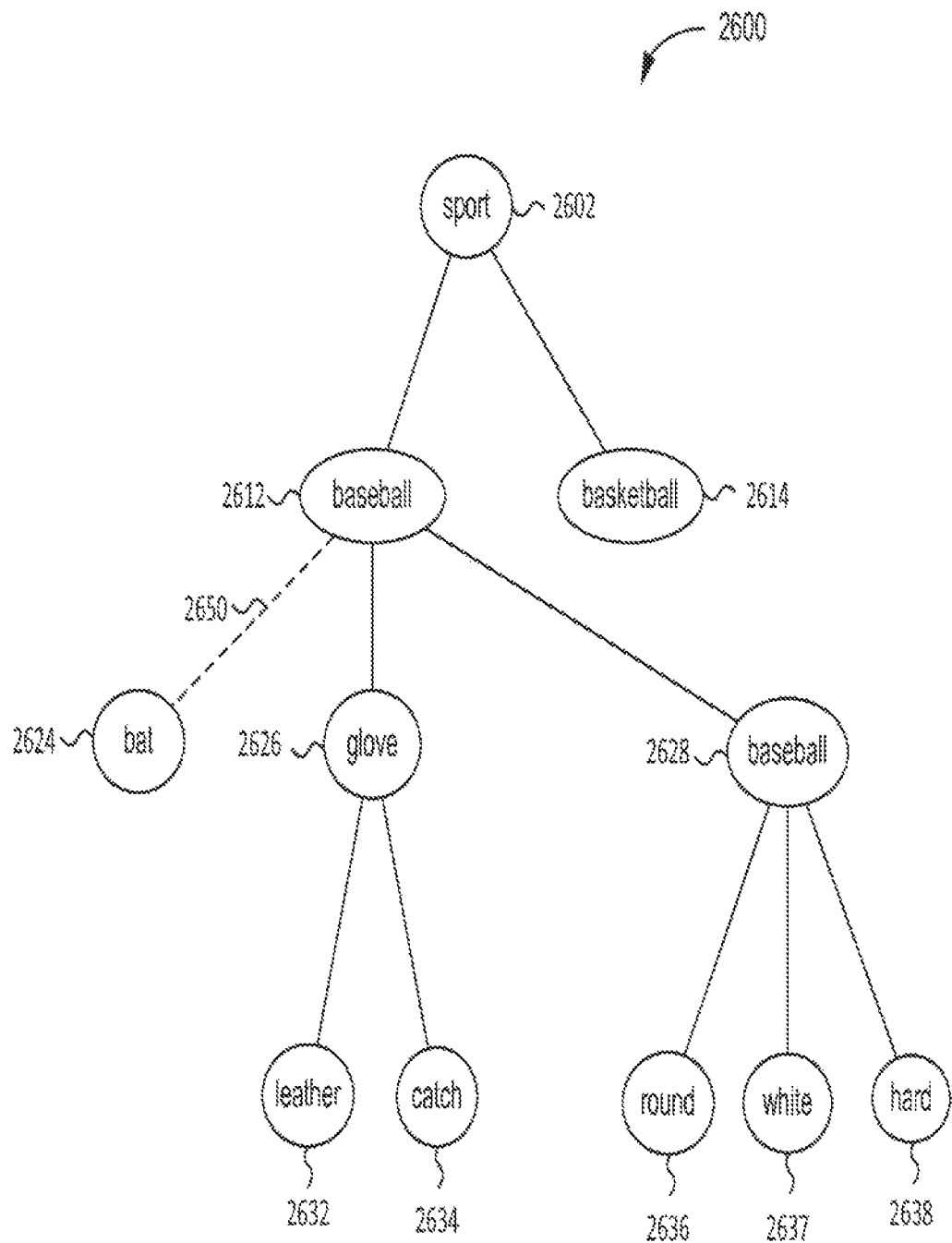
FIG. 19 illustrates an example of a knowledge representation that may be modified by to include a relationship detected in a user model.

If the elemental data structure already contains the concepts "baseball" and "bat," but does not contain a relationship between the concepts, modifying the elemental data structure to include the first relationship between "bat" and "baseball" may comprise adding the first relationship to the elemental data structure. FIG. 19 illustrates such a scenario. In FIG. 19, a relationship 2650 is added to an elemental data structure 2600. The relationship 2650 relates two concepts, baseball 2612 and bat 2624, which were already present in elemental data structure 2600.

Figure 20:
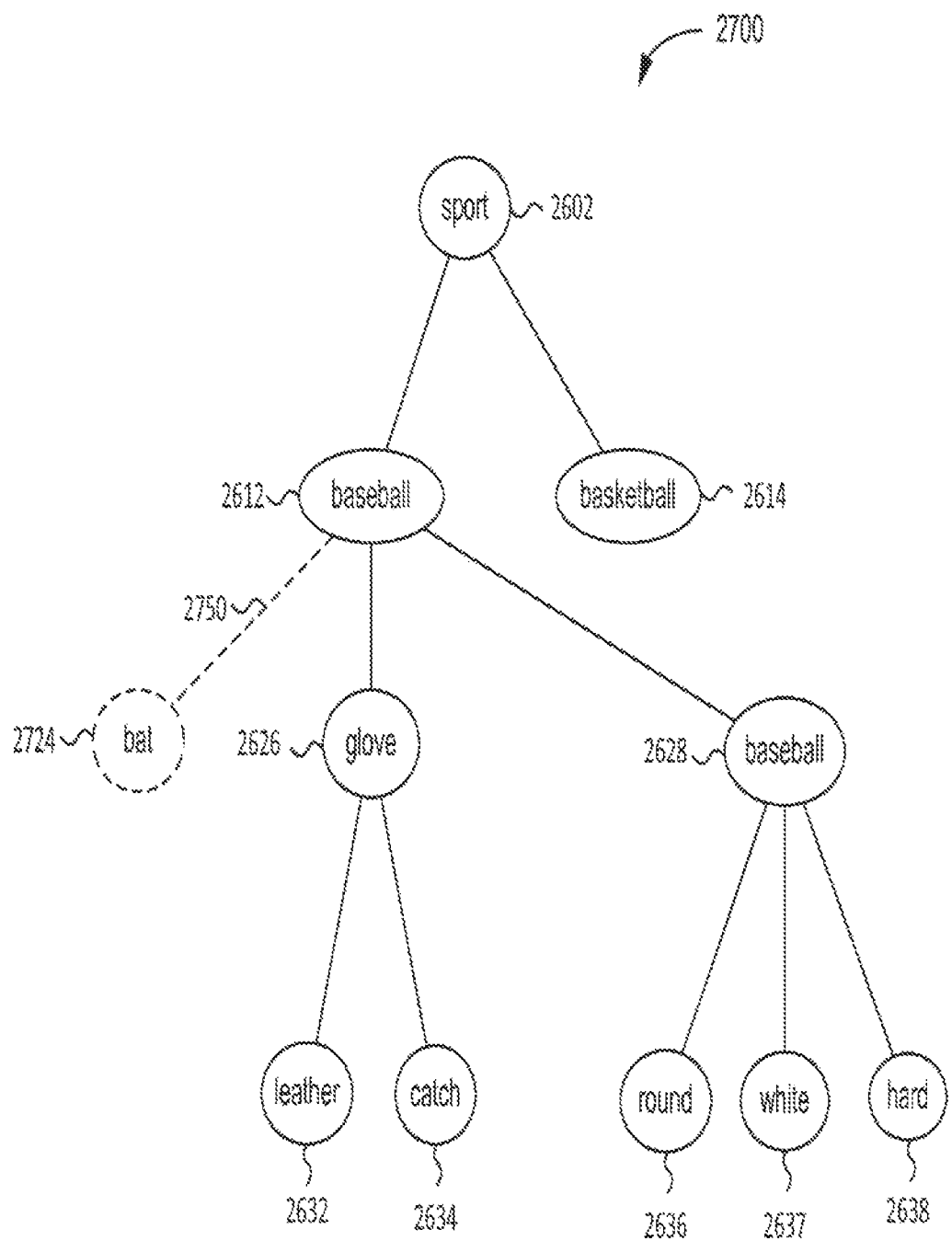
FIG. 20 illustrates an example of a knowledge representation that may be modified by to include a relationship and a concept detected in a user model.

If the elemental data structure contains the concept "baseball" but not the concept "bat," modifying the elemental data structure to include the first relationship between "bat" and "baseball" may comprise adding the concept "bat" and the first relationship to the elemental data structure. FIG. 20 illustrates such a scenario. In FIG. 20, a concept "bat" 2724 and a relationship 2750 are added to an elemental data structure 2700. The relationship 2750 relates the new concept, "bat" 2724, to the pre-existing concept "baseball" 2612.

In some embodiments, application of knowledge processing rules 130 by analysis engine 150 to a crowd-sourced knowledge representation may result in merging a first concept and a second concept (i.e. resolving the two concepts into a single concept). The first and second concepts may be associated with first and second labels. In some embodiments, the first and second labels may be identical. In some embodiments, the relationships associated with the single concept (after the merge operation) may comprise the union of the relationships associated with the first and second concepts (prior to the merge operation). For example, an elemental data structure 120 may contain a first concept "bat" related to a concept "wood" and a second concept "bat" related to a concept "swing." The first and second concepts may be merged into a single concept "bat" that is related to both "wood" and "swing."

Figure 21A:
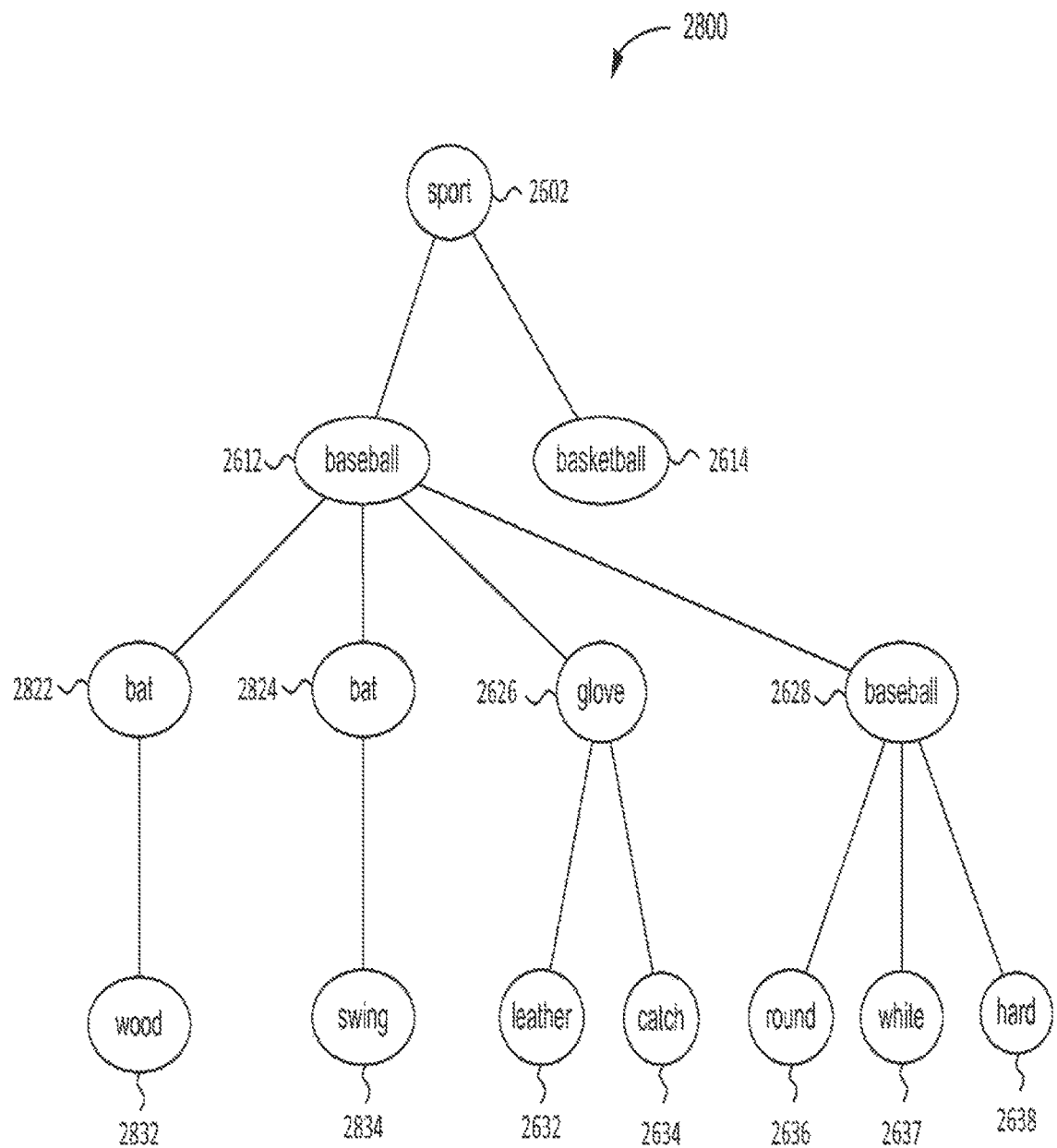
FIG. 21A illustrates an example of a knowledge representation containing two concepts that may eligible for merging.
Figure 21B:
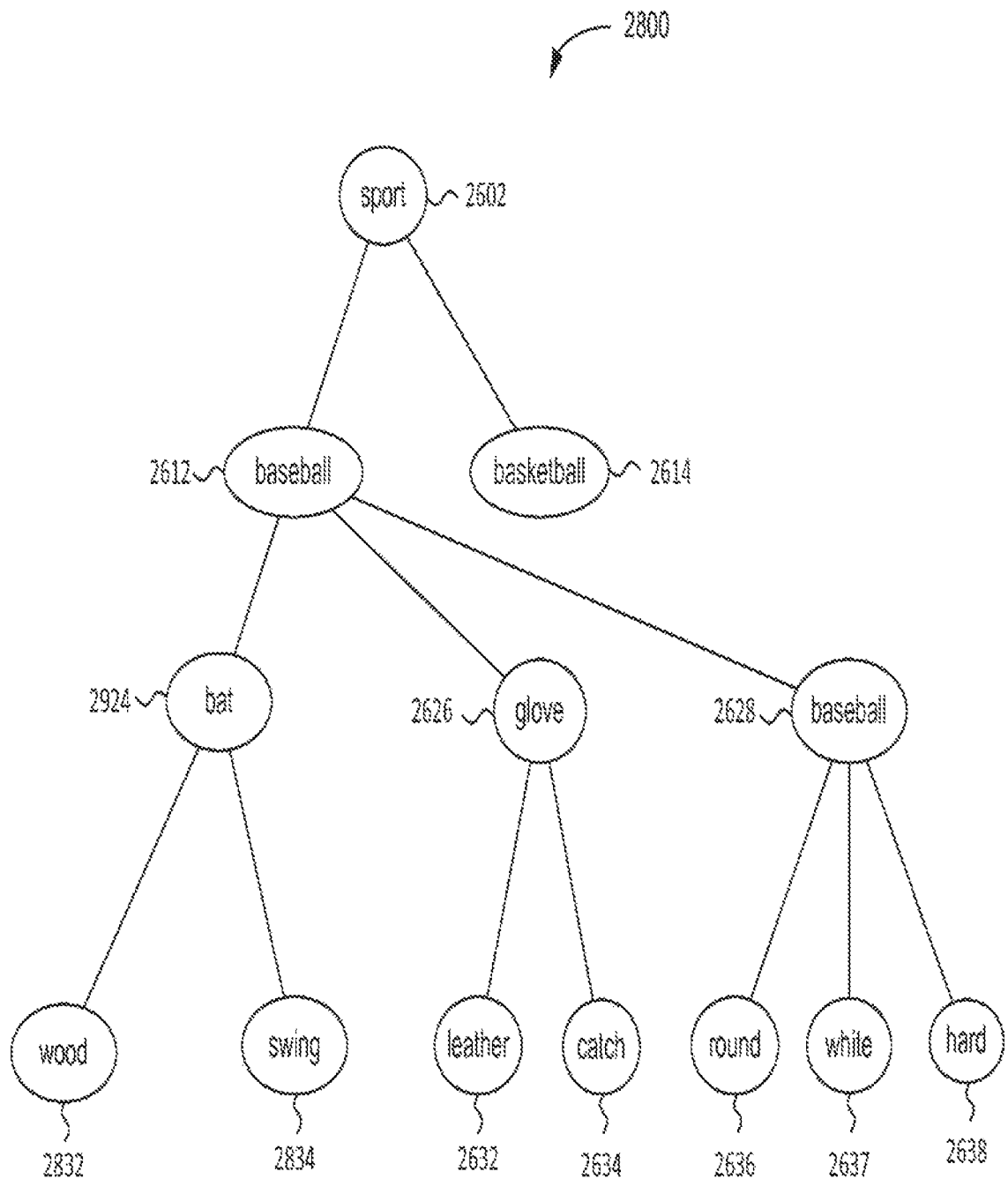
FIG. 21B illustrates an example of the knowledge representation of FIG. 21A after merging two concepts.

FIGS. 21A and 21B illustrate an example of resolving a first concept "bat" 2822 and a second concept "bat" 2824 into a merged concept "bat" 2924. In FIG. 21 A, an exemplary elemental data structure 2800 includes a concept "baseball" 2612 that is related to a first concept "bat" 2822 and a second concept "bat" 2824. The first concept "bat" 2822 is also related to a concept "wood" 2832, and the second concept "bat" 2824 is also related to a concept "swing" 2834. FIG. 21B illustrates the exemplary elemental data structure 2800 after the two "bat" concepts have been resolved into a merged concept, "bat" 2924. In FIG. 21B, the merged concept "bat" 2924 is related to the concepts "baseball" 2612, "wood" 2832, and "swing" 2834.

Such a concept resolution operation may, according to some approaches, occur in response to data provided by feedback engine 2002, such as data consumer model 2004. Continuing the example of FIGS. 21A and 21B, a data consumer model 2004 may include the three concepts "bat", "swing" and "wood." Such concepts may be constituents of other concepts, such as in a situation where data consumer model 2004 includes the concepts "wood bat" and "swing". Alternatively, each of these three concepts may independently co-occur in data consumer model 2004. The co-occurrence of these three concepts in data consumer model 2004 may suggest that the concept "bat" 2822 as it pertains to "swing" 2834, and the concept "bat" 2824 as it pertains to "wood" 2832, may be represented as one entity "bat" 2924.

According to some aspects, feedback engine 2002 may initiate such concept resolution when a threshold number of distinct data consumer models 2004 provide evidence that two concepts may be represented as a single concept. In yet other aspects, concept resolution may occur in a user-specific elemental data structure. For example, the merged concept may be stored in a user-specific elemental data structure associated with data consumers 195 who provided evidence that the two concepts could be represented as a single concept.

Figure 17:
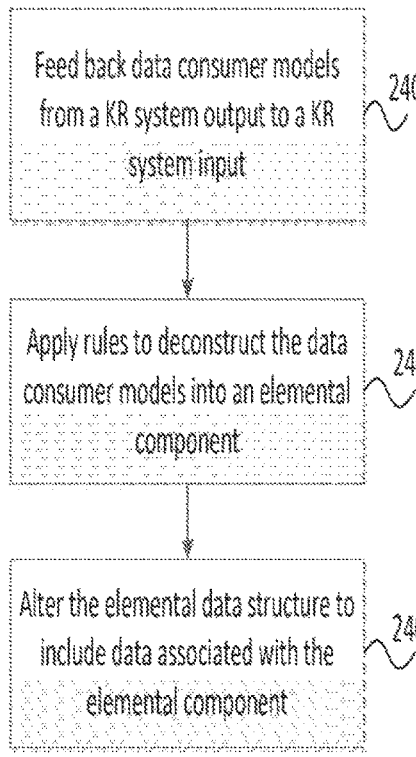
FIG. 17 is a flow chart of an exemplary process of modifying an elemental data structure based on feedback.

FIG. 17 depicts an exemplary method of modifying an elemental data structure based on feedback. At act 2402 of the exemplary method, one or more data consumer models (user models) are fed back from an output of a knowledge representation system to an input of a knowledge representation system. In some embodiments, the user models may correspond to one or more data consumers 195 associated with the knowledge representation system. In some embodiments, feeding back the user models may comprise sending the user models to analytical components 1802 of the knowledge representation system. In some embodiments, analytical components may include an analysis engine 150 and/or a feedback engine 2002. In some embodiments, feeding back the user models may comprise sending the user models directly to analysis engine 150. In some embodiments, feeding back the user models may comprise sending the user models to a feedback engine 2002 (i.e. supplying the user models to feedback engine 2002 as input to the engine). In some embodiments, feedback engine 2002 may send at least a portion of the user models to analysis engine 150 (i.e. supplying the user models to analysis engine 150 as input to the engine). In some embodiments, the portion may comprise a part of a user model.

At act 2404 of the exemplary method, knowledge processing rules are applied to the user models (or portions of user models) fed back by the knowledge representation system. In some embodiments, the applied rules may be knowledge processing rules 130. In some embodiments, the same knowledge processing rules that are applied to input KRs 160 may be applied to the user models. In some embodiments, knowledge processing rules that are not applied to input KRs may be applied to the user models. By applying knowledge processing rules to the user models, analytical components 1802 may deconstruct the user models into elemental components. In some embodiments, an elemental component may comprise an elemental concept and/or an elemental concept relationship.

At act 2406 of the exemplary method, an elemental data structure 120 may be altered to include a representation of an elemental component provided by analysis engine 150. Such alterations may include adding an elemental concept to the elemental data structure, removing an elemental concept, resolving two or more elemental concepts into a single elemental concept, splitting an elemental concept into two or more elemental concepts, adding an elemental concept relationship between two elemental concepts, and/or removing an elemental concept relationship.

Figure 18:
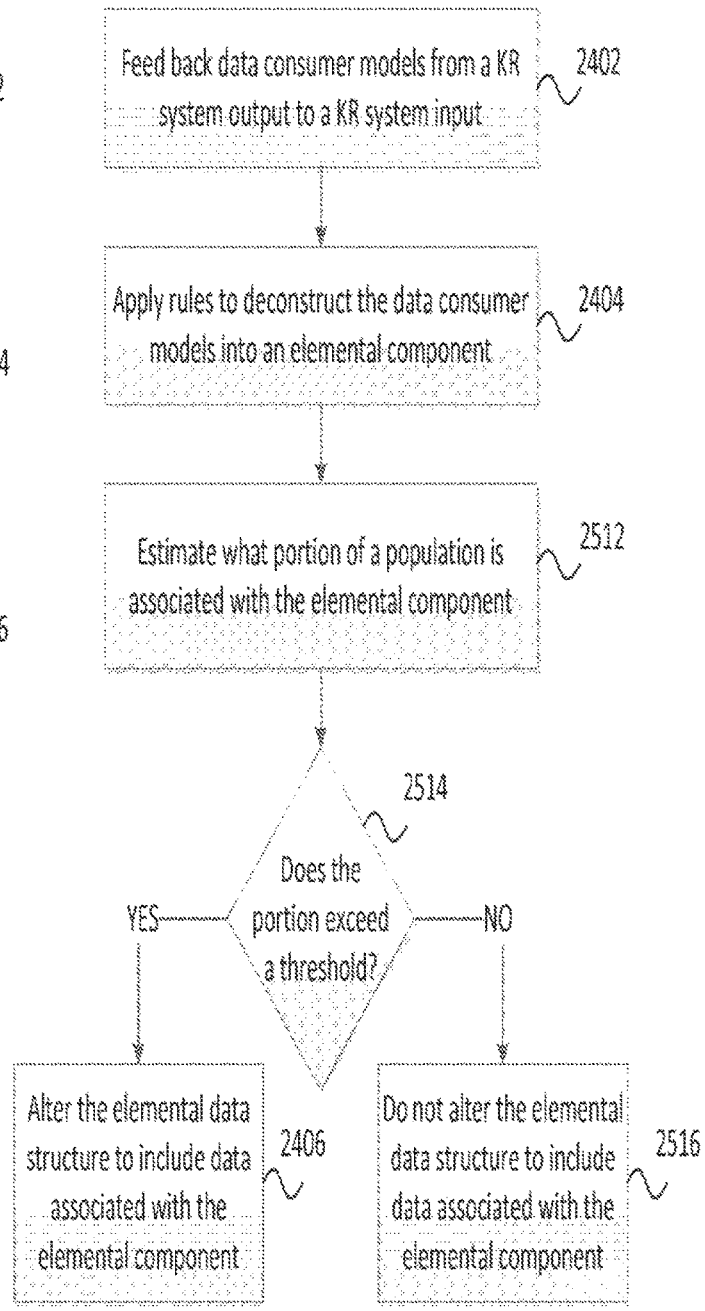
FIG. 18 is a flow chart of an exemplary process of crowd-sourcing an elemental data structure.

FIG. 18 depicts an exemplary method of crowd-sourcing an elemental data structure. See above for descriptions of embodiments of acts 2402, 2404, and 2406. At act 2512 of the exemplary method, analytical components 1802 may estimate what portion of a population is associated with the elemental component provided during act 2404. In some embodiments, the population may be data consumers 195, and the user models 2004 fed back from the synthetical components 1852 may comprise a statistical sample of the user models 2004 associated with data consumers 195. In some embodiments, the population may be a group of data consumers 195 sharing an attribute or interest, and the user models 2004 fed back from the synthetical components 1852 may comprise a statistical sample of the user models 2004 associated with the group of data consumers 195.

At act 2514 of the exemplary method, analytical components 1802 may determine whether the estimated portion of the population associated with (he elemental component exceeds a crowd-sourcing threshold. In some embodiments, the portion may be expressed as a percentage of data consumers 195. In some embodiments, the portion may be expressed as a quantity of data consumers 195.

At act 2406 of the exemplary method of FIG. 18, the elemental data structure 120 is altered to include data associated with the elemental component, because the portion of the population associated with the elemental component exceeds the crowd-sourcing threshold. At act 2516 of the exemplary method, the elemental data structure 120 is not altered to include data associated with the elemental component, because (he portion of the population associated with the elemental component does not exceed the crowd-sourcing threshold.

Figure 22:
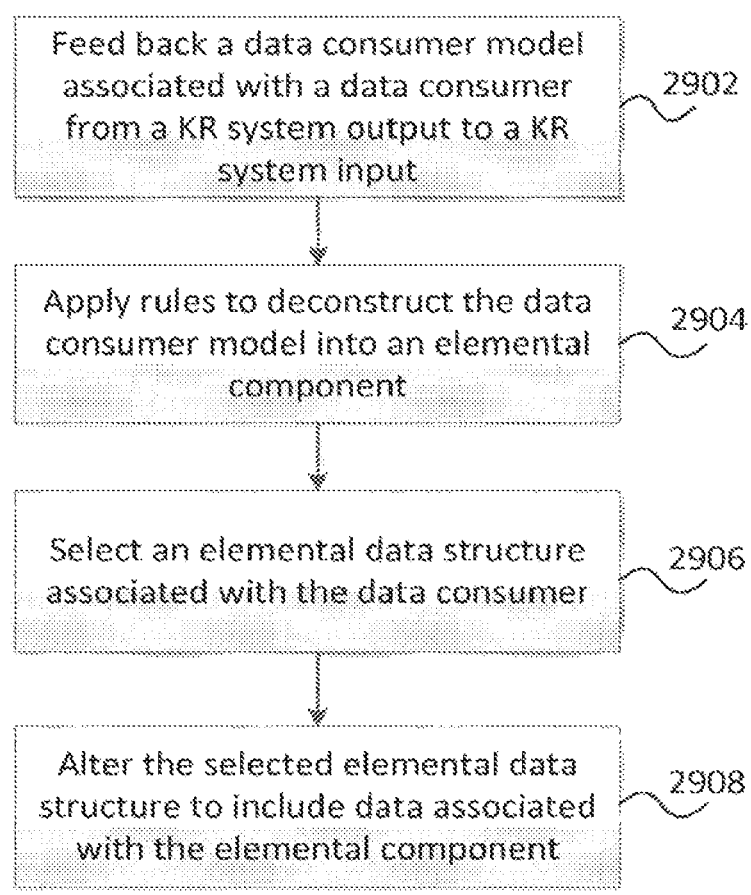
FIG. 22 is a flow chart of an exemplary process of tailoring an elemental data structure.

FIG. 22 depicts an exemplary method of tailoring an elemental data structure. At act 2902 of the exemplary method, a data consumer model is fed back from an output of a knowledge representation system to an input of a knowledge representation system. In some embodiments, the data consumer model is associated with a data consumer. At act 2904 of the exemplary method, knowledge processing rules are applied to deconstruct the data consumer model into elemental components.

At act 2906 of the exemplary method, an elemental data structure associated with the data consumer is selected. In some embodiments, AKRM data set 110 may comprise a plurality of elemental data structures. In some embodiments, some elemental data structures may be associated with all data consumers. In some embodiments, some elemental data structures may be associated with groups of data consumers. In some embodiments, some elemental data structures may be associated with individual data consumers. Associations between elemental data structures and data consumers or groups of data consumers may be (racked using techniques known in the art or any other suitable techniques. Likewise, selection of an elemental data structure associated with a data consumer may be implemented using techniques known in the art or any other suitable techniques. Embodiments are not limited in this regard.

At act 2908 of the exemplary method, the selected elemental data structure may be altered to include data associated with elemental component provided at act 2904.

IV. Inferential Analytical Processing

Some concepts and relationships may be omitted from or under-represented in manually created knowledge representations (KRs). For example, a manually created KR relating to biology may not expressly indicate any relationship between the concept "biology" and the concept "science," even though biology is a field of science. Such a relationship may be omitted, for example, because an individual who manually creates the KR may consider such a relationship to be self-evident. Automatic deconstruction of manually created KRs that omit or under-represent certain concepts or relationships may yield atomic knowledge representation models (AKRMs) with associated omissions or under-representations.

Natural-language communication may implicitly convey data associated with concepts or relationships. Concepts and relationships associated with implied meanings of communication may be susceptible to detection via inferential analysis techniques. Inferential analysis techniques may be applied to natural-language communication to ascertain elemental concepts and elemental concept relationships. In some embodiments, the elemental concepts and relationships ascertained via inferential analysis techniques may augment or complement elemental concepts and relationships ascertained via techniques for deconstructing knowledge representations. Though, embodiments are not limited in this regard.

Figure 14:
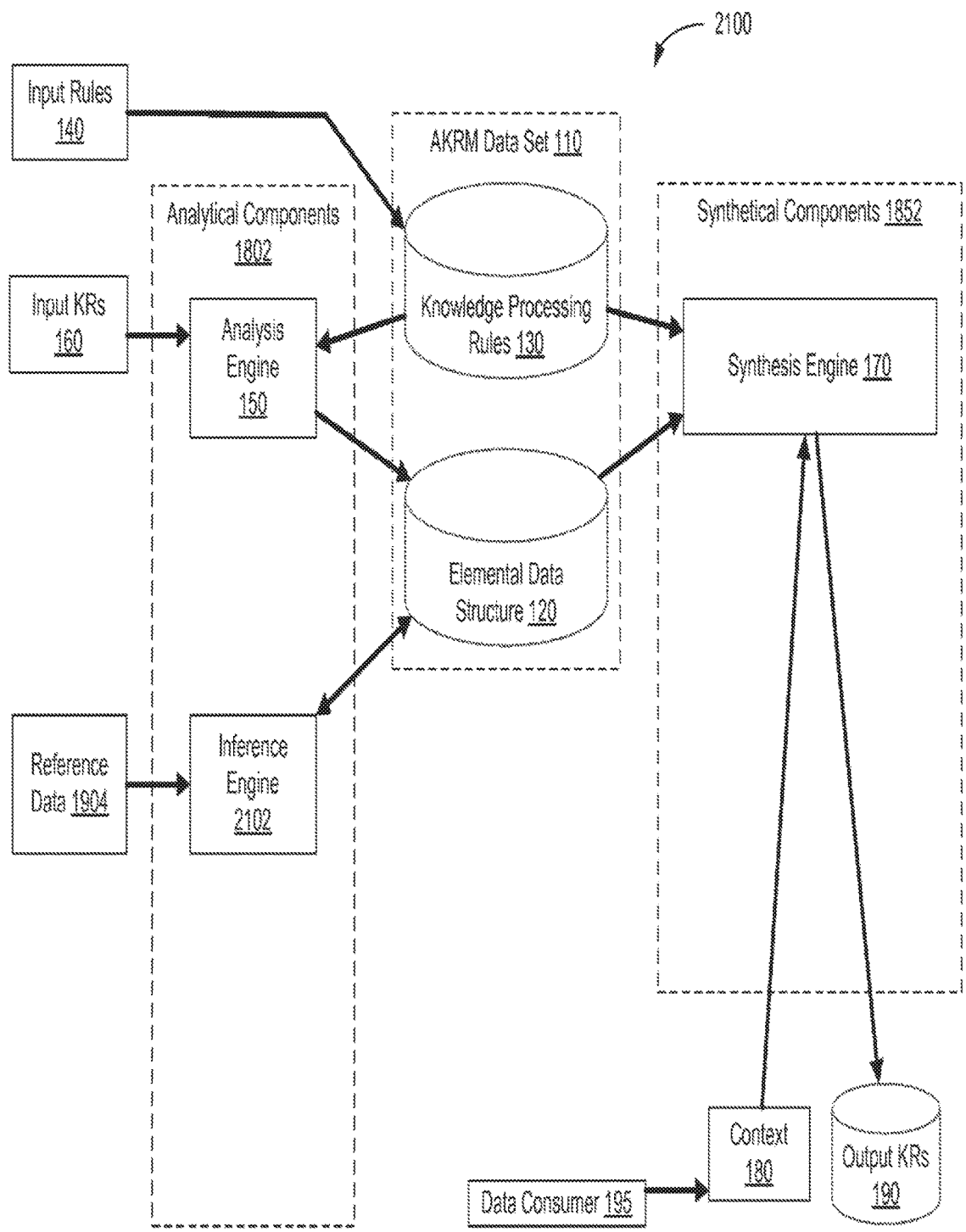
FIG. 14 is a block diagram illustrating yet another exemplary system for implementing an atomic knowledge representation model in accordance with some embodiments of the present invention.

FIG. 14 illustrates an exemplary system 2100 that may be employed in some embodiments for implementing an atomic knowledge representation model (AKRM) involved in analysis and synthesis of complex knowledge representations (KRs), in accordance with some embodiments of the present invention. In some embodiments, exemplary system 2100 may implement inferential analysis techniques through an inference engine 2102. In some embodiments, an inference engine 2102 may be implemented as software executed on one or more processors, as hardware, or as a combination of software and hardware. In some embodiments, the inference engine 2102 may apply inference rules (or "rules of implied meaning") to reference data 1904 and/or to elemental data structure 120 to ascertain concepts and relationships, and/or to estimate probabilities associated with concepts and relationships.

In some embodiments, reference data 1904 may comprise natural language documents. Natural language documents may include text-based documents, audio recordings, or audiovisual recordings. In some embodiments, natural language documents may be collected in a reference corpus or in reference corpora. In some embodiments, natural language documents may contain words organized into sentences and/or paragraphs. In some embodiments, natural language documents may be encoded as data on one or more computer-readable media.

In some embodiments, inference engine 2102 may identify elemental components by applying linguistic inference rules to reference data 1904. In some embodiments, a linguistic inference rule may comprise a linguistic pattern and an extraction rule. In some embodiments, applying a linguistic inference rule to reference data 1904 may comprise searching reference data 1904 for language that matches the linguistic pattern, and, upon detecting such language, applying the extraction rule to extract an elemental component from the detected language.

In some embodiments, a linguistic pattern may comprise a description of one or more linguistic elements and one or more constraints associated with the linguistic elements. A linguistic element may be a word, a phrase, or any other linguistic unit. Elements in a linguistic pattern may be fully constrained or partially constrained. For example, one or more attributes of an element, such as the element's part-of-speech, may be specified, while other attributes of an element, such as the element's spelling, may be unspecified. As another example, a linguistic pattern may constrain one or more elements to appear in a specified order, or may simply constrain one or more elements to appear in the same sentence. A linguistic pattern may be represented using techniques known in the art or any other suitable techniques. One of skill in the art will appreciate that techniques for using ASCII characters to represent a search pattern, template, or siring may be used to represent a linguistic pattern. Though, embodiments are not limited in this respect.

As a simple illustration, the following text may represent a linguistic pattern: SEQUENCE(ELEM1.NOUN, ELEM2.WORDS("is a"), ELEM3.NOUN). The illustrative pattern contains three elements. The first element, ELEM1, is constrained to be a noun. The second element, ELEM2, is constrained to include the words "is a." The third element, ELEM3, is constrained to be a noun. The illustrative pattern imposes a constraint that the elements must be detected in the specified sequence. Thus, a portion of the reference data 1904 containing the sentence fragment "biology is a science" would match the illustrative pattern, because the fragment contains the noun "biology," the words "is a," and the noun "science" in a sequence.

As a second illustration, the following text may represent a linguistic pattern: SENTENCE(ELEM1.NOUN, ELEM2.NOUN). This illustrative pattern contains two elements. The first element, ELEM1, is constrained to be a noun. The second element, ELEM2, is also constrained to be a noun. The illustrative pattern further imposes a constraint that the elements must be detected in the same sentence. Thus, a portion of the reference data 1904 containing a sentence with the nouns "biology" and "science" would match the illustrative pattern.

In some embodiments, an extraction rule may comprise instructions for constructing an elemental component based on the portion of the reference data that matches the linguistic pattern. In some embodiments, the extraction rule may specify construction of an elemental component comprising an elemental concept, an elemental concept relationship, or an elemental concept and a relationship. In some embodiments, the extraction rule may comprise instructions for setting the elemental component's attributes, such as an elemental concept's label or an elemental concept relationship's type. An extraction rule may be represented using techniques known in the art or any other suitable techniques.

For example, the first illustrative linguistic pattern described above (SEQUENCE(ELEM1.NOUN, ELEM2.WORDS("is a"), ELEM3.NOUN)) may be associated with an extraction rule. The associated extraction rule may specify that upon detection of text matching the linguistic pattern, an elemental concept relationship should be constructed. The extraction rule may specify that the relationship's type is subsumptive, i.e. that ELEM3 subsumes ELEM1.

In some embodiments, inference engine 2102 may identify elemental components by applying elemental inference rules to elemental data structure 120. An elemental inference rule may comprise a rule for inferring an elemental component from data associated with elemental data structure 120.

In some embodiments, an elemental inference rule may comprise a rule for detecting a subsumption relationship between two elemental concepts by comparing characteristic concepts associated with the two elemental concepts. In some embodiments, concept $A_1$ may be a characteristic concept of concept A if concepts A and $A_1$ have a definitional relationship such that concept $A_1$ defines concept A. In some embodiments, an elemental inference rule may specify that concept A subsumes concept B if each characteristic concept $A_i$ of concept A is also a characteristic concept $B_j$ of concept B, or subsumes a characteristic concept $B_j$ of concept B.

Figure 23:
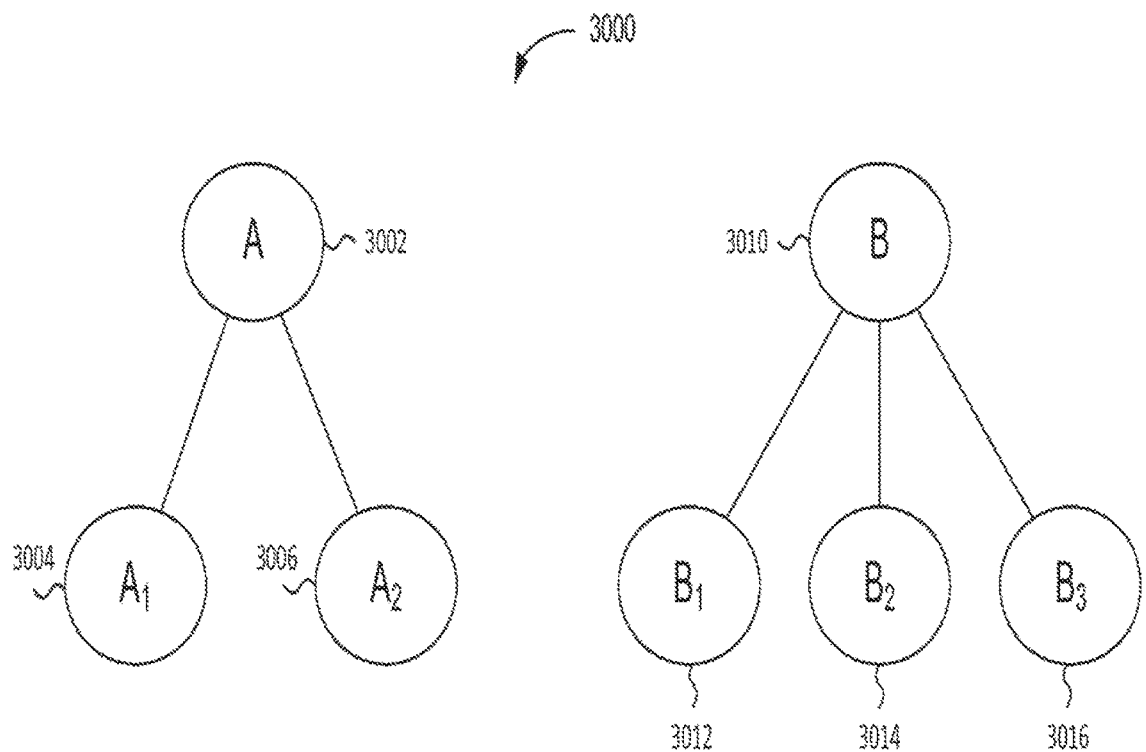
FIG. 23 illustrates portions of an elemental data structure, including two concepts and their associated characteristic concepts.

For example, FIG. 23 illustrates concept A 3002 and concept B 3010. As FIG. 23 illustrates, concept A has two characteristic concepts, $A_1$ 3004 and $A_2$ 3006, while concept B has three characteristic concepts, $B_1$ 3012, $B_2$ 3014, and $B_3$ 3016. According to the elemental inference rule described above, concept A subsumes concept B if (1) concept $A_1$ subsumes (or is identical to) one of $B_1$, $B_2$, or $B_3$, and (2) concept $A_2$ subsumes (or is identical to) one of $B_1$, $B_2$, or $B_3$.

Figure 24:
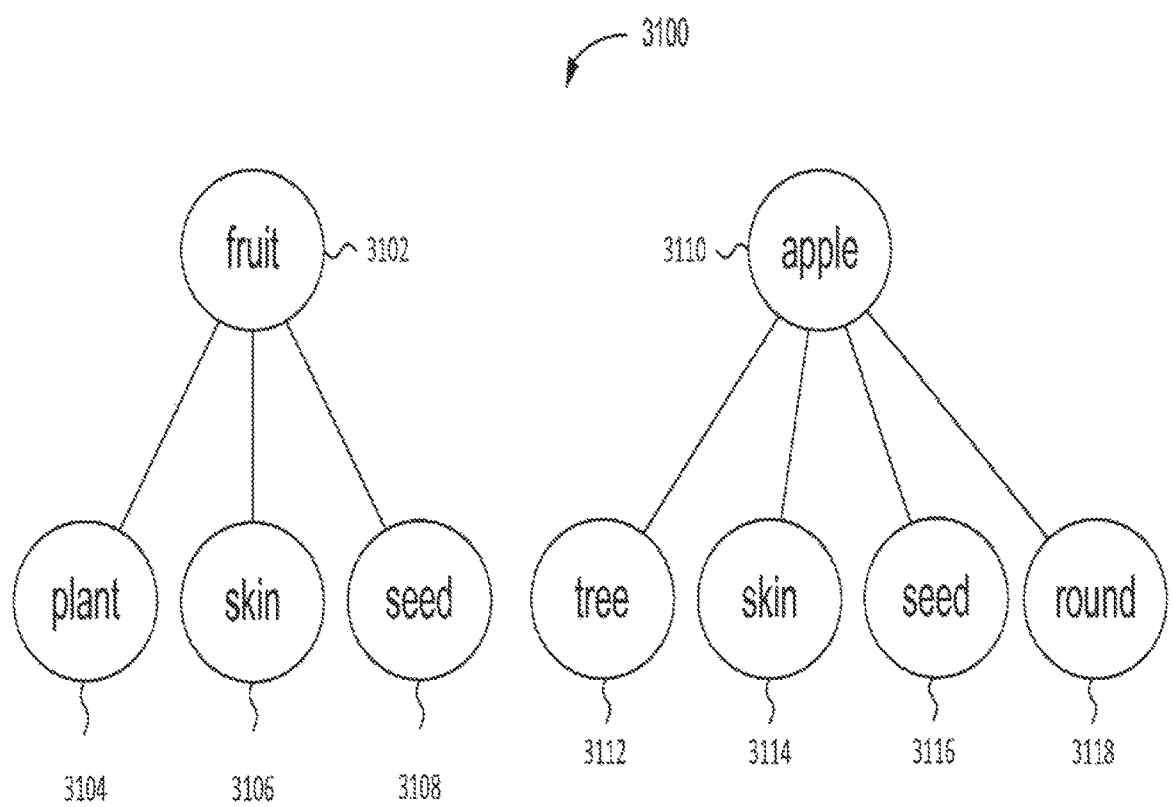
FIG. 24 illustrates portions of an elemental data structure, including two concepts and their associated characteristic concepts.

FIG. 24 further illustrates the elemental inference rule described above. In the illustration of FIG. 24, concept "fruit" 3102 has three characteristic concepts, "plant" 3104, "skin" 3106, and "seed" 3108. In the illustration, concept "apple" has four characteristic concepts, "tree" 3112, "skin" 3114, "seed" 3116, and "round" 3118. According to the elemental inference rule described above, concept "fruit" subsumes concept "apple" (or, equivalently, an "apple" is a "fruit") because two of the characteristic concepts of "fruit" 3102 ("skin" 3106 and "seed" 3108) are identical to characteristic concepts of "apple" 3110 ("skin" 3114 and "seed" 3116, respectively), while the third characteristic concept of "fruit" 3110 ("plant" 3104) subsumes "tree" 3112, which is a characteristic concept of "apple" 3110. Though, in some embodiments, a definitional relationship may exist only between a concept and constituents of that concept.

In some embodiments, inference engine 2102 may estimate probabilities associated with elemental components by applying elemental inference rules to elemental data structure 120. In some embodiments, an elemental inference rule may comprise a rule for estimating a probability of a subsumption relationship between two elemental concepts A and B based on probabilities associated with the characteristic concepts of A and B ($A_i$ and $B_j$, respectively). For example, an elemental inference rule may estimate a probability of a subsumption relationship between elemental concepts A and B as follows:

$$Pr(\text{concept } A \text{ subsumes concept } B) =$$

$$Pr(\text{an object is an instance of } A \mid \text{it is an instance } B) =$$

$$\frac{1}{m}\sum_{i=1}^{m} Pr(A_i \mid B_{j(i)})$$

where m is a number of characteristic concepts $A_i$ of concept A, Pr denotes a probability, and $B_{j(i)}$ is a characteristic concept of B such that $A_i$ and any remaining characteristic concepts of B are independent.

Characteristic concept $B_{j(i)}$ may be identified using statistical parameter estimation techniques known in the art and any other suitable techniques. Embodiments are not limited in this regard. In some embodiments, maximum-a-posteriori or minimum-mean-squared error estimators may be used. In some embodiments, an estimator derived by minimizing an appropriate loss function may be used. In some embodiments, characteristic concept $B_{j(i)}$ may be identified through a maximum likelihood estimate approach:

$$B_{j(i)} = \operatorname{argmax}_{B_k} Pr(A_i \mid B_k)$$

where $B_k$ is a characteristic concept of concept B, and $Pr(A_i \mid B_k)$ may be calculated based on a model of probabilities associated with elemental concepts and relationships in elemental data structure 120, such as the statistical graphical model associated with a statistical engine 1902 described above. Though, $Pr(A_i \mid B_k)$ may be calculated using techniques known in the art, such as maximum-a-posteriori error estimators, minimum-mean-squared error estimators, other statistical parameter estimation techniques, or any other suitable techniques. Embodiments are not limited in this regard.

In one aspect, an elemental concept relationship may be added to an elemental data structure if a probability associated with the relationship exceeds a threshold. The threshold may be adjusted based on a user's preference for certainty and aversion to error. In another aspect, any probabilities calculated by inference engine 2102 may be shared with statistical engine 1902 and integrated into a statistical graphical model of elemental data structure 120.

In some embodiments, linguistic inference rules and elemental inference rules may be used individually. That is, in some embodiments, elemental components identified by a first linguistic inference rule or elemental inference rule may be added to an elemental data structure without first applying a second linguistic inference rule or elemental inference rule to confirm the inference obtained by applying the first rule.

In some embodiments, linguistic inference rules and elemental inference rules may be used jointly. That is, in some embodiments, elemental components identified by a first linguistic inference rule or elemental inference rule may not be added to an elemental data structure until the inference obtained by applying the first rule is confirmed via application of a second linguistic inference rule or elemental inference rule.

In some embodiments, inferential rules may be applied to reference data 1904 or to elemental data structure 120 in response to the occurrence of a triggering event. In some embodiments, a triggering event may be an event associated with analytical activity or synthetical activity involving an elemental component of elemental data structure 120. In some embodiments, adding a new elemental concept or a new elemental concept relationship to elemental data structure 120 may be a triggering event. Additionally or alternatively, removing an elemental component from data structure 120 may be a triggering event. Alternatively or additionally, using an elemental component of data structure 120 during synthesis of an output KR 190 may be a triggering event.

For example, when an analytical component 1802, such as analysis engine 150, adds an elemental concept to elemental data structure 120, inference engine 2102 may apply elemental inference rules to elemental data structure 120 to infer relationships between the new elemental concept and other elemental concepts. Alternatively or additionally, inference engine 2102 may apply elemental inference rules to infer relationships between a concept related to the new elemental concept and other elemental concepts. Alternatively or additionally, inference engine 2102 may apply linguistic inference rules to reference data 1904 to infer relationships between the new elemental concept and other elemental concepts. Alternatively or additionally, inference engine 2102 may apply linguistic inference rules to reference data 1904 to infer relationships between a concept related to the new elemental concept and other elemental concepts.

In some embodiments, a triggering event may be an event associated with obtaining context information 180 associated with an elemental component of elemental data structure 120. For example, when synthesis engine 170 receives context information 180 containing an active concept, inference engine 1902 may apply inference rules to infer elemental concepts related to the active concept.

In some embodiments, linguistic inference rules may be applied other than in response to a triggering event. For example, linguistic inference rules may be applied continually or periodically to curate or refine elemental data structure 120.

FIG. 25 depicts an exemplary method of modifying an elemental data structure based on an inference. At act 3202 of the exemplary method, a first analysis rule is applied to deconstruct a knowledge representation into an elemental component. At act 3204 of the exemplary method, the elemental component obtained by applying the first analysis rule is added to the elemental data structure.

At act 3206 of the exemplary method, candidate data associated with the elemental data structure is inferred. In some embodiments, the candidate data comprises an elemental component, such as an elemental concept and/or an elemental concept relationship. In some embodiments, the candidate data comprises a probability associated with an elemental concept or an elemental concept relationship, the probability may be associated with an elemental component already present in the elemental data structure, or may be associated with an elemental component that is not present in the data structure.

At act 3206, the act of inferring the candidate data comprises detecting, in reference data, language corresponding to a linguistic pattern. In some embodiments, the linguistic pattern is encoded as a computer-readable data structure storing data associated with the linguistic pattern. In some embodiments, the linguistic pattern comprises a description of one or more linguistic elements. In some embodiments, a description of a linguistic element may fully specify the linguistic element, such a single, predetermined word or phrase may satisfy the specification. In some embodiments, a description of a linguistic element may partially specify the linguistic element, such that a plurality of words or phrases may satisfy the specification. In some embodiments, the linguistic pattern further comprises one or more constraints associated with the linguistic elements. In some embodiments, a constraint may impose a total or partial ordering on two or more linguistic elements. For example, the constraint may require two or more of the linguistic elements to appear sequentially. In some embodiments, a constraint may impose a proximity constraint on two or more linguistic elements. For, example, the constraint may require two or more of the linguistic elements to appear within a specified number of words of each other, within the same sentence, or within the same paragraph.

At act 3206, in some embodiments, detecting the language corresponding to the predetermined linguistic pattern comprises detecting a first word or phrase followed by a subsumptive expression followed by a second word or phrase. In some embodiments, the first word or phrase is associated with a first elemental concept. In some embodiments, the first word or phrase is a label of the first elemental concept. In some embodiments, the second word or phrase is associated with a second elemental concept. In some embodiments, the second word or phrase is a label of the second elemental concept. In some embodiments, the subsumptive expression comprises a word or phrase that denotes a subsumptive relationship. In some embodiments, the subsumptive expression comprises "is a," "is an," "is a type of," "is a field of," or any other expression having a meaning similar to or synonymous with the meanings of the enumerated expressions.

At act 3206, in some embodiments, detecting the language corresponding to the predetermined linguistic pattern comprises detecting a first word or phrase followed by a definitional expression followed by a second word or phrase. In some embodiments, the definitional expression comprises a word or phrase that denotes a definitional relationship. In some embodiments, the definitional expression comprises "has a," "has an," "is characterized by," "includes a," "includes an," or any other expression having a similar or synonymous meaning.

At act 3206, in some embodiments, the act of inferring the candidate data further comprises applying an extraction rule associated with the linguistic pattern to obtain data associated with the detected language. In some embodiment, the candidate data comprises the obtained data.

At act 3208 of the exemplary method, the elemental data structure is modified to combine the candidate data and data associated with the elemental data structure. In some embodiments, (he candidate data is added to the elemental data structure. In some embodiments, an elemental component is added to or removed from the elemental data structure based on the candidate data. In some embodiments, the candidate data is assigned as an attribute of an elemental component of the elemental data structure.

In some embodiments, the exemplary method of FIG. 25 further comprises inferring second candidate data associated with the elemental data structure. FIG. 26 depicts an exemplary method of inferring second candidate data. At act 3302 of the exemplary method, a first elemental concept is identified in the elemental data structure. In some embodiments, the first elemental concept identified at act 3302 of the exemplary method of FIG. 26 is associated with the first word or phrase detected at act 3206 of the exemplary method of FIG. 25. At act 3304 of the exemplary method, a second elemental concept is identified in the elemental data structure. In some embodiments, the second elemental concept identified at act 3304 of the exemplary method of FIG. 26 is associated with the second word or phrase detected at act 3206 of the exemplary method of FIG. 25. Though, the first and second elemental concepts identified at acts 3302 and 3304 of the exemplary method of FIG. 26 may be any elemental concepts. In some embodiments, the first elemental concept may be defined by one or more first characteristic concepts. In some embodiments, the second elemental concept may be defined by one or more second characteristic concepts.

At act 3306 of the exemplary method, it is determined that each of the second characteristic concepts is also a first characteristic concept or subsumes a first characteristic concept. In some embodiments, this determination gives rise to an inference that the second elemental concept subsumes the first elemental concept.

Figures 27, 28:
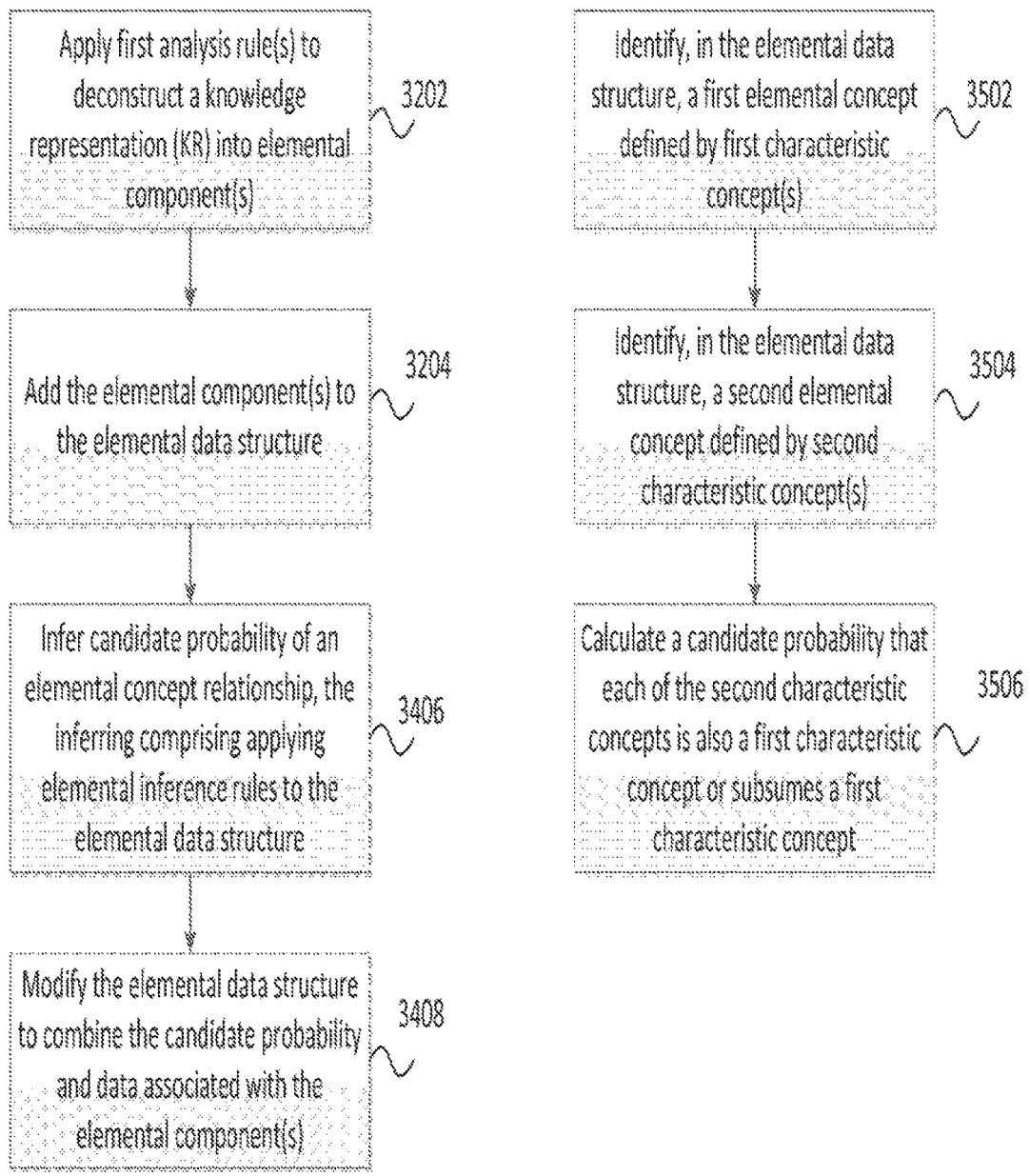
FIG. 27 is a flow chart of an exemplary process of modifying an elemental data structure based on inference of a probability.
FIG. 28 is a flow chart of an exemplary process of inferring a candidate probability associated with an elemental data structure.

FIG. 27 depicts another exemplary method of modifying an elemental data structure based on an inference. Acts 3202 and 3204 of the exemplary method are described above. At act 3406 of the exemplary method, a candidate probability associated with an elemental concept relationship is inferred. In some embodiments, the elemental concept relationship may represent a relationship between first and second elemental concepts. In some embodiments, the elemental concept relationship may comprise a type, such as a subsumptive type or a definitional type. In some embodiments, the candidate probability may comprise an estimate of a probability that a relationship of the specified type exists between the first and second elemental concepts.

At act 3406 of the exemplary method, inferring the candidate probability comprises applying elemental inference rules to the elemental data structure. FIG. 28 depicts an exemplary method of applying elemental inference rules to the elemental data structure. At act 3502 of the exemplary method, a first elemental concept is identified in the elemental data structure. In some embodiments, the first elemental concept identified at act 3502 of the exemplary method of FIG. 28 is the first elemental concept associated with the elemental concept relationship associated with the candidate probability at act 3406 of the exemplary method of FIG. 27. At act 3504 of the exemplary method, a second elemental concept is identified in the elemental data structure. In some embodiments, the second elemental concept identified at act 3502 of the exemplary method of FIG. 28 is the second elemental concept associated with the elemental concept relationship associated with the candidate probability at act 3406 of the exemplary method of FIG. 27. In some embodiments, the first and second elemental concepts may be defined by one or more first and second characteristic concepts, respectively.

At act 3506 of the exemplary method, the candidate probability may be estimated by calculating the probability that each of the second characteristic concepts is also a first characteristic concept or subsumes a first characteristic concept.

In yet another exemplary method of modifying a data structure based on an inference, candidate data associated with the elemental data structure may be inferred by applying one or more inferential analysis rules to at least one of reference data or the elemental data structure. The inferred candidate data may comprise an elemental component, a probability associated with an elemental component, or an elemental component and a probability associated with an elemental component. The one or more inferential analysis rules may comprise a linguistic inference rule, an elemental inference rule, or a linguistic inference rule and an elemental inference rule. In addition, in the exemplary method, the elemental data structure may be modified by incorporating the candidate data into the elemental data structure. Incorporating the candidate data into the elemental data structure may comprise adding the candidate data to the elemental data structure, removing an elemental component from the elemental data structure based on the candidate data, combining the candidate data with data associated with the elemental data structure, etc.

V. Preference Expression

As described above, in an exemplary system such as system 1800 of FIG. 11, embodiments of synthesis engine 170 may synthesize output knowledge representations by applying knowledge processing rules 130 to elemental data structures 120. Also, as described above, embodiments of synthesis engine 170 may be provided with context information 180 associated with a data consumer 195. In some embodiments, context information 180 may include, for example, a textual query or request, one or more search terms, identification of one or more active concepts, a request for a particular form of output KR 190, etc. In some embodiments, receipt of context information 180 may be interpreted as a request for an output KR, without need for an explicit request to accompany the context.

In some embodiments, in response to an input request and/or context information 180, synthesis engine 170 may apply one or more appropriate knowledge processing rules 130 encoded in AKRM data set 110 to elemental data structure 120 to synthesize one or more additional concepts and/or concept relationships not explicitly encoded in elemental data structure 130. In some embodiments, synthesis engine 170 may apply appropriate knowledge processing rules 130 to appropriate portions of elemental data structure 120 in accordance with the received input request and/or context information 180. For example, if context information 180 specifies a particular type of complex KR to be output, in some embodiments only those knowledge processing rules 130 that apply to synthesizing that type of complex KR may be applied to elemental data structure 120. In some embodiments, if no particular type of complex KR is specified, synthesis engine 170 may synthesize a default type of complex KR. such as a taxonomy or a randomly selected type of complex KR. In some embodiments, if context information 180 specifies one or more particular active concepts of interest, for example, synthesis engine 170 may select only those portions of elemental data structure 120 related (i.e., connected through concept relationships) to those active concepts, and apply knowledge processing rules 130 to the selected portions to synthesize the output KR. In some embodiments, a predetermined limit on a size and/or complexity of the output complex KR may be set, e.g., by a developer of the exemplary system 1800, for example conditioned on a number of concepts included, hierarchical distance between the active concepts and selected related concepts in the elemental data structure, encoded data size of the resulting output complex KR, processing requirements, relevance, etc.

In some embodiments, an output KR may be encoded in accordance with any specified type of KR indicated in the received input. In some embodiments, the output KR may be provided to data consumer 195. As discussed above, data consumer 195 may be a software application or a human user who may view and/or utilize the output KR through a software user interface, for example.

In some embodiments, a data consumer 195 may provide context information 180 for directing synthesis operations. For example, by inputting context information 180 along with a request for an output KR 190, a data consumer may direct exemplary system 1800 to generate an output KR 190 relevant to context information 180. For example, context information 180 may contain a search term mappable to a concept of interest to data consumer 195. In some embodiments, synthesis engine 170 may, for example, apply knowledge processing rules to those portions of elemental data structure 120 that are more relevant to the concept associated with the context information 180.

Figure 31:
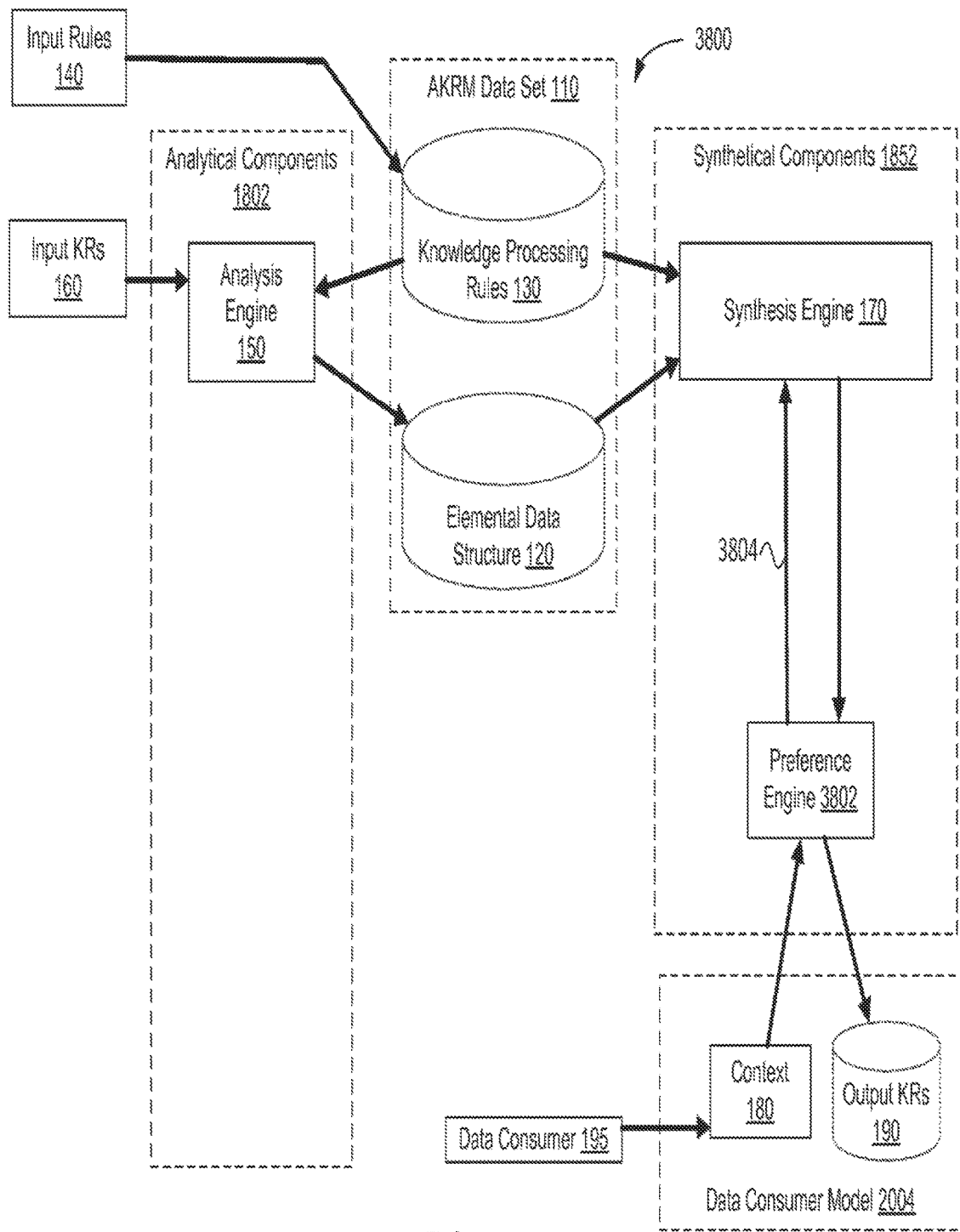
FIG. 31 is a block diagram illustrating yet another exemplary system for implementing an atomic knowledge representation model in accordance with some embodiments of the present invention.

FIG. 31 illustrates an exemplary system 3800 that may be employed in some embodiments for implementing an atomic knowledge representation model (AKRM) involved in analysis and synthesis of complex knowledge representations (KRs), in accordance with some embodiments of the present invention. In some embodiments, context information 180 may comprise preference information. In some embodiments, such preference information may comprise a preference model. In some embodiments, synthesis engine 170 may rely on the preference information and/or preference model when synthesizing KRs and/or presenting KRs to a data consumer.

Some embodiments of exemplary system 3800 may include a preference engine 3802. In some embodiments, synthetical components 1852 may comprise preference engine 3802. In some embodiments, preference engine 3802 may receive context information 180 containing preference information. In some embodiments, the preference information may comprise a preference model. In some embodiments, preference engine 3802 may create a preference model based on the preference information. In some embodiments, preference engine 3802 may provide preference information and/or a preference model to synthesis engine 170. In some embodiments, synthesis engine 170 may rely on the preference information and/or the preference model provided by preference engine 3802 to guide synthesis of a complex KR in accordance with preferences of a data consumer 195. In some embodiments, preference engine 3802 may rely on preference information and/or the preference model to guide presentation of concepts in a complex KR and/or presentation of output KRs in accordance with preferences of a data consumer 195.

In some embodiments, preference engine 3802 may assign a weight or probability to an active concept or to any elemental concept in an elemental data structure, the weight representing a relevance of the concept to a data consumer 195. The preference engine 3802 may calculate the weight assigned to a concept based on context information 180, and/or preference information, and/or the preference model.

Aspects and example embodiments of preference engine 3802 are described in U.S. Provisional Application No. 61/498,899, filed Jun. 20, 2011, and titled "Method and Apparatus for Preference Guided Data Exploration," which is incorporated by reference herein in its entirety. Some embodiments of preference engine 3802 may allow a data consumer 195 to specify different types of user preferences, e.g., among items and/or among attributes of the items.

In some embodiments, preference engine may provide preference information and/or a preference model to synthesis engine 170 to facilitate synthesis of a complex KR in accordance with preferences of a data consumer 195. In some embodiments, a preference model may comprise weighted concepts. In some embodiments, a weighted concept in a preference model may correspond to a concept in an elemental data structure 120.

In some embodiments, a preference model may influence the synthesis process in various ways. For example, in some embodiments, synthesis engine 170 may synthesize more concepts in relation to a concept in the preference model that is more heavily weighted (a "more preferred" concept), while synthesizing fewer concepts in relation to a less heavily weighted concept of the preference model (a "less preferred" concept). Synthesis engine 170 may control a degree of synthesis in relation to a concept in a variety of ways. In some embodiments the synthesis engine 170 may apply more knowledge processing rules in relation to more preferred concepts. In some embodiments, the synthesis engine 170 may use less stringent thresholds when applying a knowledge processing rule in relation to a more preferred concept. For example, synthesis engine 170 may use a lower relevance threshold, coherence threshold, semantic similarity threshold, or synonym threshold when applying a relevance rule, coherence rule, associative relationship rule, or synonym rule.

Furthermore, in some embodiments, synthesis engine 170 may temporally prioritize synthesis in relation to a more preferred concept over synthesis in relation to a less preferred concept. For example, synthesis engine 170 may synthesize concepts in relation to a more preferred concept before synthesizing concepts in relation to a less preferred concept. If synthesis engine 170 is configured to generate at most a certain maximum number of concepts, temporally prioritizing synthesis in this manner ensures that synthesis in relation to less preferred concepts does not occur at the expense of synthesis in relation to more preferred concepts. In some embodiments, synthesis engine 170 may begin synthesizing in relation to a less preferred concept only if the certain maximum number of concepts is not generated by first completing synthesis in relation to more preferred concepts.

Likewise, the synthesis engine 170 may devote more processing resources and/or processing time to synthesizing in relation to a more preferred concept, while devoting less processing resources and/or processing time to synthesizing in relation to a less preferred concept.

Additionally or alternatively, some embodiments of preference engine 3802 may rely on preference information and/or a preference model to guide presentation of an output KR's concepts in accordance with preferences of data consumer 195. In some embodiments, preference information may include a general preference model that may be used to produce a ranking of items or concepts in accordance with preferences of data consumer 195. Preference engine 3802 may use such ranking information to impose an ordering on the concepts in an output KR 190.

In other words, in some embodiments an output KR 190 may be presented to a data consumer 195 in a format that is not rank-ordered, such as a graph. In other embodiments, an output KR 190 may be presented to a data consumer 195 in a rank-ordered format, such as a list, with the rankings being assigned based on preference information.

VI. Customization of Knowledge Representations

A. An Organization of the Elemental Data Structure

Figure 32A:
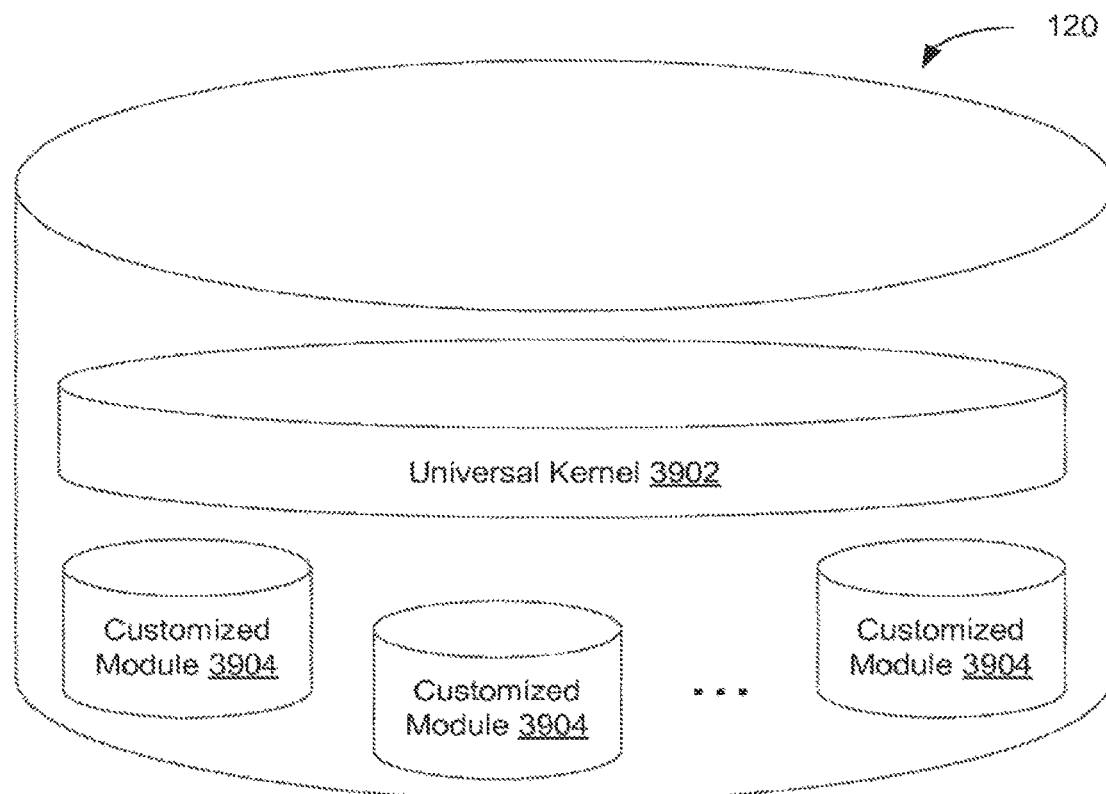
FIG. 32A is a block diagram of an embodiment of an elemental data structure.

As shown in FIG. 32A, an embodiment of elemental data structure 120 may include a universal kernel 3902 and one or more customized modules 3904. Broadly, the universal kernel may contain concepts and relationships that are generally applicable to some number of members or all members of a population, such as the population of data consumers. Thus, the knowledge representation (KR) system may rely on the universal kernel to respond to a query provided by any data consumer, because the universal kernel may be shared by and common to all data consumers.

By contrast, each customized module may contain concepts and relationships that are specifically applicable to a particular data consumer 195 and/or knowledge domain. In other words, a customized module may correspond to a specific data consumer 195, and the knowledge contained in the customized module may pertain to the corresponding data consumer. Thus, when a data consumer submits a query, the KR system may rely on a data consumer's customized module to provide a response that is tailored to (customized for) the data consumer. Likewise, a customized module may correspond to a knowledge domain, and the KR system may rely on that domain-specific module to provide a response that is tailored to the knowledge domain.

The universal kernel and the customized modules may be constructed from different sources of information. For example, the universal kernel may be constructed by applying analytical rules to input KRs or reference data derived from reference corpora. Such reference corpora may contain, in the aggregate, knowledge that relates to some number of data consumers (or knowledge domains), a specified subset of data consumers (or knowledge domains), or all data consumers (or knowledge domains). That is, the universal kernel may be constructed by analyzing knowledge representations of "universal" knowledge.

By contrast, a customized module may be constructed by applying analytical rules to a data consumer model 2004. In some embodiments, the data consumer model may be provided to the analysis engine 150 by a feedback engine 2002. As described above, a data consumer model 2004 may contain knowledge that relates specifically to a data consumer 195. Alternatively or additionally, a customized module may be constructed by analyzing a representation of domain-specific knowledge.

In some embodiments, the universal kernel may be constructed only from KRs that represent universal knowledge, and not from KRs that represent knowledge specific to a data consumer. In such embodiments, analysis performed on data consumer models provided by the feedback engine may result in modifications of the customized modules, but not in modifications of the universal kernel.

In some embodiments, the elemental data structure 120 may include relationships between concepts in customized modules and concepts in the universal kernel. Such relationships may reflect customized relationships between universal concepts and data-consumer-specific concepts.

For example, the universal kernel might include relationships between the concept "bank" and the concept "First National Bank" if First National Bank is well-known by members of the relevant population, which might be determined, for example, by the popularity of the concept "First National Bank" among data consumers that make up the population. In addition, the customized module corresponding to one data consumer may include a street address of the branch of First National Bank where the data consumer has a checking account, while another customized module corresponding to another data consumer may include a different street address of a branch of a different bank where the other user has a checking account. Also, the elemental data structure may include a relationship between the first data consumer's "bank address" concept and the universal kernel's "bank" concept. Likewise, the elemental data structure may include a relationship between the other data consumer's "bank address" concept and the universal kernel's "bank" concept.

In some embodiments, a customized module may correspond to a knowledge domain. Just as a data-consumer-specific customized module contains knowledge that is specifically applicable to a corresponding data consumer, a domain-specific customized module contains knowledge that is specifically applicable to the corresponding knowledge domain. Domain-specific customized modules may be constructed by analyzing KRs that contain knowledge that relates generally to the knowledge domain. Additionally or alternatively, domain-specific customized modules may be constructed by analyzing data consumer models that correspond to entities that are closely associated with the relevant knowledge domain.

For example, an elemental data structure may include a customized module that corresponds to a "biotechnology start-up companies" knowledge domain. This domain-specific customized module may be constructed from reference corpora regarding biotechnology, start-up companies, biology, technology, business, biotechnology start-up companies, etc. Additionally or alternatively, this domain-specific module may be constructed from data consumer models that correspond to biotechnology start-up companies, professionals who work in the biotechnology start-up industry, etc. Also, this domain-specific customized module may contain the concept "investment bank," which may be related to the universal kernel's concept "bank."

B. Constructing a Customizable Elemental Data Structure

FIG. 33 illustrates an exemplary process of constructing an elemental data structure which includes a universal kernel and customized modules. The process may be performed by one or more processors executing instructions stored in a computer-readable medium. At act 4002 of the exemplary method, first information is analyzed to identify an elemental component associated with a data consumer. For example, an analysis engine may apply one or more rules to deconstruct the second information into one or more elemental components. The first information may include context information, a data consumer model associated with the data consumer, or any KR that contains knowledge specifically applicable to the data consumer. In some embodiments, the first information may include interaction data that corresponds to a behavior of the data consumer or an interaction of the data consumer with the KR system. In some embodiments, the first information may be fed back to the analysis engine of the KR system by a feedback engine of the KR system.

At act 4004 of the exemplary method, the elemental component associated with the data consumer is added to the elemental data structure as part of a customized module that corresponds to the data consumer. The elemental component may include an elemental concept and/or an elemental relationship. If the elemental component is a concept, the concept is added to the customized module. Alternatively, if the elemental component is a relationship, the relationship is added to the customized module. The relationship may be between concepts in the customized module, between a concept in the customized module and a concept in another customized module (e.g., a relationship between a concept in a data-consumer-specific module and a concept in a domain-specific module), or between a concept in the customized module and a concept in the universal kernel.

At act 4006 of the exemplary method, second information is analyzed to identify a second elemental component associated with a population of data consumers. For example, an analysis engine may apply one or more rules to deconstruct the second information into one or more elemental components. The elemental component(s) obtained through the analysis process may be associated with some number of data consumers, or be independent of individual data consumers. In some embodiments, the elemental component(s) may be generally applicable to the population of data consumers. In some embodiments, the first information may comprise a reference corpus of information, or a knowledge representation, that is generally applicable to the population of data consumers.

At act 4008 of the exemplary method, the second elemental concept associated with the population of data consumers is added to the elemental data structure as part of the universal kernel. The elemental component may include an elemental concept and/or an elemental relationship. If the elemental component is a relationship, the relationship may be between concepts in the universal kernel, or between a concept in the universal kernel and a concept in a customized module.

Some embodiments of the process of constructing a customizable elemental data structure may include the additional acts depicted in FIG. 34. At act 4102, third information may be analyzed to identify a third elemental component associated with a knowledge domain. The analysis process may involve the application of rules to deconstruct the third information into elemental components, as described above. The third information may include context information, a data consumer model, a reference corpus, or any KR that contains knowledge specifically applicable to the knowledge domain.

At act 4104, the elemental component associated with the knowledge domain may be added to the elemental data structure as part of a corresponding domain-specific module. As described above, if the elemental component is a relationship, the relationship may be internal to the domain-specific module, or may be between a concept in the domain-specific module and a concept in any other module or in the universal kernel.

C. Modifying the Customizable Elemental Data Structure

Embodiments of the customizable elemental data structure may be modified based on analysis of the universal kernel and/or the customized modules. Such analysis (hereinafter "iterative analysis") may occur continually, periodically, intermittently, at scheduled intervals, or in any other suitable way. The rules applied during iterative analysis of the customizable data structure may be the same as the rules applied during analysis of input KRs, or the rules may differ at least in part.

The iterative analysis process may invoke some, all, or none of the crowd-sourcing techniques described above. For example, in some embodiments, the universal kernel may be modified based on iterative analysis (e.g., crowd-sourcing) of the customized modules. In other embodiments, the universal kernel may be modified based on iterative analysis of the universal kernel, but not modified based on iterative analysis of the customized modules. In addition, a customized module may be modified based on iterative analysis of itself, iterative analysis of other customized modules, and/or iterative analysis of the universal kernel.

The crowd-sourcing techniques described above may be applied to the customizable elemental data structure in any suitable way. For example, the KR system may perform mathematical or statistical processing on the customized modules to generate indicators regarding concepts or relationships contained in the customized modules. The indicators may indicate, for example, the popularity of a concept (e.g., the number or percentage of data consumers that recognize the concept), the importance of a concept (e.g., the intensity of the data consumers' interest in the concept) or a trend associated with the concept (e.g., the rate at which recognition of the concept or intensity of interest in the concept is changing). If an indicator associated with a concept (or relationship) satisfies a criterion for performing a modification to the elemental data structure, the KR system may perform such a modification. Such criteria may be fixed in advance, configurable, or adaptable.

The iterative analysis process may result in one or more modifications to the customized modules. For example, an elemental concept or elemental concept relationship may be added to or removed from one or more customized modules. Also, two or more elemental concepts may be resolved into a single elemental concept, or an elemental concept may be split into two or more elemental concepts.

As indicated above, in some embodiments, the iterative analysis process may result in modifications to the universal kernel. The types of modifications that may be applied to the universal kernel may be the same types of modifications described in the preceding paragraph. In some embodiments, the universal kernel may be modified based on the iterative analysis of the customized modules. The modifications to the universal kernel may be independent of any modifications to the customized modules, or may depend on corresponding modifications to the customized modules.

Through iterative analysis, operations performed on the customized modules may result in corresponding—but not necessarily identical—operations being performed on the universal kernel. For example, if the concept "Rio de Janeiro Olympics" is added to a large number or percentage of customized modules, the universal kernel may be modified to add a relationship between the existing concepts "Rio de Janeiro" and "Olympics," or the universal kernel may be modified to add the concept "Rio de Janeiro Olympics," depending on criteria such as the popularity of the concept, the intensity of interest in the concept, trendiness of the concept, or any other suitable criteria, including scoring or ranking criteria. Accordingly, the existence of a concept in one or more customized modules can result in a relationship being added to the universal kernel.

In some embodiments, the presence of a residual term in a concept included in one or more customized modules may result in various modifications to the customizable elemental data structure, depending on the criteria satisfied and on how the system is configured. For example, if the universal kernel includes the concept "management" and the concept "agile management" is added to one or more customized modules, the iterative analysis process may result in the concept "agile management" being split into the related concepts "agile" and "management," and the two new concepts (and the relationship between them) may be added to the customized modules. Alternatively, when the concept "agile management" is split into related concepts, the concept "agile" may be added to the customized modules, and a relationship may be added between the concept "agile" in the customized modules and the concept "management" in the universal kernel. Which of these alternatives is selected may depend on criteria such as the popularity of the concept, the intensity of interest in the concept, trendiness of the concept, or any other suitable criteria, including scoring or ranking criteria.

In some embodiments, iterative analysis across multiple customized modules may reveal attribute or hierarchical commonality amongst one or more concepts in the universal kernel. For example, if attributes of a first concept in customized module are found to overlap or be subsumed by attributes of a second concept in one or more distinct customized modules, an action may be taken to establish a relationship that previously did not exist between the first and second concept in the universal kernel. Any statistical or probabilistic analysis, for example as described above in sections II-V, may be used to analyze the collection of customized modules in order to determine whether to modify the universal kernel.

In some embodiments, customized modules may be sub-grouped, for example by knowledge domain, geographic region, interest, organization or any demographic categorization. During iterative analysis, if modifications applied to some customized modules in the sub-group satisfy specify criteria, the modifications may further be applied to all customized modules in the sub-group. In some embodiments, domain-specific customized modules may be used to provide the hierarchical sub-grouping. Whether the modifications are applied to customized modules in the sub-group may depend on criteria such as the popularity of the concepts/relationships that are the object of the modifications, the intensity of interest in those concepts/relationships, the trendiness of those concepts/relationships, or any other suitable criteria, including scoring or ranking criteria.

In some embodiments, the identification of a concept (or relationship) as "conflicting" or "contentious" may be a basis for including the concept (or relationship) in the customized modules, the universal kernel, both, or neither. For example, if some customized modules indicate that "cholesterol is good," while other customized modules indicate that "cholesterol is bad," the relationships are said to be "conflicting" or "contentious." On the one hand, evidence of conflicts in the knowledge among the customized modules may be a basis for maintaining that knowledge only in the customized modules and not implementing it within the universal kernel. On the other hand, the conflicting relationships may indicate a different type of relationship between the concepts, such as "cholesterol is related to good" and "cholesterol is related to bad." This different type of relationship may be added to the universal kernel.

Figures 35, 36:
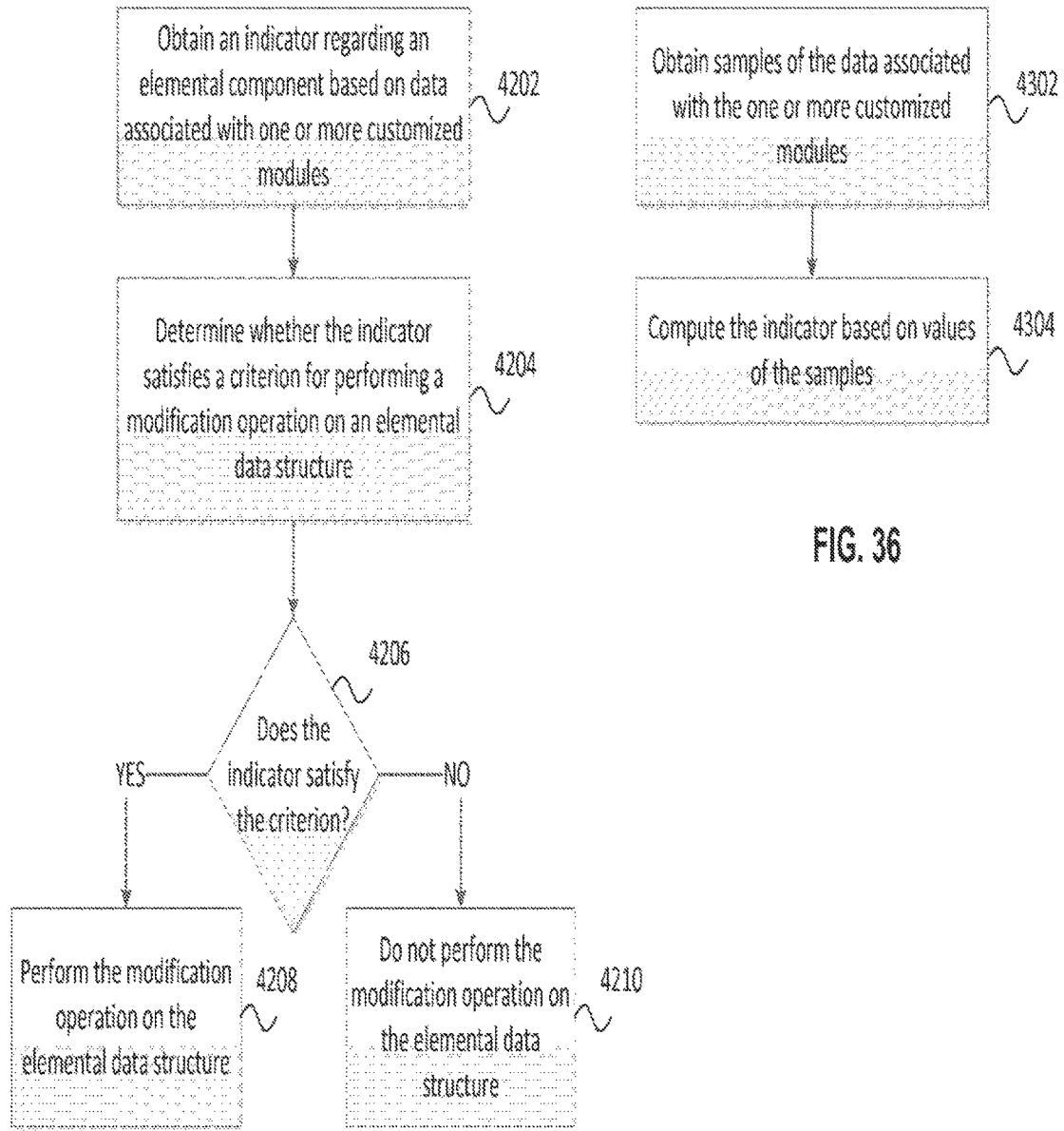
FIG. 35 is a flow chart of an exemplary process of modifying an elemental data structure.
FIG. 36 is a flow chart of an exemplary process of estimating an indicator regarding an elemental component.

FIG. 35 is a flow chart of an exemplary process of modifying an elemental data structure. The elemental data structure includes a universal kernel and customized modules. The customized modules may be data-consumer-specific modules and/or domain-specific modules.

At act 4202, an indicator is obtained. The indicator relates to an elemental component and is based on data within one or more customized modules of the elemental data structure. The indicator may indicate any information associated with the elemental component. For example, the indicator may indicate the component's popularity, the intensity of interest in the component, or a trend exhibited by the component over a specified time period. In some embodiments, popularity may be represented by the number or percentage of customized modules (hat include the component. The popularities of different components may be ranked, and the ranking may be used as an indicator of the component's relative popularity.

In some embodiments, the importance of a component may be represented by a score derived from weights associated with the component by the customized modules. For example, (he score may be an average weight or median weight of the component among the customized modules. In some embodiments, the contribution of each customized module to the total score may be weighted, in the sense that each customized module may be assigned a weight which reflects the customized module's importance. For example, a customized module that corresponds to thousands of data consumers may be assigned a higher weight than a customized module that corresponds to a single data consumer. A component's score may be calculated based on both the weights assigned to the customized modules and the weights assigned to the components.

Modifying the elemental data structure based on indicators of trends may allow the elemental data structure to adapt quickly to emerging changes in the customized modules. For example, if a concept is added to the customized modules at a high rate over a relatively short period of time, the rate at which the concept is being added (i.e., the trend) may suggest that the concept merits addition to the universal kernel long before other indicators (e.g., popularity and importance) reach suggestive thresholds. Thus, in some embodiments, trends may be used as indicators.

In some embodiments, the value of an indicator may be obtained by mathematical or statistical processing. For example, an indicator of a concept's popularity may be obtained by counting the number of customized modules that include the concept, by calculating the percentage of customized modules that include the concept, or be estimating either of those quantities.

Estimation of indicators may be beneficial in cases where identifying and counting the modules that contain a concept would be difficult or costly (e.g., when the number of customized modules is very large, or when the customized modules are very large). In some embodiments, indicators may be estimated by a statistical sampling process as illustrated in the How chart of FIG. 36. At step 4302, data samples may be collected from a representative subset of the customized modules. For example, if intensity of interest in a concept is being estimated, the collected data samples may include a weight associated with the relevant concept in each of the customized modules. At step 4304, the desired indicator may be computed over the representative subset, and this indicator may then be used as an estimate of the true value of the corresponding indicator over the entire population of customized modules. For example, an average weight may be computed from the data collected in the previous step. This average weight may then be used as an estimate of the average intensity of interest in the concept across the population of customized modules.

At act 4204, it is determined whether the indicator satisfies one or more criteria for performing a modification operation on an elemental data structure. The criteria may be thresholds to which the indicators are compared. For example, if a concept is ranked among (he N most popular concepts, the concept may be added to the universal kernel. As another example, if the average weight associated with a concept exceeds a threshold, the concept may be added to the universal kernel.

If an indicator satisfies one of the criteria for performing a modification operation on the elemental data structure (act 4206), then the designated modification operation is performed (act 4208). The types of modification operations that may be performed are described above. In some embodiments, an indicator's value may be compared to multiple criteria, and a different modification operation may be performed depending on which criteria (if any) are met by the indicator's value.

D. Synthesizing with a Customizable Elemental Data Structure

Organizing the elemental data structure to include a universal kernel and customized modules may permit the knowledge representation system to respond to queries by providing results (e.g., output KRs) that are customized to the data consumers who submit the queries, without unnecessary duplication of data. In other words, each customized module 3904 may function as a data-consumer-specific layer of knowledge that encapsulates a shared kernel of universal knowledge. Responses to a query can be tailored ("customized") to a data consumer by applying synthesis rules to the data consumer's customized module, in addition to the universal kernel.

FIG. 37 is a flow chart of an exemplary process of generating a complex knowledge representation from an elemental data structure that includes a universal kernel and a customized module. At act 4402, an input indicating a requested context is received from a data consumer. Contexts and data consumers are described above.

At act 4404, one or more rules are applied to the elemental data structure. In some embodiments, applying the one or more rules to the elemental data structure comprises applying the one or more rules to the universal kernel and to a customized module. In some embodiments, the rule(s) applied to the universal kernel and the customized module may be the same. In some embodiments, the rule(s) applied to the universal kernel and the customized module may differ, at least in part. The applied rules may be synthesis rules, generative rules, and/or knowledge creation rules such as the knowledge processing rules 130 that are applied by a synthesis engine 170. The customized module may be a data-consumer-specific module or a domain-specific module.

At step 4406, a concept or relationship is synthesized. The synthesis of the concept or relationship is based on the application of the one or more rules. For example, the synthesis of the concept or relationship may result from the application of the rule(s). The synthesis is also carried out in accordance with the requested context. Embodiments of a synthesis process that is carried out in accordance with a requested context are described in detail above.

At step 4408, the synthesized concept or relationship is used to output a complex KR that accords with the requested context. In some cases, an appropriate complex KR may have already been synthesized by the KR system or otherwise obtained by the KR system. In such cases, the synthesized concept or relationship may be used to identify the pre-existing complex KR, which is then provided to the user. However, even if an appropriate complex KR has already been synthesized, the complex KR may be re-synthesized to ensure that it reflects any relevant changes to the elemental data structure that have occurred since the complex KR was last generated. Also, in some cases an appropriate complex KR may not already be available, in such cases, the synthesized concept or relationship may be used to generate a complex KR, which is then provided to the user.

The complex KR provided at step 4408 is customized to the data consumer that provided the requested context. As described with regards to act 4406, the concept or relationship is synthesized based on the application of one or more rules to the universal kernel and to the data consumer's customized module. The use of the data consumer's customized module during the synthesis process customizes the synthesized concept or relationship to the data consumer. Thus, if two data consumers that correspond to different customized modules submit the same query or requested context, the KR system may provide different complex KRs to the data consumers (if, for example, the differences between the data consumers' customized modules affect the outcome of the synthesis process).

The above-described techniques may be implemented in any of a variety of ways. In some embodiments, the techniques described above may be implemented in software executing on one or more processors. For example, a computer or other device having at least one processor and at least one tangible memory may store and execute software instructions to perform the above-described operations. In this respect, computer-executable instructions that, when executed by the at least one processor, perform the above described operations may be stored on at least one computer-readable medium. The computer-readable medium may be tangible and non-transitory. Likewise, the data structures described herein (e.g., an elemental data structure, a universal kernel, a customized module, etc.) may be encoded as computer-readable data structures and stored in the computer-readable-medium. An elemental data structure that is encoded as a computer-readable data structure and stored in a computer-readable medium may be referred to as an "elemental computer data structure."

VII. Granularity of Customization

FIG. 13 shows a knowledge representation (KR) system 2000, according to some embodiments. A brief overview of the components and operation of embodiments of KR system 2000 is provided below. A detailed description of the components and operation of embodiments of KR system 2000 is provided above.

KR system 2000 includes an atomic knowledge representation model (AKRM) data set 110. AKRM data set i 10 includes an elemental data structure 120 and knowledge processing rules 130. In some embodiments, elemental data structure 120 may include elemental concepts and elemental concept relationships ("elemental relationships"). In some embodiments, the elemental concepts and relationships of elemental data structure 120 may be organized as a graph, such as a semantic network, with the elemental concepts corresponding to nodes of the graph, and the elemental relationships corresponding to edges of the graph. In some embodiments, knowledge processing rules 130 may include rules suitable for deconstructing KRs or other sources of information (e.g., reference corpora or data consumer models 2004) to obtain concepts and relationships, and rules suitable for constructing KRs from concepts and relationships.

KR system 2000 includes analysis engine 150. In some embodiments, analysis engine 150 may apply one or more knowledge processing rules 130 to KRs (e.g., input KRs 160) or other sources of information (e.g., reference corpora, data consumer models 2004, or elemental data structure 120) to obtain elemental concepts and relationships. In some embodiments, analysis engine 150 may apply one or more knowledge processing rules 130 to construct a KR from the obtained elemental concepts and relationships. A KR constructed by analysis engine 150 may be stored in elemental data structure 120. In some embodiments, feedback engine 2002 may provide analysis engine 150 with information specific to a data consumer 195, such as information contained in a data consumer model 2004 (e.g., context information 180 and/or output KRs 190).

In some embodiments, elemental data structure 120 may include a user-specific or domain-specific KR. Embodiments of a user-specific or domain-specific KR may be encoded in a module that is independent of any other module of elemental data structure 120, encoded in a module that is dependent on another module of elemental data structure 120, and/or encoded as one or more modifications to another module of elemental data structure 120.

KR system 2000 includes synthesis engine 170. In some embodiments, synthesis engine 170 may apply one or more knowledge processing rules 130 to one or more KRs (e.g., KRs stored in elemental data structure 120) or other sources of information (e.g., reference corpora or data consumer models 2004) to obtain complex concepts and relationships. In some embodiments, synthesis engine 170 may apply one or more knowledge processing rules 130 to construct a KR (e.g., a complex KR) from the obtained complex concepts and relationships. In some embodiments, a KR constructed by synthesis engine 170 may be organized as a graph, such as a semantic network, with the concepts corresponding to nodes of the graph, and the relationships corresponding to edges of the graph. In some embodiments, a KR constructed by synthesis engine 170 may be provided to a data consumer 195 as an output KR 190.

In some embodiments, KR system 2000 may include one or more interest networks. In some embodiments, an interest network may correspond to a data consumer 195 and/or contain information associated with the corresponding data consumer. In some embodiments, an interest network may include KRs, such as output KRs 190 (or portions thereof) provided by synthesis engine 170 to data consumer 195 (e.g., in response to a query provided by the data consumer). In some embodiments, an interest network may include output KRs 190 (or portions thereof provided by synthesis engine 170 to data consumer 195 (e.g., in response to a query provided by the data consumer) and content that corresponds to those output KRs 190 (e.g., content identified by KR system 2000 as being relevant to those output KRs 190). In some embodiments, interest network may include context information 180. In some embodiments, context information 180 may include information provided by data consumer 195 (e.g., queries, search terms, demographic information, biographical information, employment history, educational history, or credentials), information regarding an activity of the user (e.g., employment history, educational history, or activities performed with a computing device), information regarding an attribute of the user (e.g., demographic attributes, biographical attributes, or location), and/or any other information relevant to data consumer 195.

In some embodiments, data consumer model 2004 may be an interest network or include an interest network. Thus, any operations described above as being performed on or with data consumer model 2004 may be performed on or with an interest network. For example, in some embodiments, knowledge processing rules 130 may include rules suitable for deconstructing interest networks to obtain concepts and relationships, and/or rules suitable for constructing KRs from concepts and relationships. As another example, in some embodiments, analysis engine 150 may apply one or more knowledge processing rules 130 to interest networks to obtain elemental concepts and relationships. As another example, in some embodiments, feedback engine 2002 may provide analysis engine 150 with interest networks. As another example, in some embodiments, synthesis engine 170 may apply one or more knowledge processing rules 130 to one or more interest networks to obtain complex concepts and relationships. As yet another example, in some embodiments, concepts and/or relationships obtained by analyzing an interest network may be used by KR system 2000 to perform disambiguation (e.g., detection and resolution of ambiguities in a KR), crowd sourcing (e.g., analyzing data associated with interest networks of a population of users and modifying a KR to include concepts and/or relationships associated with a threshold portion of the population), and/or tailoring (e.g., analyzing interest networks and maintaining different KRs for different users).

In some embodiments, an interest network 2004 may persist for as long as a corresponding data consumer maintains an account with a provider or operator of KR system 2000. In some embodiments, an interest network 2004 may persist indefinitely.

FIG. 32A shows an elemental data structure 120, according to some embodiments. Some embodiments of elemental data structure 120 are described above. In some embodiments, elemental data structure 120 may include a "universal kernel" (or "kernel") 3902 and one or more customized modules 3904. In some embodiments, a kernel 3902 may contain concepts and/or relationships relevant to "universal" (e.g., "general" or "well-known") knowledge. Some techniques for identifying knowledge as universal are described above. In some embodiments, universal concepts and relationships may be concepts and relationships that are relevant to all members of a population (e.g., a population of data consumers) or to a specified portion of a population. In some embodiments, universal concepts and relationships may be concepts and relationships that are relevant to universal knowledge or domain-specific knowledge (e.g., concepts and relationships that are derived from reference corpora), in contrast to user-specific knowledge. In some embodiments, universal concepts and relationships may be any concepts and relationships that are not user-specific. In some embodiments, universal knowledge may be knowledge that relates to a specified number of users (or knowledge domains), knowledge that relates to a specified subset of users (or knowledge domains), knowledge that relates to a specified percentage of users (or knowledge domains), and/or knowledge that is not specific to a user (or knowledge domain).

In some embodiments, the same kernel may be accessible via multiple user-specific KRs (e.g., may be used by the KR system to provide the same general concepts and relationships to multiple users).

In some embodiments, a kernel may contain concepts and/or relationships relevant to domain-specific knowledge, such as domain-specific knowledge that is relevant to many or all users of a KR system 2000.

In some embodiments, a customized module (CM) 3904 may contain user-specific knowledge that is relevant to a specific user or a specific group of users of a KR system 2000. In some embodiments, a CM may contain concepts and relationships that are relevant (e.g., specifically relevant) to the specific user or group of users. In some embodiments, a CM may be used by a KR system to provide user-specific concepts and relationships to a corresponding user. In some embodiments, a CM may correspond to a particular knowledge domain or group of knowledge domains, and may contain domain-specific concepts and relationships. Domain-specific concepts and relationships may be relevant (e.g., specifically relevant) to one or more particular knowledge domain(s). In some embodiments, customized module 3904 may be used by the KR system to provide domain-specific concepts and relationships.

A concept and/or relationship that is specifically relevant to a user may be relevant only to that user and not to other users, may have a relevance to the user that exceeds a threshold relevance level, may be more relevant to the user than to a threshold percentage of users, etc. A concept and/or relationship that is specifically relevant to a knowledge domain may be more relevant to the knowledge domain than to other domains, may be relevant only to the knowledge domain and not to other knowledge domains, may have a relevance to the knowledge domain that exceeds a threshold relevance level, etc.

For example, in some embodiments, the users of KR system 2000 may be doctors employed by a hospital. In this example, kernel 3902 may contain knowledge that is specific to administration of health care, such as knowledge specific to surgery, oncology, radiology, trauma, or other medical topics. In this example, a CM 3904 may contain knowledge that is relevant to a particular doctor, such as knowledge specific to procedures the doctor has performed, research the doctor has conducted, or patients the doctor has treated. By storing knowledge that is relevant to many or all users in a shared kernel 3902, and storing knowledge that is relevant to individual users in individual CMs 3904, redundancy of data storage may be advantageously reduced, while retaining the benefits of user-specific customization of a knowledge representation.

In some embodiments, kernel 3902 may include a general knowledge representation. A general KR may include general concepts and relationships. General concepts and relationships may be elemental concepts and relationships that are relevant to general knowledge (e.g., knowledge contained in general-purpose reference documents, such as encyclopedias, dictionaries, thesauri, and/or almanacs, including but not limited to Wikipedia and WorldNet). In some embodiments, a general KR may be constructed by analysis engine 150 through the application of knowledge processing rules 130 to reference corpora or input KRs 160 containing general knowledge.

In some embodiments, kernel 3902 may include a domain-specific knowledge representation. A domain-specific KR may include domain-specific concepts and relationships. Domain-specific concepts and relationships may be elemental concepts and relationships that are relevant to domain-specific knowledge (e.g., knowledge contained in documents relating to scientific disciplines, the arts, occupations, professions, religions, history, sports, etc.). In some embodiments, domain-specific concepts and relationships may be specifically relevant to one or more knowledge domains. In some embodiments, a domain-specific KR may be constructed by applying knowledge processing rules 130 to reference corpora or input KRs 160 containing domain-specific knowledge.

In some embodiments, elemental data structure 120 includes one or more customized modules 3904. A customized module 3904 may include a user-specific knowledge representation. A user-specific KR may include user-specific concepts and relationships. User-specific concepts and relationships may be concepts and relationships that are relevant (e.g., particularly relevant or specifically relevant) to a user or a specific group of users (e.g., data consumer 195). For example, user-specific concepts and relationships may be concepts and relationships that are relevant to an interest of a corresponding user. In some embodiments, a user-specific KR for a user may be constructed by applying knowledge processing rules 130 to information or KRs containing user-specific knowledge, such as an interest network corresponding to the user.

In some embodiments, a customized module (CM) 3904 may include concepts. For example, some embodiments of customized module 3904 may include concepts that are relevant to a corresponding user, and are not contained in a kernel 3902 of elemental data structure 120. In some embodiments, a customized module 3904 may include references to concepts. For example, some embodiments of customized module 3904 may include references to concepts that are relevant to a corresponding user, and are contained in a kernel 3902 of elemental data structure 120. A reference to a concept may be implemented using any suitable techniques, including but not limited to storing a pointer to the concept, storing a unique tag associated with the concept, storing an index associated with the concept, or in any other suitable way. By storing a reference to a kernel concept in a CM 3904 corresponding to a particular user, KR system 2000 may efficiently convey that the kernel concept is particularly relevant to the user, while avoiding the overhead (e.g., data storage overhead) associated with storing a duplicate of the concept in the CM 3904.

In some embodiments, a customized module 3904 may include relationships. For example, some embodiments of customized module 3904 may include relationships that are relevant to a corresponding user, and are not contained in a kernel 3902 of elemental data structure 120. For example, some embodiments of customized module 3904 may include a relationship between two concepts in the customized module 3904, a relationship between a concept in the customized module 3904 and a concept in a kernel 3902, a relationship between a concept in the customized module 3904 and a concept in another customized module 3904, and/or a relationship between two concepts in a kernel 3902. For example, if kernel 3902 includes the concepts "Rio de Janeiro" and "Olympics," and a user is interested in flying to Rio de Janeiro to attend the Summer Olympic Games in 2016, a CM corresponding to the user may include a relationship between the kernel's concepts "Rio de Janeiro" and "Olympics," as well as a relationship between the CM's concept "airfare" and the kernel's concept "Rio de Janeiro."

In some embodiments, CM 3904 may include references to relationships. For example, some embodiments of customized module 3904 may include references to relationships that are relevant to a corresponding user, and are contained in a kernel 3902 of elemental data structure 120. A reference to a relationship may be implemented in any suitable manner, including but not limited to storing a pointer to the relationship, storing a unique tag associated with the relationship, storing an index associated with the relationship, or in any other suitable way. By storing a reference to a kernel relationship in a CM 3904 corresponding to a particular user, KR system 2000 may efficiently convey that the kernel relationship is particularly relevant to the user, while avoiding (he overhead (e.g., data storage overhead) associated with storing a duplicate of the relationship in the CM 3904.

Embodiments of elemental data structure 120 may include two or more CMs 3904 that correspond to a same user. In some embodiments, the two or more CMs may correspond to different interests of the user. Each CM therefore may contain knowledge that is particularly relevant to the corresponding interest of the user, and little or no knowledge that is not relevant to that corresponding interest. For example, one CM may correspond to the user's professional interests, and another CM may correspond to the user's personal interests. The use of a user-interest-specific CM by synthesis engine 170 may facilitate efficient identification of concepts and/or content items that are highly relevant to a query (e.g., in cases where the user's query relates strongly to the corresponding interest). For example, when a CM corresponding to a user's professional interests is used to identify concepts or content items in response to a query concerning the user's profession, the identified concepts or content items may be highly relevant to the user's query.

As described above, a customized module may be constructed using concepts and relationships obtained by analyzing a user's interest network. In embodiments where elemental data structure 120 includes two or more CMs for a user, a concept or relationship obtained by analysis of a user's interest network may be added to any number of the user's CMs or to none of the user's CMs. In some embodiments, the determination of whether to add a concept or relationship to a particular CM may be based on proxy indicators associated with the information in the user's interest network from which the concept or relationship was derived. For example, if the concept or relationship was derived from information generated during specified hours (e.g., 8 AM-6 PM), on specified days of the week (e.g., Monday-Friday), or on specified dates (e.g., non-holidays), the concept or relationship may be added to a first CM (e.g., a CM that corresponds to the user's professional interests).

On the other hand, if the concept or relationship was derived from information generated during other specified hours (e.g., 6 PM-11 PM), on other specified days of the week (e.g., Saturday-Sunday), or on other specified dates (e.g., holidays), the concept or relationship may be added to a second CM (e.g., a CM that corresponds to the user's personal interests). These examples of proxy indicators are merely illustrative, as any indicators suitable for distinguishing among a user's interests may be used, including but not limited to a type of computing device used to generate the information, an internet address (e.g., IP address or MAC address) of a computing device used to generate the information, a geographical location of the user when the information was generated, or other indicators. In some embodiments, a user may manually select the CM that corresponds to the user's activities (e.g., by logging into a KR system account associated with the selected CM. or by using a software interface of the KR system to select the desired CM).

When a user-interest-specific CM is used to identify concepts or content in response to a query that is not strongly related to the corresponding user interest, the identified concepts or content may be less relevant to the user. Accordingly, in some embodiments, elemental data structure 120 may include a CM 3904 that corresponds to all interests, aspects, or activities of the user. The use of such a user-specific, interest-nonspecific CM may provide better results than a user-interest-specific CM when the user provides a query that relates to multiple user interests or does not relate strongly to any one user interest. In some embodiments, a user-specific, interest-nonspecific CM may be constructed based on analysis of multiple user-interest-specific CMs. In some embodiments, a user-specific, interest-nonspecific CM may be constructed by adding all user-specific concepts and relationships to a CM, irrespective of any user interests to which the concepts and relationships may pertain.

FIG. 38 shows a flowchart of a method of operating a KR system, according to some embodiments. At step 4502, the KR system obtains context information associated with a user. In some embodiments, the context information may include a query. In some embodiments, the context information may include information related to the user, such as information about an attribute of the user, information about an activity of the user, information provided by the user, or any other information related to the user.

At step 4504, the KR system identifies, based on a plurality of concepts in a KR corresponding to the user, a group of one or more concepts relevant to the user context information (e.g., relevant to the user's query). In some embodiments, a KR corresponding to the user ("user KR") may include concepts and relationships that are relevant to users in general (e.g., general concepts and relationships of a kernel 3902), relevant to a knowledge domain of interest to the user (e.g., domain-specific knowledge concepts and relationships of a kernel 3902 or a domain-specific customized module 3904), and/or specifically relevant to the user (e.g., user-specific concepts and relationships of a user-specific customized module 3904).

In some embodiments, a user KR may be formed by combining one or more kernels 3902 (or portions thereof), one or more domain-specific customized modules 3904, and/or one or more of the user's user-specific customized modules 3904. For example, a user KR may be formed by combining a kernel with a user-specific customized module (e.g., a user-specific customized module that relates to the user, to one or more other users, to one or more interests of the user, and/or to one or more interests of other users). As another example, a user KR may be formed by combining a kernel with a domain-specific customized module (e.g., a domain-specific customized module that relates to a knowledge domain of interest to the user).

In some embodiments, two or more modules (e.g., kernel modules, domain-specific customized modules, or user-specific customized modules) may be combined by integrating the modules into a unified module. For example, in embodiments where a module is represented by a connected graph (e.g., a semantic network), two or more modules may be integrated by connecting the modules' graphs to each other. As another example, in embodiments where a module is represented by an unconnected graph (e.g., a semantic network), two or more modules may be integrating by connecting portions of the modules' graphs to each other. In some embodiments, two or more modules may be combined by maintaining the modules as separate modules, by performing independent synthesis operations on the separate modules, and by aggregating the results (e.g., complex KRs and/or content) of the synthesis operations.

Integration of modules may be carried out in any suitable way. In some embodiments, two or more modules may be integrated by forming a union between the modules' graphs and performing entity resolution, correspondence mapping, and/or conflict resolution. In some embodiments, entity resolution may be performed by identifying two or more concepts with the same or sufficiently similar meanings, and merging those two or more concepts into a single concept. The determination as to whether two or more concepts have the same or sufficiently similar meanings may be carried out using label matching, pattern matching, or any other suitable technique. In embodiments where label matching is performed, two concepts may be identified as being the same or sufficiently similar if the concepts have identical labels. In embodiments where pattern matching is performed, the sameness or sufficient similarity of two concepts may be assessed using Jaccard's index. Dice's co-efficient, etc.

In some embodiments, correspondence matching may be performed in addition to or as an alternative to entity resolution. In some embodiments, correspondence matching may be performed by identifying (in two or more modules) concepts that have the same concept identifier, and by merging those concepts into a single concept in the combined module. A concept identifier may be a unique identifier that distinguishes a concept from all other concepts. For example, a module relating athletes may include a concept "Usain Bolt" which corresponds to the Jamaican sprinter named Usain Bolt, and that concept may have a unique ID (e.g., a number of alphanumeric character string that distinguishes the concept from all other concepts). In addition, a module relating to world record holders in track-and-field events may include the same concept "Usain Bolt", and that concept may have the same unique ID. In some embodiments, correspondence matching may be used to identify the two "Usain Bolt" concepts and merge them into a single "Usain Bolt" concept. Correspondence matching may be advantageously applied to embodiments in which modules are represented as graphs, as tables, or as any other suitable data structure.

In some embodiments, conflict resolution may be performed by identifying concepts and/or relationships in the two or more modules that conflict, and selecting one of the conflicting concepts and/or relationships to take precedence over the conflicts and/or relationships with which it conflicts. For example, a conflict between a relationship in a customized module and a relationship in a kernel may be identified. In some embodiments (e.g., embodiments wherein user-specific knowledge is prioritized over general knowledge), the combination of the customized module and the kernel may include the customized module's relationship and omit the kernel's conflict relationship. In some embodiments (e.g., embodiments where general knowledge is prioritized over user-specific knowledge), the combination of the customized module and the kernel may include the kernel's relationship and omit the customized module's relationship. In some embodiments, the concept or relationship that takes precedence in a conflict scenario may be selected based on other criteria, such as probabilities or confidence scores associated with the modules or with the conflicting concepts and/or relationships.

In some embodiments, a combination of two or more modules may be formed by creating a new (combined) module based on analysis of the two or more modules. In some embodiments, a combination of two or more modules may be formed by merely aggregating of the modules into a single module (e.g., by forming an unconnected graph from the graphs that correspond to the modules).

In some embodiments, the group of one or more concepts relevant to the user context may be identified by performing a single synthesis operation on the user KR. In some embodiments, a single synthesis operation may be preferable, for example, in cases where the user KR combines all of the user-specific CMs that are relevant to the user's query. In some embodiments, the group of one or more concepts relevant to the user content may be identified by performing two or more synthesis operations on two or more user KRs. In some embodiments, multiple synthesis operations may be preferable, for example, in cases where the user-specific CMs that are relevant to the query are assigned to different user KRs. In some embodiments, performing multiple synthesis operations (e.g., a first synthesis operation on a first user KR that combines a kernel and a first user-specific CM, and a second synthesis operation on a second user KR that combines the kernel and a second user-specific CM) may result in identification of a first group of concepts relevant to the user's context information, and performing a single synthesis operation (e.g., a single synthesis operation on a user KR that combines a kernel, a first user-specific CM, and a second user-specific CM) may result in identification of a second group of concepts relevant to the user's context information. In some embodiments, the first and second groups of concepts may differ, at least in part. In some embodiments, a synthesis operation may include at least step 4504 of the method illustrated in FIG. 38. In some embodiments, the group of one or more concepts relevant to the user's context may be organized in a KR and provided to the user, and/or stored in the user's interest network.

At step 4506, the KR system identifies content information corresponding to the identified group of one or more concepts. Content corresponding to identified concepts may be identified in any suitable manner, including but not limited to entering the labels of the identified concepts into a search engine (e.g., individually or in any combination of two or more concepts). In some embodiments, content information may include any type of digitally-encoded information, including but not limited to documents, audio-visual information (e.g., videos, music, images, podcasts), tweets, emails, messages posted on a social networking platform, blog entries, etc.

At step 4508, the KR system may provide the identified content information to the user. In some embodiments, the content information provided to the user may be ranked. A ranking of an item of content information may be based, for example, on a relevance of the item to the user's query and/or to the group of concepts identified in step 4504.

At step 4510, the KR system may update the user KR. In some embodiments, the KR system may update the user KR by updating the user-specific customized module(s) that are included in the user KR. An update of the user KR may be initiated at a specified time, periodically, in response to a trigger event (e.g., creation of a user-specific customized module, modification of a user-specific CM, a number of concepts in a user-specific CM exceeding a threshold number of concepts, a number of relationships in a user-specific CM exceeding a threshold number of relationships, or a change in the user's interest network), or in any other suitable manner.

Figure 39:
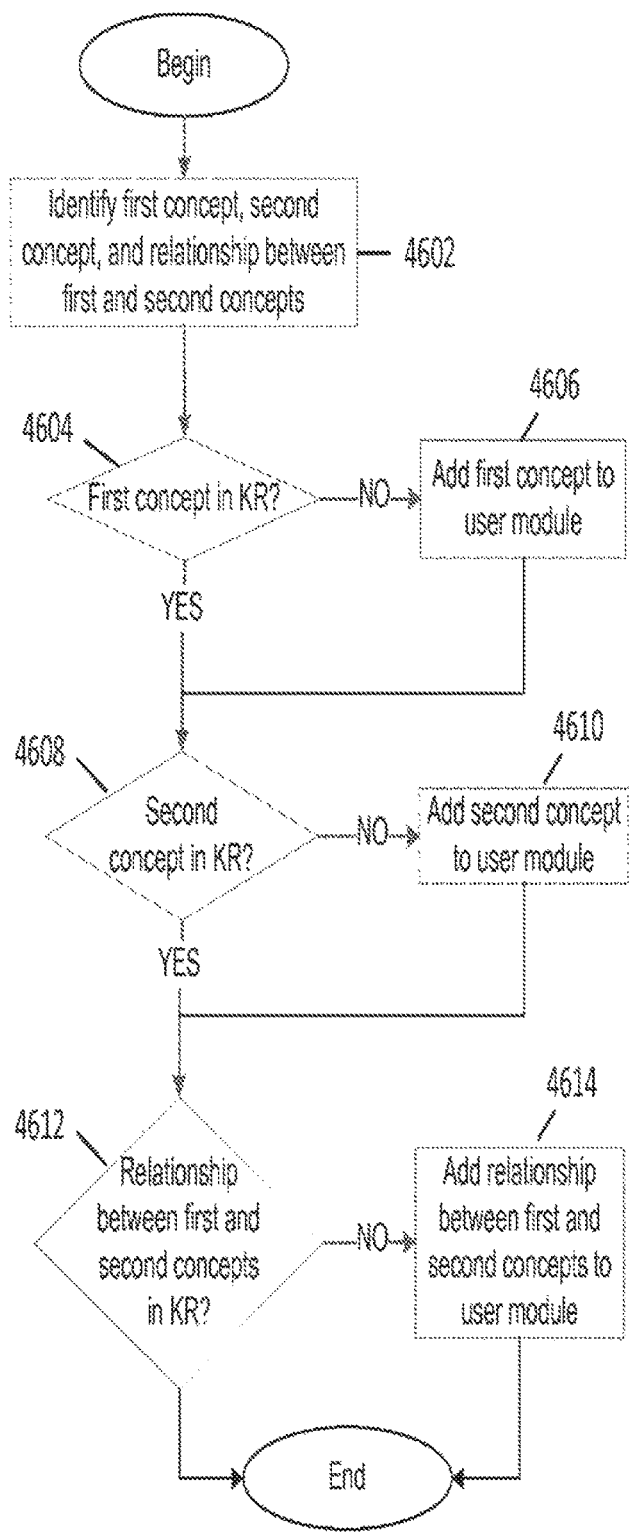
FIG. 39 is a flow chart of a process of updating a knowledge representation, according to some embodiments.

FIG. 39 illustrates a method of updating a KR, according to some embodiments. At step 4602 of the illustrated method, a first concept, a second concept, and/or a relationship between the first and second concepts may be identified. In some embodiments, the first and second concepts and the relationship may be identified by using analysis engine 150 to analyze an interest network of a user to whom the CM corresponds, or a portion of such an interest network. In some embodiments, the interest network (or a portion thereof) may be provided to analysis engine 150 of KR system 2000 by feedback engine 2002. For example, feedback engine 2002 may provide interest network (or portions thereof) to analysis engine 150 periodically, at specified times, or in response to a trigger event or condition (e.g., provision of content information to the user, provision of an output KR 190 to the user, an amount of content information provided to the user by KR system 2000 (e.g., within a specified time period) exceeding a threshold amount, or a number of concepts contained in output KRs 190 provided to the user by KR system 2000 (e.g., within a specified time period) exceeding a threshold number).

At step 4604 of the illustrated method, a determination is made as to whether the first concept is included in the user's knowledge representation. A determination as to whether a concept is included in the user's KR may be made using any suitable technique for searching a KR.

If the first concept is not in the user's KR, the first concept is added to at least one of the user's customized modules at step 4606. (In cases where multiple CMs correspond to the user, techniques described above may be used to select the CM(s) to be modified.)

At step 4608 of the illustrated method, a determination is made as to whether the second concept is included in the user's KR. If the second concept is not in the user's KR, the second concept is added to at least one of the user's customized modules at step 4610. (In cases where multiple CMs correspond to the user, techniques described above may be used to select the CM(s) to be modified.)

At step 4612 of the illustrated method, a determination is made as to whether the relationship is included in the user's KR. If the relationship is not in the user's KR, the relationship is added to at least one of the user's customized modules at step 4614. (In cases where multiple CMs correspond to the user, techniques described above may be used to select the CM(s) to be modified.)

Embodiments of the method of FIG. 39 may be used to construct a user-specific, interest-nonspecific CM from one or more user-interest-specific CMs. As described above, elemental data structure 120 may include CMs that are not only specific to a user, but specific to a particular interest of the user. In some embodiments, a user-specific, interest-nonspecific CM may be formed by analyzing the user-interest-specific CMs to obtain user-specific concepts and relationships, and by using the user-specific concepts and relationships to construct (or update) a user-specific, interest-nonspecific CM.

In some embodiments, a KR of elemental data structure 120 includes elemental concepts and complex concepts. In some embodiments, the elemental concepts included in the KR may be explicitly encoded, e.g., as nodes in a graph. In some embodiments, the complex concepts may be implicitly encoded, e.g., as concepts obtainable by applying knowledge processing rules 130 to concepts of the KR.

VIII. Organization of a Kernel

Some kernels 3902 may be well-suited to some applications of a KR system 2000 and less well-suited to other applications. For example, in circumstances where the KR system is expected to identify content relevant to a broad range of general and domain-specific topics, a monolithic kernel including concepts and relationships obtained from analysis of a broad range of general and domain-specific information may be advantageous. However, the number of concepts and the number of relationships in such a kernel may be very large, such that searching the kernel may require a large amount of memory and/or a relatively long processing time. As another example, in circumstances where the KR system is expected to identify content relevant to a small number of domain-specific topics, a kernel that includes one or more modules relevant to the domain-specific topics may provide excellent results while requiring less memory and less processing time.

Figure 32B:
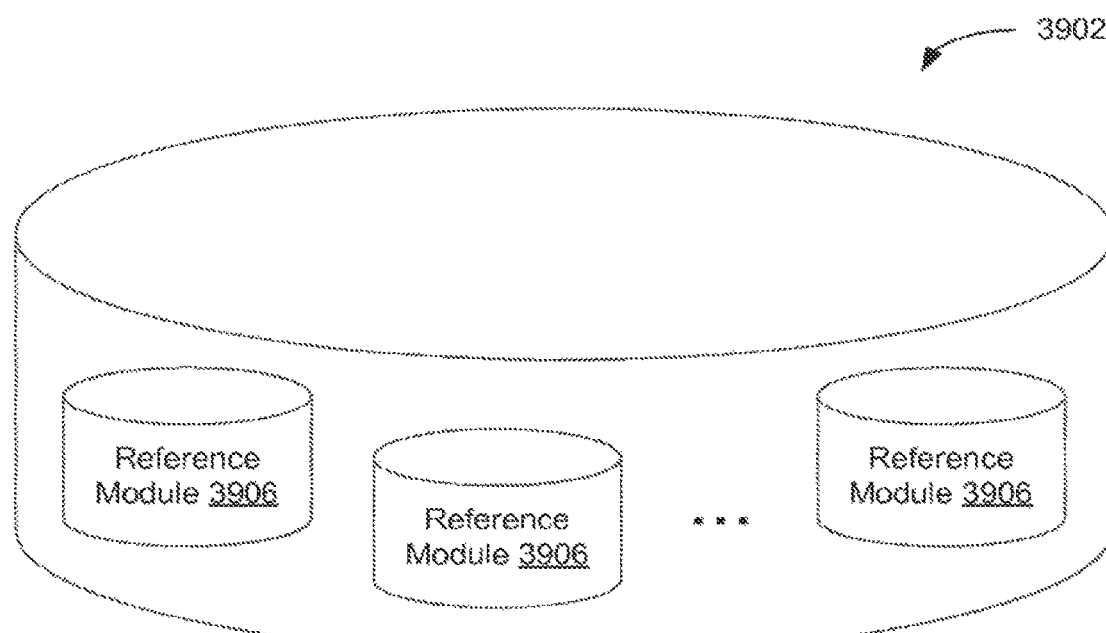
FIG. 32B is a block diagram of an embodiment of a kernel.

FIG. 32B shows a kernel 3902, according to some embodiments. In the embodiment of FIG. 32B, kernel 3902 may include one or more reference modules 3906. In some embodiments, a reference module 3906 may contain a domain-specific KR. In some embodiments, a domain-specific reference module may be constructed by analyzing KRs and other information relevant to the corresponding knowledge domain. For example, a reference module 3906 relevant to diagnostic medicine may be constructed by analyzing KRs, journal articles, case studies, and oilier information relevant to diagnostic medicine.

Embodiments of the method illustrated in FIG. 38 may be applied to a KR system 2000 in which a kernel 3902 includes one or more reference modules 3906. At step 4502, the KR system may obtain context information (e.g., a query). At step 4504, (he KR system may identify, based on a plurality of concepts in a KR, a group of one or more concepts relevant to the context information (e.g., relevant to the query). In some embodiments, the KR may include a kernel 3902 which includes one or more reference modules. In some embodiments, the KR may include portions of a kernel 3902, such as one or more reference modules of the kernel 3902. In some embodiments, the KR may include a combination of one or more reference modules and/or one or more user-specific or domain-specific customized modules.

In some embodiments, the KR may be formed in response to the KR system receiving a query (e.g., one or more reference modules or domain-specific customized modules may be selected for inclusion in the KR based on a topic of the query, and one or more user-specific customized modules may be selected based on the user who supplied the query). In some embodiments, the KR may be formed prior to the KR system receiving a query (e.g., one or more reference modules may be pre-selected for inclusion in the KR by a developer or provider of the KR system, based on the developer's or provider's understanding of the types of queries the KR system is likely to handle).

In some embodiments, the group of one or more concepts relevant to the user context may be identified by performing a single synthesis operation on a KR that includes a combination of all reference modules and customized modules that are likely to be relevant to the query. In some embodiments, the group of one or more concepts relevant to the user context may be identified by performing multiple synthesis operations on multiple KRs that each includes a subset of the reference modules and/or customized modules that are likely to be relevant to the query. In some embodiments, performing multiple synthesis operations (e.g., a first synthesis operation on a first KR that includes a first reference module, and a second synthesis operation on a second KR that includes a second reference module) may result in identification of a first group of concepts relevant to the user's context information, and performing a single synthesis operation (e.g., a single synthesis operation on a KR that includes a combination of the first and second reference modules) may result in identification of a second group of concepts relevant to the user's context information. In some embodiments, the first and second groups of concepts may differ, at least in part. In some embodiments, a synthesis operation may include at least step 4504 of the method illustrated in FIG. 38. In some embodiments, the group of one or more concepts relevant to the user's context may be organized in a KR and provided to the user, and/or stored in the user's interest network.

At step 4506, the KR system identifies content information corresponding to the identified group of one or more concepts. Content corresponding to identified concepts may be identified using any suitable techniques for identifying content, including but not limited to entering the labels of the identified concepts into a search engine (e.g., individually or in any combination of two or more concepts). In some embodiments, content information may include any type of digitally-encoded information, including but not limited to documents, audiovisual information (e.g., videos, music, images, podcasts), tweets, emails, messages posted on a social networking platform, blog entries, etc.

At step 4508, the KR system may provide the identified content information to the user. In some embodiments, the content information provided to the user may be ranked. A ranking of an item of content information may be based, for example, on an indication of the item's relevance to the user's query and/or to the group of concepts identified in step 4504.

Al step 4510, the KR system may update the user KR. In some embodiments, the KR system may update the KR by updating user-specific customized module(s) that are included in the user KR, by updating domain-specific modules(s) that are included in the KR. by updating a kernel that is included in the KR. by adding a user-specific module to the KR. by removing a user-specific module from the KR. by adding a domain-specific module to the KR. by removing a domain-specific module from the KR. by adding a kernel to the KR, by removing a kernel from the KR, or in any other suitable way.

In some embodiments, two or more modules (e.g., user-specific customized modules, domain-specific customized modules, kernels, or reference modules) of an elemental data structure 120 may include one or more common concepts and/or relationships. In some embodiments, two modules are different if the set of concepts and relationships included in the first module differs, at least in part, from the set of concepts and relationships included in the second module.

References are made herein to embodiments of KRs that "include" one or more modules (e.g., domain-specific modules or customized modules). References to such inclusion are intended to encompass embodiments in which the module is included through combination with one or more other modules.

IX. Exemplary Systems

FIGS. 22 and 23 illustrate exemplary systems 2200 and 2300, respectively, that may be employed in some embodiments for implementing an atomic knowledge representation model (AKRM) involved in analysis and synthesis of complex knowledge representations (KRs), in accordance with some embodiments of the present invention. Exemplary system 2200 comprises inference engine 2102, statistical engine 1902, feedback engine 2002, and preference engine 3802.

Figure 15:
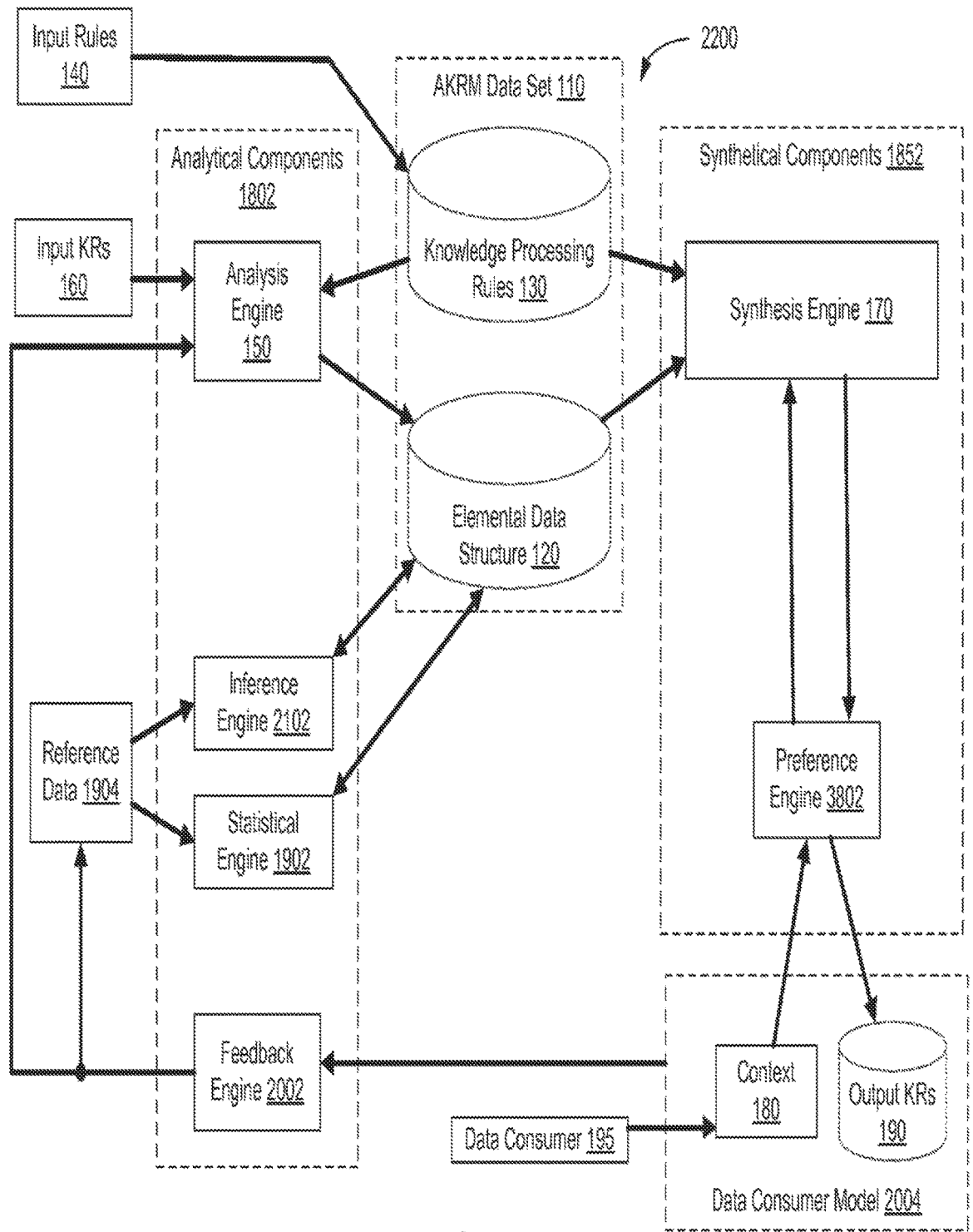
FIG. 15 is a block diagram illustrating yet another exemplary system for implementing an atomic knowledge representation model in accordance with some embodiments of the present invention.

Various engines illustrated in FIG. 15 may operate together to perform analysis and/or synthesis of complex KRs. For example, documents such as web pages or other digital content viewed or used by a data consumer 195 may be included in data consumer model 2004. Feedback engine 2002 may add such documents or other digital content to reference data 1904. Inference engine 2102 may detect subsumption relationships among concepts in such documents. Statistical engine 1902 may use such documents to estimate a relevance of one concept to another. As another example, inference engine 2102 may infer that a relationship exists between two concepts in elemental data structure 120. Statistical engine 1902 may estimate a relevance associated with the relationship. Additionally or alternatively, inference engine 2102 may apply elemental inference rules to a statistical graphical model produced by statistical engine 2102. Additional cooperative or complementary functions of the various inventive engines disclosed herein will be apparent to one of skill in the art, and are within the scope of this disclosure.

Figure 16:
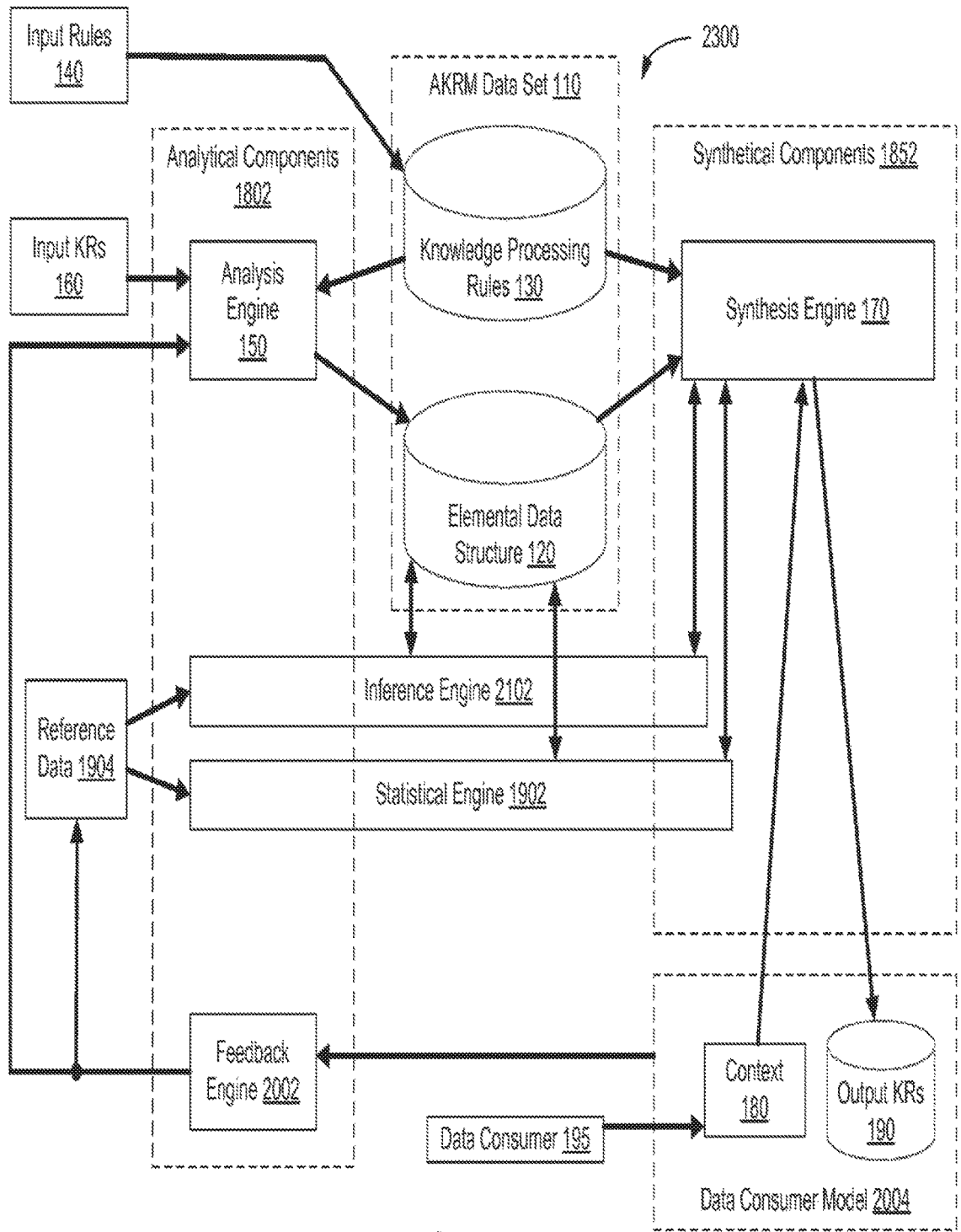
FIG. 16 is a block diagram illustrating yet another exemplary system for implementing an atomic knowledge representation model in accordance with some embodiments of the present invention.

Exemplary system 2300 of FIG. 16 further illustrates that inference engine 2102 and/or statistical engine 1902 may participate in analysis and/or synthesis operations.

As illustrated in FIGS. 22 and 23, reference data 1904 may be used to estimate relevance values associated with components of elemental data structure 120 and/or to detect concepts and relationships not detected by analysis engine 150. For example, application of knowledge processing rules 130 to input KRs 160 by analysis engine 150 may suggest that there is no relationship between two concepts or that the relevance of the first concept to the second concept is low. However, application of statistical inference methods and inferential analysis rules to reference data 1904 may suggest that there is a relationship between the two concepts or that the relevance of the first concept to the second concept is high. Results obtained from inference engine 2102 and/or statistical engine 1902 may complement results obtained from analysis engine 150, in the sense that analysis of multiple sources of data may lead to more accurate detection of relationships and concepts, and more accurate calculate of relevance values associated with those relationships and concepts. In some embodiments, an exemplary system may evaluate a portion of reference data 1904 (or an input KR 160) to determine whether analysis of the data (or KR) is likely to enhance a quality of elemental data structure 120.

X. Additional Remarks

Various inventive aspects described herein may be used with any of one or more computers and/or devices each having one or more processors that may be programmed to take any of the actions described above for using an atomic knowledge representation model in analysis and synthesis of complex knowledge representations. For example, both server and client computing systems may be implemented as one or more computers, as described above. FIG. 8 shows, schematically, an illustrative computer 1100 on which various inventive aspects of the present disclosure may be implemented. The computer 1100 includes a processor or processing unit 1101 and a memory 1102 that may include volatile and/or non-volatile memory. The computer 1100 may also include storage 1105 (e.g., one or more disk drives) in addition to the system memory 1102.

The memory 1102 and/or storage 1105 may store one or more computer-executable instructions to program the processing unit 1101 to perform any of the functions described herein. The storage 1105 may optionally also store one or more data sets as needed. For example, a computer used to implement server system 100 may in some embodiments store AKRM data set 110 in storage 1105. Alternatively, such data sets may be implemented separately from a computer used to implement server system 100.

References herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The exemplary computer 1100 may have one or more input devices and/or output devices, such as devices 1106 and 1107 illustrated in FIG. 8. These devices may be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 8, the computer 1100 may also comprise one or more network interfaces (e.g., the network interlace 1110) to enable communication via various networks (e.g., the network 1120). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, the word "user" is generally intended to be interpreted in the same manner as the phrase "data consumer" (e.g., one or more human users of a KR system and/or one or more machine-implemented devices or software applications interacting with a KR system.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an." as used herein, unless clearly indicated to the contrary, should be understood to mean "at least one."

As used herein, the phrase "at least one." in reference to a list of one or more elements, should be understood to mean at least one element selected from any one or more of the elements in the list of elements, but not necessarily including at least one of each and every element specifically listed within the list of elements, and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B" or, equivalently. "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., as "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A method comprising:
   using at least one processor to perform:
      providing, to a first set of one or more users, access to a first semantic network;
      providing, to a second set of one or more users, access to a second semantic network, wherein at least a second subset of the second semantic network has a same topology as at least a first subset of the first semantic network; and
      in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network,
      wherein each of the one or more first and second elements comprises a concept or a relationship, and
      wherein the first and second semantic networks are implemented as computer-readable data structures, and wherein modifying the second semantic network is performed by one or more processors executing computer-readable instructions.

2. The method of claim 1, wherein the modifying comprises:
   using the information corresponding to the second set of one or more users to determine whether the one or more first elements are relevant to the second set of one or more users; and
   in response to determining that the one or more first elements are relevant to the second set of one or more users, adding the one or more first elements to the second semantic network.

3. The method of claim 2, wherein modifying the second semantic network further comprises:
   using the information corresponding to the second set of one or more users to determine whether the one or more second elements are relevant to the second set of one or more users; and
   in response to determining that the one or more second elements are not relevant to the second set of one or more users, removing the one or more second elements from the second semantic network.

4. The method of claim 1, wherein the modifying comprises:
   using the information corresponding to the second set of one or more users to determine whether the one or more first elements are associated with the second set of one or more users; and
   in response to determining that the one or more first elements are associated with the second set of one or more users, adding the one or more first elements to the second semantic network.

5. The method of claim 4, wherein the modifying further comprises:
   using the information corresponding to the second set of one or more users to determine whether the one or more second elements are associated with the second set of one or more users; and
   in response to determining that the one or more second elements are not associated with the second set of one or more users, removing the one or more second elements from the second semantic network.

6. The method of claim 4, wherein using the information corresponding to the second set of one or more users to determine whether the one or more first elements are associated with the second set of one more users comprises:
   estimating what portion of the second set of one or more users is associated with the one or more first elements; and
   determining whether the portion of the second set of one or more users associated with the one or more first elements exceeds a threshold portion.

7. The method of claim 1, wherein the method further comprises:
   using information corresponding to a plurality of users to determine what portion of the plurality of users is associated with one or more third elements, wherein each of the one or more third elements comprises a concept or a relationship; and
   in response to determining that the portion of the plurality of users associated with the one or more third elements exceeds a threshold portion, adding the one or more third elements to the first and second semantic networks.

8. The method of claim 7, wherein the method further comprises:

in response to determining that the portion of the plurality of users associated with the one or more third elements is less than a threshold portion, removing the one or more third elements from the first and second semantic networks.

9. The method of claim 1, further comprising:
in response to receiving a search query provided by the second set of one or more users, identifying search results matching the search query, wherein identifying the search results comprises searching the second semantic network; and
causing the search results to be presented to the second set of one or more users.

10. The method of claim 9, wherein the information corresponding to the second set of one or more users comprises information regarding the search query provided by the second set of one or more users and/or information regarding an interaction of the second set of one or more users with the search results obtained by searching the second semantic network.

11. The method of claim 10, wherein the interaction of the second set of one or more users with the search results comprises at least one member of the second set of one or more users selecting a subset of the search results.

12. The method of claim 9, wherein the information corresponding to the second set of one or more users comprises at least one type of information selected from the group consisting of query information, demographic information, biographical information, employment information, familial information, preference information, interest information, financial information, geo-spatial information, browsing history information, website profile information, or social networking profile information associated with the at least one user.

13. The method of claim 10, further comprising feeding back the information corresponding to the second set of one or more users from a search result output of a knowledge representation system to an information analysis input of the knowledge representation system.

14. The method of claim 11, further comprising applying one or more rules to deconstruct the information corresponding to the second set of one or more users to obtain the one or more first elements.

15. The method of claim 1, wherein the at least a first subset of the first semantic network and the at least a second subset of the second semantic network which have the same topology are implemented as a same computer-readable data structure.

16. The method of claim 1, wherein prior to modifying the second semantic network, the first and second semantic networks are identical.

17. A knowledge representation system, comprising:
one or more processors; and
a memory unit configured to store instructions which, when executed by the one or more processors, cause the one or more processors to perform a method comprising:
providing, to a first set of one or more users, access to a first semantic network;
providing, to a second set of one or more users, access to a second semantic network, wherein at least a second subset of the second semantic network has a same topology as at least a first subset of the first semantic network; and
in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network,
wherein each of the one or more first and second elements comprises a concept or a relationship, and
wherein the first and second semantic networks are implemented as computer-readable data structures, and wherein modifying the second semantic network is performed by one or more processors executing computer-readable instructions.

18. The knowledge representation system of claim 17, wherein the modifying comprises:
using the information corresponding to the second set of one or more users to determine whether the one or more first elements are relevant to the second set of one or more users; and
in response to determining that the one or more first elements are relevant to the second set of one or more users, adding the one or more first element to the second semantic network.

19. The knowledge representation system of claim 17, wherein the modifying comprises:
using the information corresponding to the second set of one or more users to determine whether the one or more first elements are associated with the second set of one or more users; and
in response to determining that the one or more first elements are associated with the second set of one or more users, adding the one or more first elements to the second semantic network.

20. The knowledge representation system of claim 17, wherein the method further comprises:
in response to receiving a search query provided by the second set of one or more users, identifying search results matching the search query, wherein identifying the search results comprises searching the second semantic network; and
causing the search results to be presented to the second set of one or more users.

21. A non-transitory computer-readable storage medium storing processor-executable instructions which, when executed by one or more processors, cause the processors to perform a method comprising:
providing, to a first set of one or more users, access to a first semantic network;
providing, to a second set of one or more users, access to a second semantic network, wherein at least a second subset of the second semantic network has a same topology as at least a first subset of the first semantic network; and
in response to identifying information corresponding to the second set of one or more users, modifying the second semantic network based, at least in part, on the information corresponding to the second set of one or more users by adding to the second semantic network one or more first elements not included in the first semantic network and/or removing from the second semantic network one or more second elements included in the first semantic network,
wherein each of the one or more first and second elements comprises a concept or a relationship, and
wherein the first and second semantic networks are implemented as computer-readable data structures, and wherein modifying the second semantic network is performed by one or more processors executing computer-readable instructions.

* * * * *